(12) United States Patent
Nalepka et al.

(10) Patent No.: US 10,686,976 B2
(45) Date of Patent: Jun. 16, 2020

(54) SYSTEM AND METHOD FOR MODIFYING ONBOARD EVENT DETECTION AND/OR IMAGE CAPTURE STRATEGY USING EXTERNAL SOURCE DATA

(71) Applicant: Trimble Inc., Sunnyvale, CA (US)

(72) Inventors: Michael D. Nalepka, Franklin, TN (US); Ricky L. Ochsendorf, Prior Lake, MN (US)

(73) Assignee: Trimble Inc., Sunnyvale, CA (US)

( * ) Notice: Subject to any disclaimer, the term of this patent is extended or adjusted under 35 U.S.C. 154(b) by 507 days.

(21) Appl. No.: 14/829,143

(22) Filed: Aug. 18, 2015

(65) Prior Publication Data

US 2016/0050356 A1    Feb. 18, 2016

Related U.S. Application Data

(60) Provisional application No. 62/038,717, filed on Aug. 18, 2014, provisional application No. 62/038,720,
(Continued)

(51) Int. Cl.
*H04N 5/232* (2006.01)
*G07C 5/02* (2006.01)
(Continued)

(52) U.S. Cl.
CPC ..... *H04N 5/23203* (2013.01); *G06K 9/00791* (2013.01); *G07C 5/02* (2013.01);
(Continued)

(58) Field of Classification Search
None
See application file for complete search history.

(56) References Cited

U.S. PATENT DOCUMENTS 2,978,971 A    4/1961 Eburn, Jr.
3,528,524 A    9/1970 Birbanescu et al.
(Continued)

FOREIGN PATENT DOCUMENTS

WO    WO0197524    12/2001

OTHER PUBLICATIONS

Axiomatic Global Electronic Solutions, "What is SAE J1939," www.axiomatic.com, Jul. 2006, 3 pages.
(Continued)

*Primary Examiner* — Chikaodili E Anyikire
(74) *Attorney, Agent, or Firm* — Kilpatrick Townsend & Stockton LLP

(57) ABSTRACT

A system for use on a vehicle comprising a tractor and a trailer comprises a communications device that effects communications between the system and a remote system. The communications device is configured to receive data from the remote system. An event detector is configured to generate a trigger signal in response to detecting occurrence of predetermined events. An onboard computer is coupled to the communications device, the event detector, a media recorder, and a computer of the vehicle. One or more image capture devices at the vehicle are communicatively coupled to one or both of the onboard computer and the media recorder. The onboard computer is configured to adjust one or more parameters of the image capture devices and/or modify one or more parameters of the event detector based at least in part on the data received from the remote system.

21 Claims, 40 Drawing Sheets

Related U.S. Application Data filed on Aug. 18, 2014, provisional application No. 62/038,724, filed on Aug. 18, 2014, provisional application No. 62/038,725, filed on Aug. 18, 2014.

(51) Int. Cl.
  *H04N 5/77* (2006.01)
  *H04N 7/18* (2006.01)
  *G06K 9/00* (2006.01)
  *G07C 5/08* (2006.01)
  *G07C 5/00* (2006.01)

(52) U.S. Cl.
  CPC ....... *G07C 5/0866* (2013.01); *H04N 5/23216* (2013.01); *H04N 5/77* (2013.01); *H04N 7/181* (2013.01); *H04N 7/188* (2013.01); *G07C 5/008* (2013.01)

(56) References Cited

U.S. PATENT DOCUMENTS

| | | | |
|---|---|---|---|
| 3,689,695 A | 9/1972 | Rosenfield et al. | |
| 4,023,507 A | 5/1977 | Van der Lely | |
| 4,110,792 A | 8/1978 | Long et al. | |
| RE30,539 E | 3/1981 | Van der Lely | |
| 4,277,804 A | 7/1981 | Robison | |
| 4,365,268 A | 12/1982 | Allen et al. | |
| 4,555,725 A | 11/1985 | Geiersbach et al. | |
| 4,776,750 A | 10/1988 | Griswold, Jr. et al. | |
| 4,892,345 A | 1/1990 | Rachael | |
| 5,015,189 A | 5/1991 | Wenzinger, Jr. | |
| 5,090,804 A | 2/1992 | Wong et al. | |
| 5,191,370 A | 3/1993 | Bozzolato | |
| 5,289,321 A | 2/1994 | Secor | |
| 5,429,329 A | 7/1995 | Wallace et al. | |
| 5,517,419 A | 5/1996 | Lanckton et al. | |
| 5,530,421 A | 6/1996 | Marshall et al. | |
| 5,637,871 A | 6/1997 | Piety et al. | |
| 5,956,079 A | 9/1999 | Ridgley | |
| 5,995,900 A | 11/1999 | Hsiao et al. | |
| 6,133,851 A | 10/2000 | Johnson | |
| 6,148,255 A | 11/2000 | Van der Lely | |
| 6,148,291 A * | 11/2000 | Radican | G06Q 10/08 705/22 |
| 6,259,475 B1 | 7/2001 | Ramachandran et al. | |
| 6,288,362 B1 | 9/2001 | Thomas et al. | |
| 6,426,704 B1 | 7/2002 | Hutchison | |
| 6,433,683 B1 | 8/2002 | Robinson | |
| 6,434,450 B1 | 8/2002 | Griffin, Jr. et al. | |
| 6,491,417 B1 | 12/2002 | Haen et al. | |
| 6,578,675 B2 | 6/2003 | Wilson et al. | |
| 6,690,413 B1 | 2/2004 | Moore | |
| 6,693,519 B2 | 2/2004 | Keirstead | |
| 6,750,898 B1 | 6/2004 | Ishida et al. | |
| 6,783,187 B2 | 8/2004 | Parsons | |
| 6,927,694 B1 | 8/2005 | Smith et al. | |
| 6,933,837 B2 | 8/2005 | Gunderson et al. | |
| 6,970,772 B2 | 11/2005 | Radtke et al. | |
| 7,006,129 B1 | 2/2006 | McClure | |
| 7,102,665 B1 | 9/2006 | Chandler et al. | |
| 7,142,098 B2 | 11/2006 | Lang et al. | |
| 7,164,476 B2 | 1/2007 | Shima et al. | |
| 7,171,769 B2 | 2/2007 | Schultz et al. | |
| 7,176,958 B2 | 2/2007 | Jones | |
| 7,184,074 B1 | 2/2007 | Jansen | |
| 7,193,508 B2 | 3/2007 | Hill et al. | |
| 7,195,267 B1 | 3/2007 | Thompson | |
| 7,204,504 B2 | 4/2007 | Gehring et al. | |
| 7,265,663 B2 | 9/2007 | Steele | |
| 7,280,042 B2 | 10/2007 | Trela | |
| 7,306,398 B2 | 12/2007 | Doran, Jr. | |
| 7,342,486 B2 | 3/2008 | Tsukada et al. | |
| 7,344,109 B1 | 3/2008 | Rezai | |
| 7,358,851 B2 | 4/2008 | Patenaude et al. | |
| 7,400,957 B2 | 7/2008 | Hofer et al. | |
| 7,434,643 B2 | 10/2008 | Lesesky et al. | |
| 7,536,457 B2 | 5/2009 | Miller | |
| 7,565,941 B2 | 7/2009 | Cunningham | |
| 7,659,827 B2 | 2/2010 | Gunderson et al. | |
| 7,660,433 B2 | 2/2010 | Dralle et al. | |
| 7,725,216 B2 | 5/2010 | Kim | |
| 7,804,426 B2 | 9/2010 | Etcheson | |
| 7,825,951 B2 | 11/2010 | Lang et al. | |
| 7,880,609 B2 | 2/2011 | Viegers et al. | |
| 7,922,085 B2 | 4/2011 | Thomas et al. | |
| 7,974,444 B2 | 7/2011 | Hongo | |
| 8,000,843 B2 | 8/2011 | Kim | |
| 8,004,112 B2 | 8/2011 | Koga et al. | |
| 8,009,034 B2 | 8/2011 | Dobson et al. | |
| 8,046,414 B2 | 10/2011 | Kamdar et al. | |
| 8,120,653 B2 | 2/2012 | Schmidt et al. | |
| 8,126,309 B2 | 2/2012 | Sakai | |
| 8,139,820 B2 | 3/2012 | Plante et al. | |
| 8,181,868 B2 | 5/2012 | Thomas et al. | |
| 8,198,991 B2 | 6/2012 | Do | |
| 8,199,975 B2 | 6/2012 | Pomerleau et al. | |
| 8,232,871 B2 | 7/2012 | Lesesky | |
| 8,239,092 B2 | 8/2012 | Plante et al. | |
| 8,262,120 B1 | 9/2012 | Pitts et al. | |
| 8,269,617 B2 | 9/2012 | Cook et al. | |
| 8,276,322 B2 | 10/2012 | Miller | |
| 8,314,708 B2 | 11/2012 | Gunderson et al. | |
| 8,330,817 B1 | 12/2012 | Foster | |
| 8,342,597 B2 | 1/2013 | Nagami et al. | |
| 8,373,567 B2 | 2/2013 | Denson | |
| 8,374,746 B2 | 2/2013 | Plante | |
| 8,427,288 B2 | 4/2013 | Schofield et al. | |
| 8,442,555 B2 | 5/2013 | Lowell et al. | |
| 8,500,383 B2 | 8/2013 | Schmidgall | |
| 8,508,353 B2 | 8/2013 | Cook et al. | |
| 8,564,446 B2 | 10/2013 | Gunderson et al. | |
| 8,564,658 B2 | 10/2013 | Nimberger | |
| 8,583,314 B2 | 11/2013 | de Oliveira et al. | |
| 8,606,492 B1 | 12/2013 | Botnen | |
| 8,626,568 B2 | 1/2014 | Warkentin et al. | |
| 8,649,933 B2 | 2/2014 | Plante et al. | |
| 8,670,035 B2 | 3/2014 | Robert | |
| 8,676,491 B2 | 3/2014 | Taylor et al. | |
| 8,680,976 B2 | 3/2014 | Lesesky | |
| 8,725,345 B2 | 5/2014 | De Oliveira et al. | |
| 8,744,642 B2 | 6/2014 | Nemat-Nasser et al. | |
| 8,757,084 B2 | 6/2014 | Condit et al. | |
| 8,849,501 B2 | 9/2014 | Cook et al. | |
| 8,854,199 B2 | 10/2014 | Cook et al. | |
| 8,880,279 B2 | 11/2014 | Plante | |
| 8,892,310 B1 | 11/2014 | Palmer et al. | |
| 8,930,072 B1 | 1/2015 | Lambert et al. | |
| 8,952,819 B2 | 2/2015 | Nemat-Nasser | |
| 2002/0066621 A1 | 6/2002 | Wilson et al. | |
| 2002/0080016 A1 | 6/2002 | Keirstead | |
| 2002/0191407 A1 | 12/2002 | Haen et al. | |
| 2003/0028298 A1 | 2/2003 | Macky et al. | |
| 2003/0067541 A1 * | 4/2003 | Joao | B60R 25/102 348/148 |
| 2003/0141965 A1 | 7/2003 | Gunderson et al. | |
| 2003/0234512 A1 | 12/2003 | Holub | |
| 2004/0021858 A1 | 2/2004 | Shima et al. | |
| 2004/0041942 A1 | 3/2004 | Jones | |
| 2004/0080206 A1 | 4/2004 | Parsons | |
| 2004/0088090 A1 | 5/2004 | Wee | |
| 2004/0196366 A1 | 10/2004 | Thiel | |
| 2004/0212489 A1 | 10/2004 | Chan | |
| 2005/0015805 A1 | 1/2005 | Iwamura | |
| 2005/0102079 A1 | 5/2005 | Hofer et al. | |
| 2005/0146607 A1 | 7/2005 | Linn et al. | |
| 2005/0151845 A1 | 7/2005 | Tsukada et al. | |
| 2005/0162513 A1 | 7/2005 | Chan | |
| 2005/0193603 A1 | 9/2005 | Schultz et al. | |
| 2005/0216294 A1 | 9/2005 | Labow | |
| 2005/0219359 A1 | 10/2005 | Trela | |
| 2005/0230163 A1 | 10/2005 | Cunningham | |
| 2005/0242931 A1 | 11/2005 | Gunderson et al. | |
| 2006/0061656 A1 | 3/2006 | Lang et al. | |
| 2006/0092403 A1 | 5/2006 | Dralle et al. | |

(56) References Cited

U.S. PATENT DOCUMENTS

| | | |
|---|---|---|
| 2006/0098094 A1 | 5/2006 | Lott |
| 2006/0147264 A1 | 7/2006 | Doran |
| 2006/0251502 A1 | 11/2006 | Scharfenberger |
| 2007/0038353 A1* | 2/2007 | Larschan ............... G07C 5/085 701/33.4 |
| 2007/0040677 A1* | 2/2007 | Blair, Jr. ............... G06Q 10/08 340/568.1 |
| 2007/0088488 A1* | 4/2007 | Reeves ............... G07C 5/085 701/117 |
| 2007/0120953 A1 | 5/2007 | Koga et al. |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0139182 A1 | 6/2007 | O'Connor et al. |
| 2007/0150373 A1 | 6/2007 | Kuo |
| 2007/0174624 A1 | 7/2007 | Wolosewicz et al. |
| 2007/0268158 A1 | 11/2007 | Gunderson et al. |
| 2007/0271105 A1 | 11/2007 | Gunderson et al. |
| 2008/0043736 A1 | 2/2008 | Stanley |
| 2008/0044061 A1 | 2/2008 | Hongo |
| 2008/0049830 A1 | 2/2008 | Richardson |
| 2008/0111666 A1 | 5/2008 | Plante et al. |
| 2008/0122603 A1 | 5/2008 | Plante et al. |
| 2008/0125965 A1* | 5/2008 | Carani ............... G07C 5/008 701/408 |
| 2008/0147267 A1 | 6/2008 | Plante et al. |
| 2008/0158352 A1 | 7/2008 | Schmidt et al. |
| 2008/0169343 A1* | 7/2008 | Skaaksrud ............ G06Q 10/08 235/376 |
| 2008/0252417 A1 | 10/2008 | Thomas et al. |
| 2008/0304705 A1 | 12/2008 | Pomerleau et al. |
| 2008/0319602 A1 | 12/2008 | McClellan et al. |
| 2009/0057069 A1 | 3/2009 | Boggess |
| 2009/0102923 A1* | 4/2009 | Mason ............... B60R 1/00 348/148 |
| 2009/0192638 A1 | 7/2009 | Leest et al. |
| 2009/0299805 A1 | 12/2009 | Baughman et al. |
| 2009/0309468 A1 | 12/2009 | Miller |
| 2009/0319341 A1 | 12/2009 | Berkobin et al. |
| 2010/0049994 A1 | 2/2010 | Ghoshal |
| 2010/0073473 A1 | 3/2010 | Nimberger |
| 2010/0085171 A1 | 4/2010 | Do |
| 2010/0157061 A1 | 6/2010 | Katsman et al. |
| 2010/0171828 A1 | 7/2010 | Ishii |
| 2010/0194976 A1 | 8/2010 | Smith et al. |
| 2010/0207744 A1 | 8/2010 | Lammers et al. |
| 2010/0207787 A1* | 8/2010 | Catten ............... G08G 1/096716 340/905 |
| 2010/0225738 A1 | 9/2010 | Webster |
| 2011/0035777 A1 | 2/2011 | Chae et al. |
| 2011/0096166 A1 | 4/2011 | Englander et al. |
| 2011/0130905 A1* | 6/2011 | Mayer ............... G07C 5/008 701/22 |
| 2011/0149077 A1 | 6/2011 | Robert |
| 2011/0163159 A1 | 7/2011 | Thomas et al. |
| 2011/0295446 A1 | 12/2011 | Basir et al. |
| 2012/0030041 A1 | 2/2012 | Wolosewicz et al. |
| 2012/0034056 A1 | 2/2012 | Schmidgall |
| 2012/0062741 A1 | 3/2012 | Stimel et al. |
| 2012/0146361 A1 | 6/2012 | Nagami et al. |
| 2012/0181878 A1 | 7/2012 | Nosaka et al. |
| 2012/0201312 A1 | 8/2012 | Schwager |
| 2012/0277950 A1 | 11/2012 | Plante et al. |
| 2012/0318187 A1 | 12/2012 | Condit et al. |
| 2012/0330597 A1 | 12/2012 | Lammers |
| 2013/0021148 A1 | 1/2013 | Cook et al. |
| 2013/0024060 A1 | 1/2013 | Sukkarie et al. |
| 2013/0033381 A1* | 2/2013 | Breed ............... B60T 1/005 340/568.1 |
| 2013/0069390 A1 | 3/2013 | Foster |
| 2013/0096731 A1 | 4/2013 | Tamari et al. |
| 2013/0107044 A1 | 5/2013 | Azevedo |
| 2013/0169425 A1 | 7/2013 | Victor et al. |
| 2013/0188050 A1 | 7/2013 | Winget |
| 2013/0197774 A1 | 8/2013 | Denson |
| 2013/0233448 A1 | 9/2013 | Schrubbe et al. |
| 2013/0267194 A1* | 10/2013 | Breed ............... H04W 4/90 455/404.2 |
| 2013/0274950 A1 | 10/2013 | Richardson et al. |
| 2013/0317711 A1 | 11/2013 | Plante |
| 2013/0332004 A1 | 12/2013 | Gompert et al. |
| 2013/0342653 A1* | 12/2013 | McCloskey ............ G01S 17/026 348/46 |
| 2013/0345927 A1 | 12/2013 | Cook et al. |
| 2014/0015977 A1 | 1/2014 | Taylor et al. |
| 2014/0025254 A1 | 1/2014 | Plante et al. |
| 2014/0036072 A1* | 2/2014 | Lyall ............... G06K 9/00771 348/143 |
| 2014/0046550 A1 | 2/2014 | Palmer et al. |
| 2014/0046569 A1 | 2/2014 | Mohn et al. |
| 2014/0047371 A1 | 2/2014 | Palmer et al. |
| 2014/0058616 A1 | 2/2014 | de Oliveira |
| 2014/0088824 A1 | 3/2014 | Ishimoto |
| 2014/0094992 A1 | 4/2014 | Lambert et al. |
| 2014/0139655 A1 | 5/2014 | Mimar |
| 2014/0152422 A1* | 6/2014 | Breed ............... G06K 9/00369 340/5.52 |
| 2014/0152828 A1 | 6/2014 | Plante et al. |
| 2014/0167945 A1 | 6/2014 | Cook et al. |
| 2014/0195105 A1 | 7/2014 | Lambert |
| 2015/0352721 A1* | 12/2015 | Wicks ............... B25J 9/1664 700/228 |

OTHER PUBLICATIONS

Britell et al., "Collision Avoidance Through Improved Communication Between Tractor and Trailer," Federal Register, vol. 59, No. 170, Sep. 2, 1994, pp. 45750-45752.

Corrigan, "Introduction to the Controller Area Network (CAN)," Application Report SLOA101A, Texas Instruments, Aug. 2002, 15 pages.

Fleet Camera Systems Fleet Safety, "In Vehicle Camera," www.safetytrackcam.com, printed on Jul. 16, 2014, 2 pages.

Junger, "Introduction to J1939," Vector Informatik GmbH, Application Note AN-ION-1-3100, www.vector.com, Apr. 27, 2010, 11 pages.

Lin et al., "Evaluation of the Power Line Motor Carrier Rearview Video System," State of Florida Department of Transportation, Jun. 2009, 147 pages.

Maryanka, "Using Power Line Communication for Harness Reduction in Automotive," Yamar Electronics Ltd, www.yamar.com, 2011, 4 pages.

SAE International, "Surface Vehicle Recommended Practice," www.sae.org, 2004, 16 pages.

Nov. 12, 2015, International Search Report and Written Opinion dated Nov. 12, 2015 from PCT App. No. PCT/US2015/045764, 10 pages.

* cited by examiner

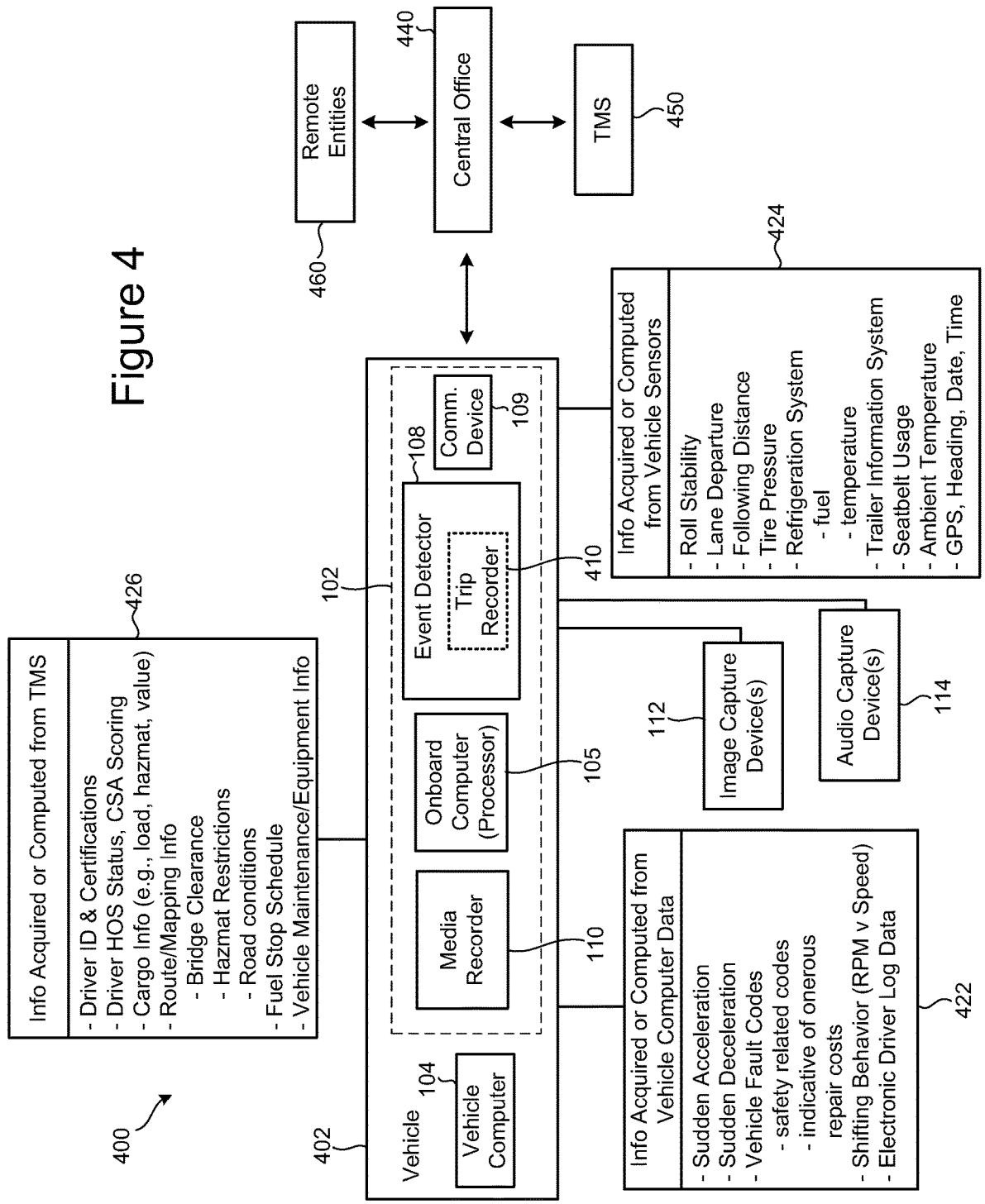

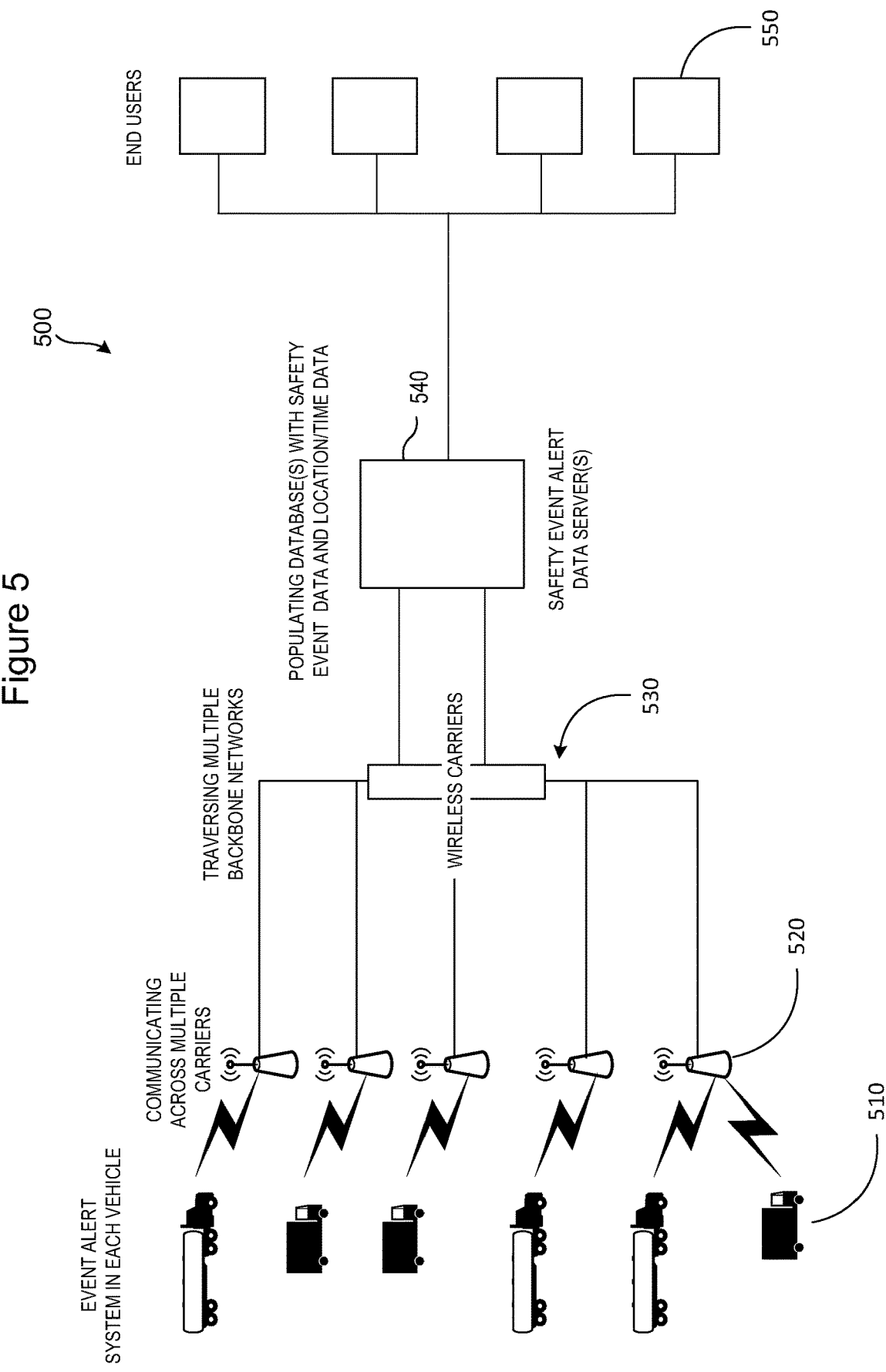

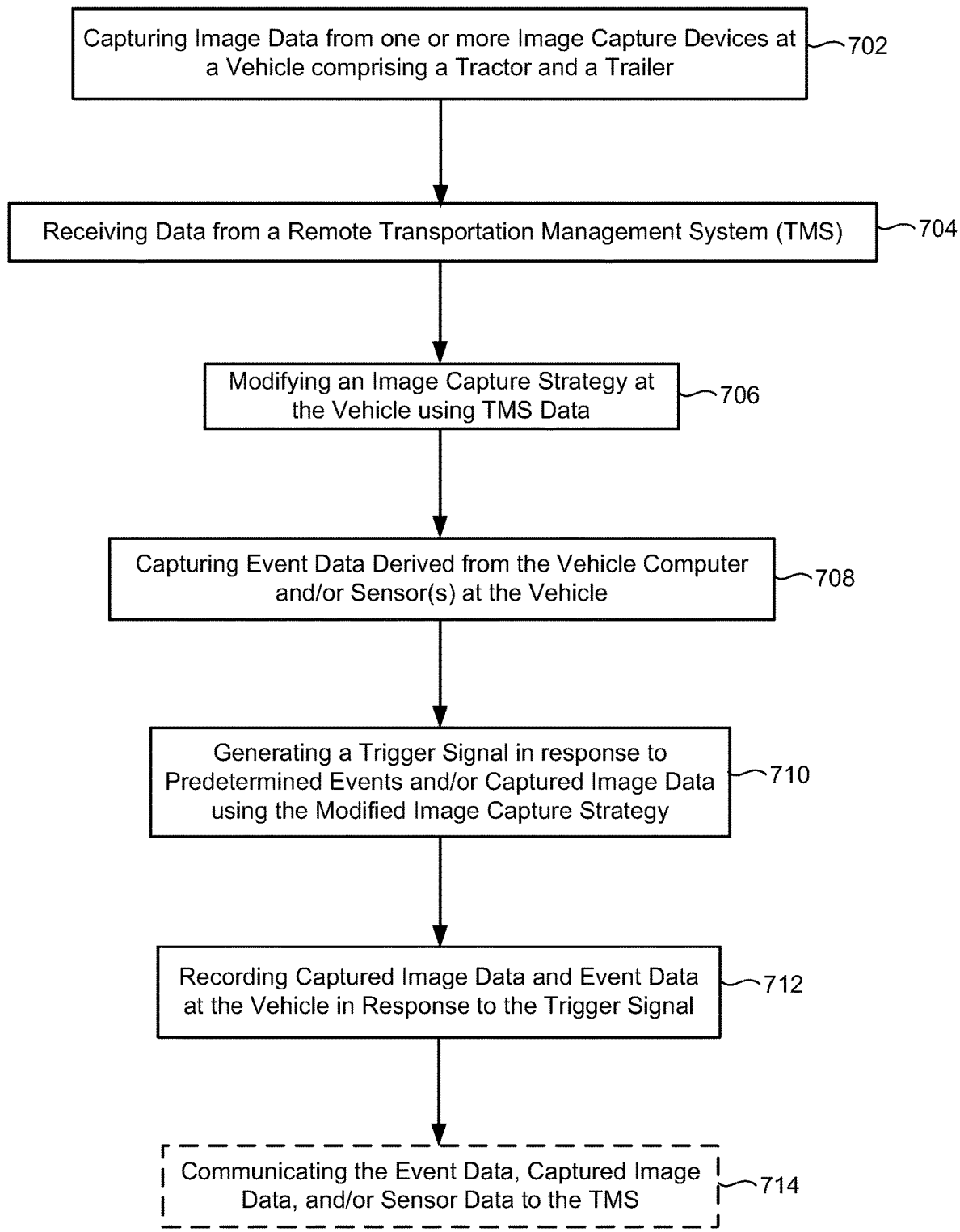

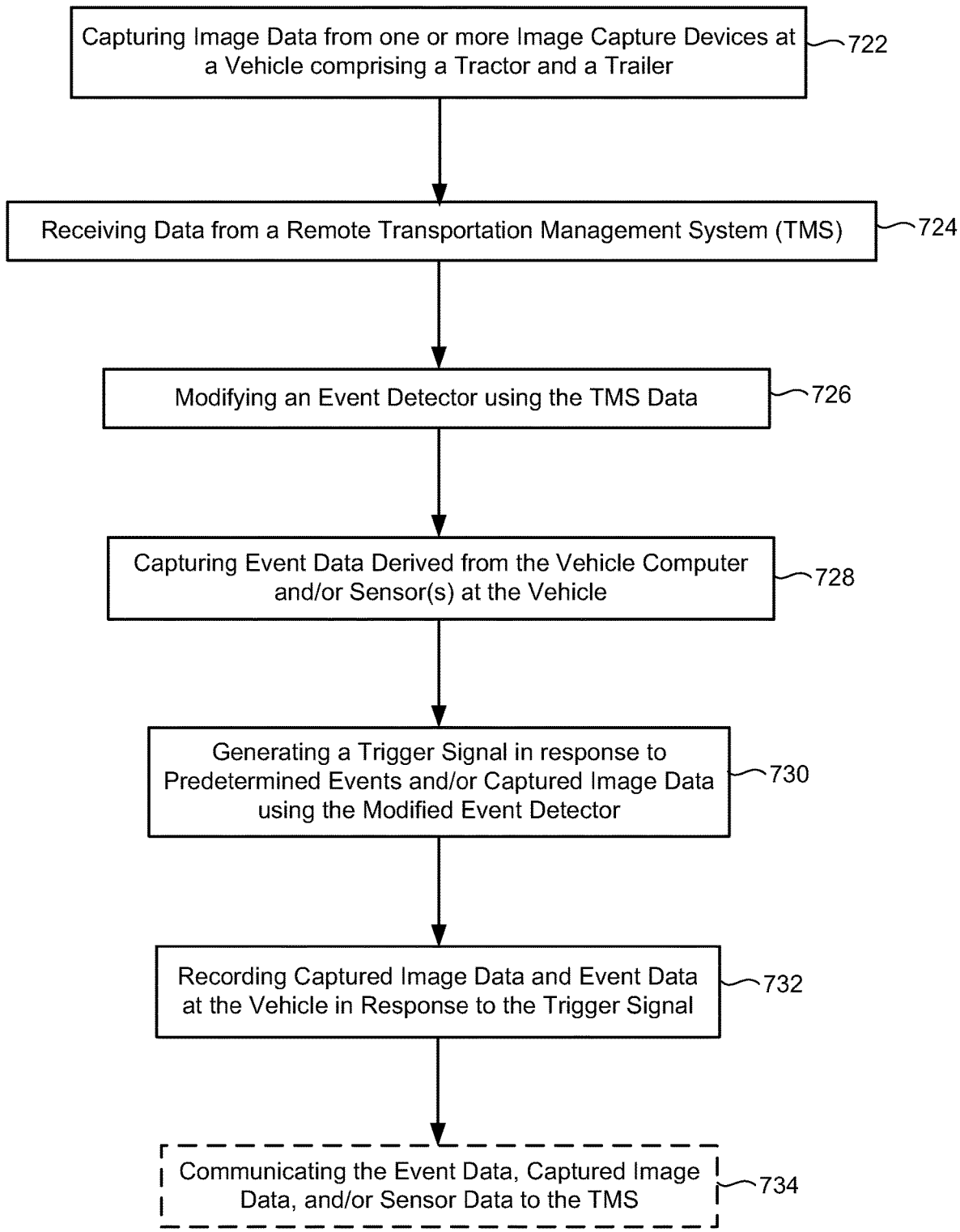

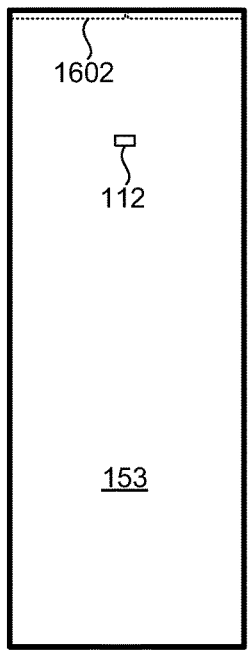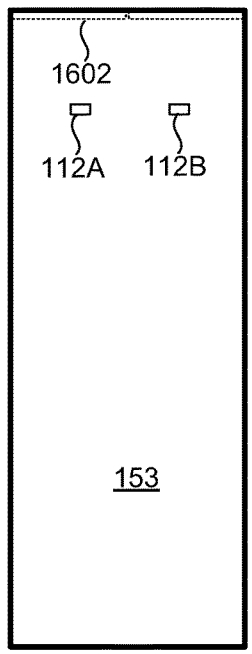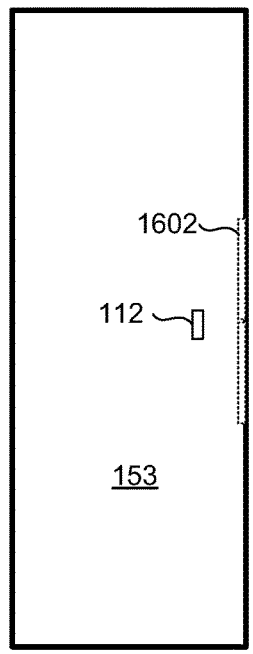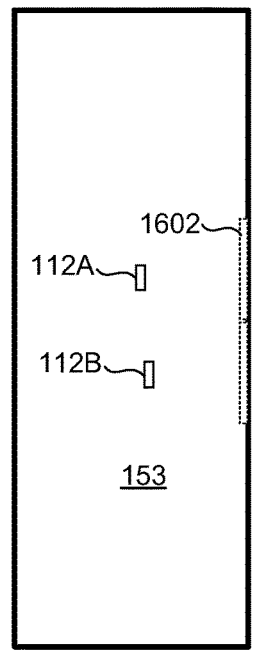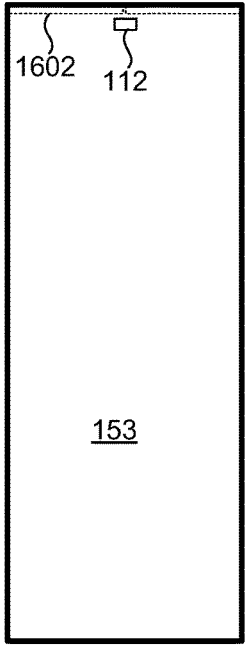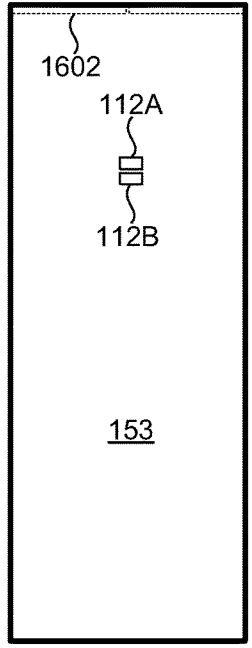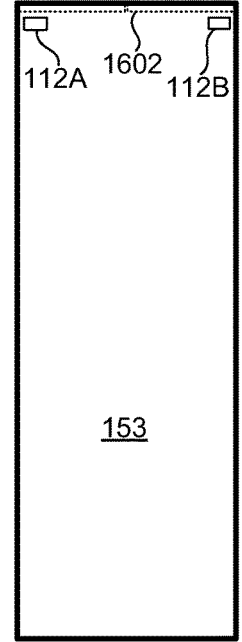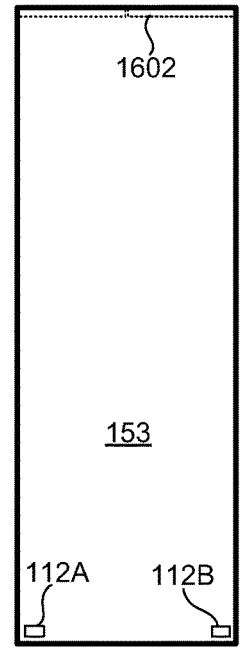

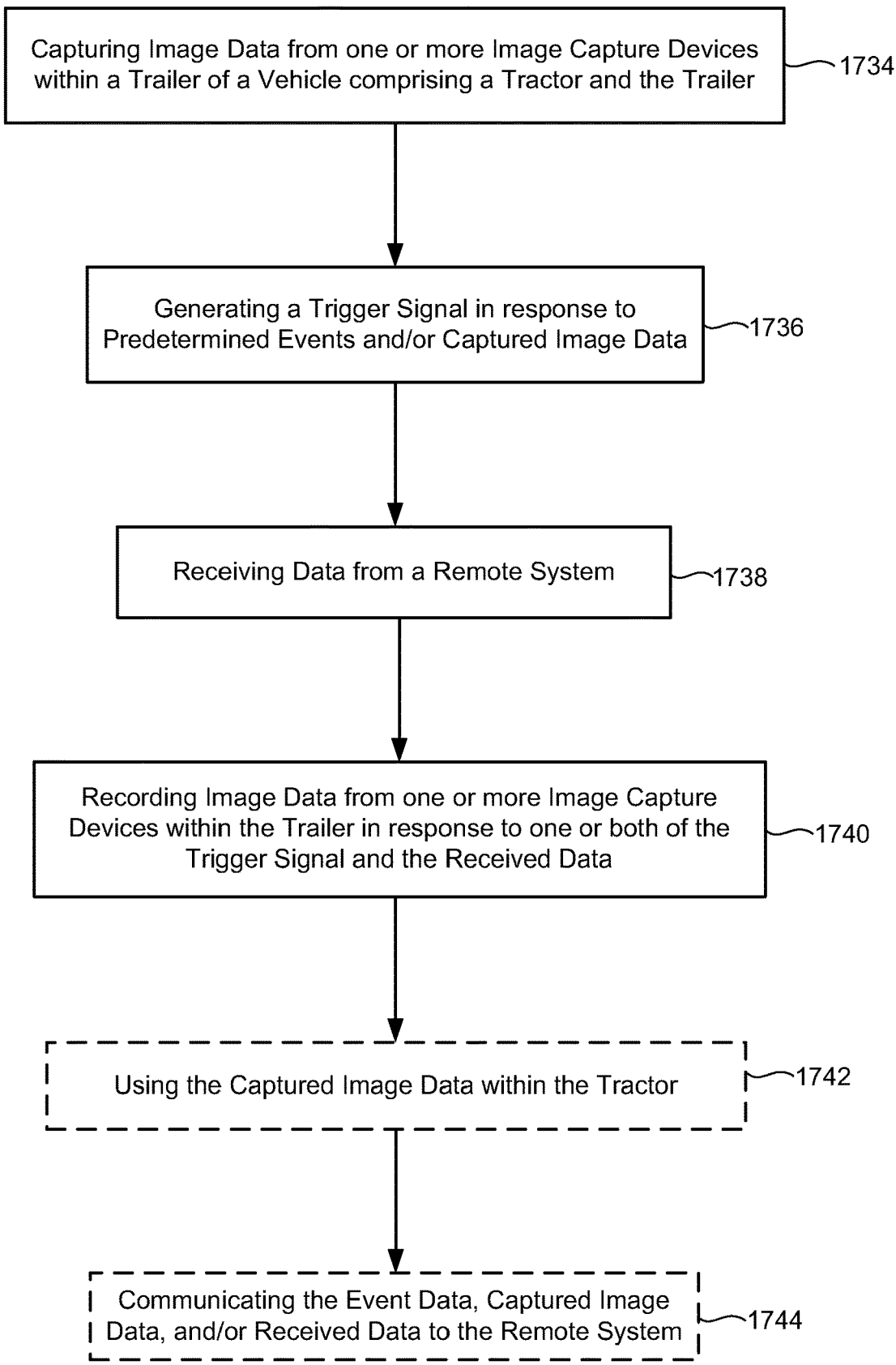

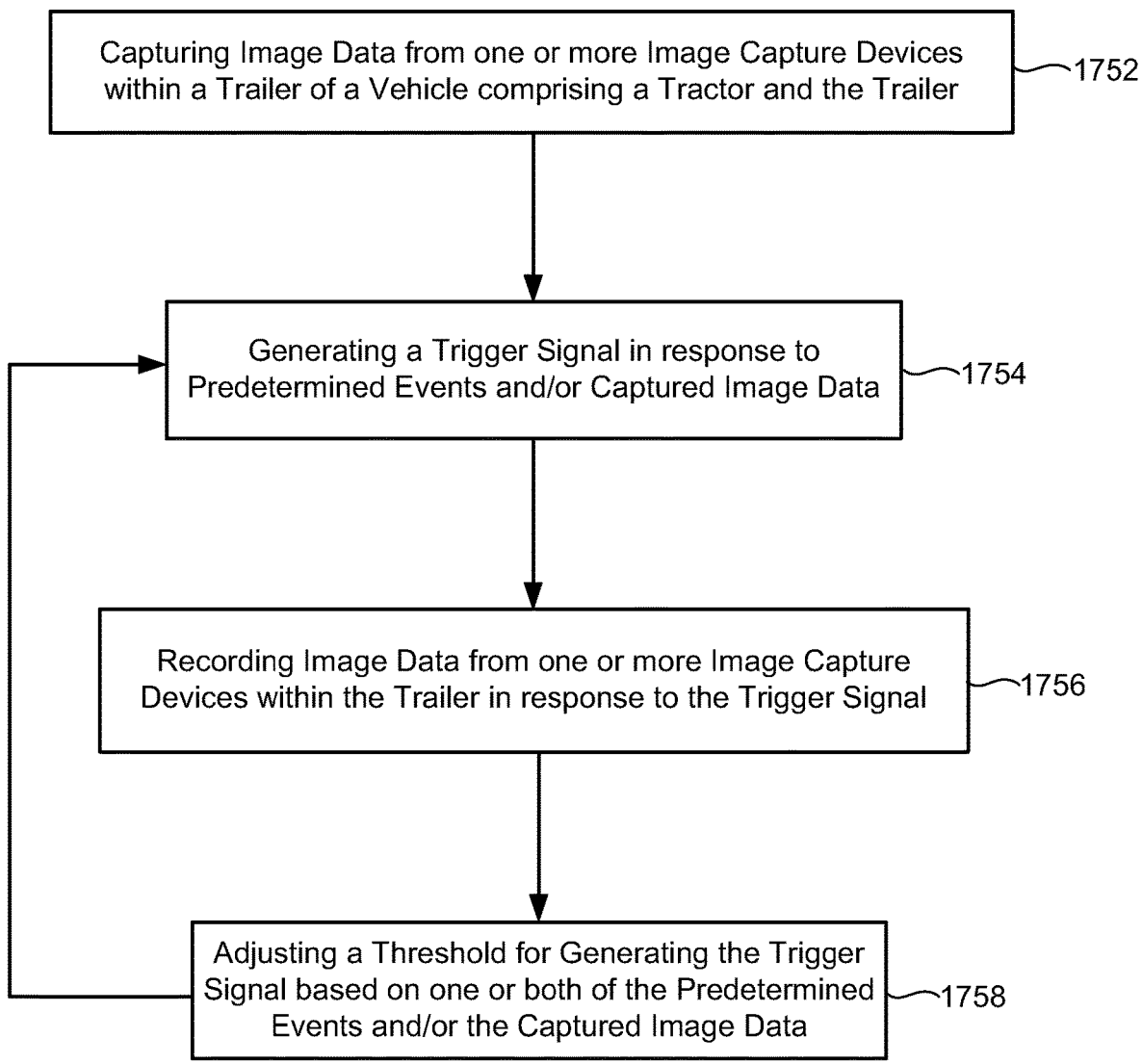

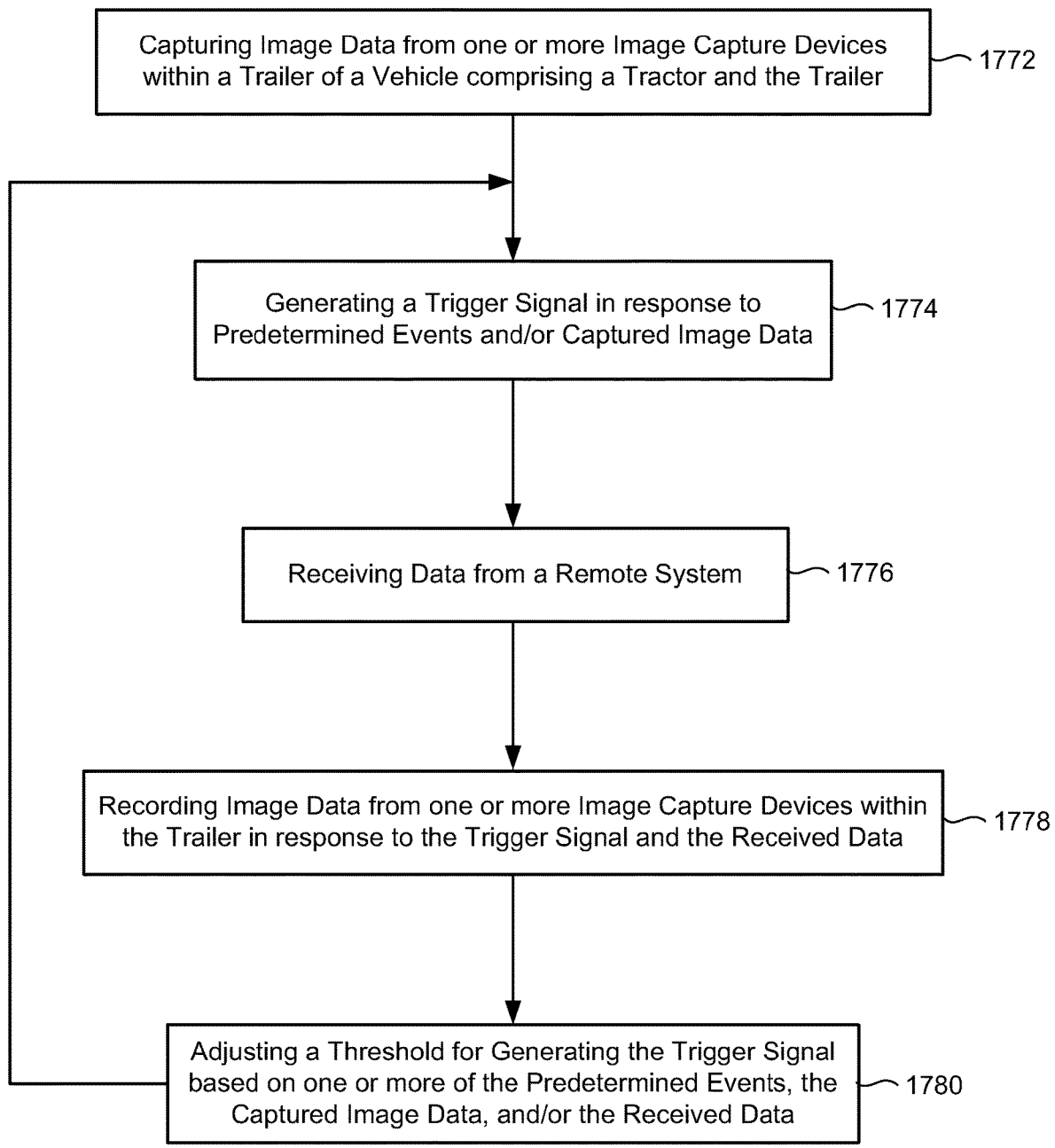

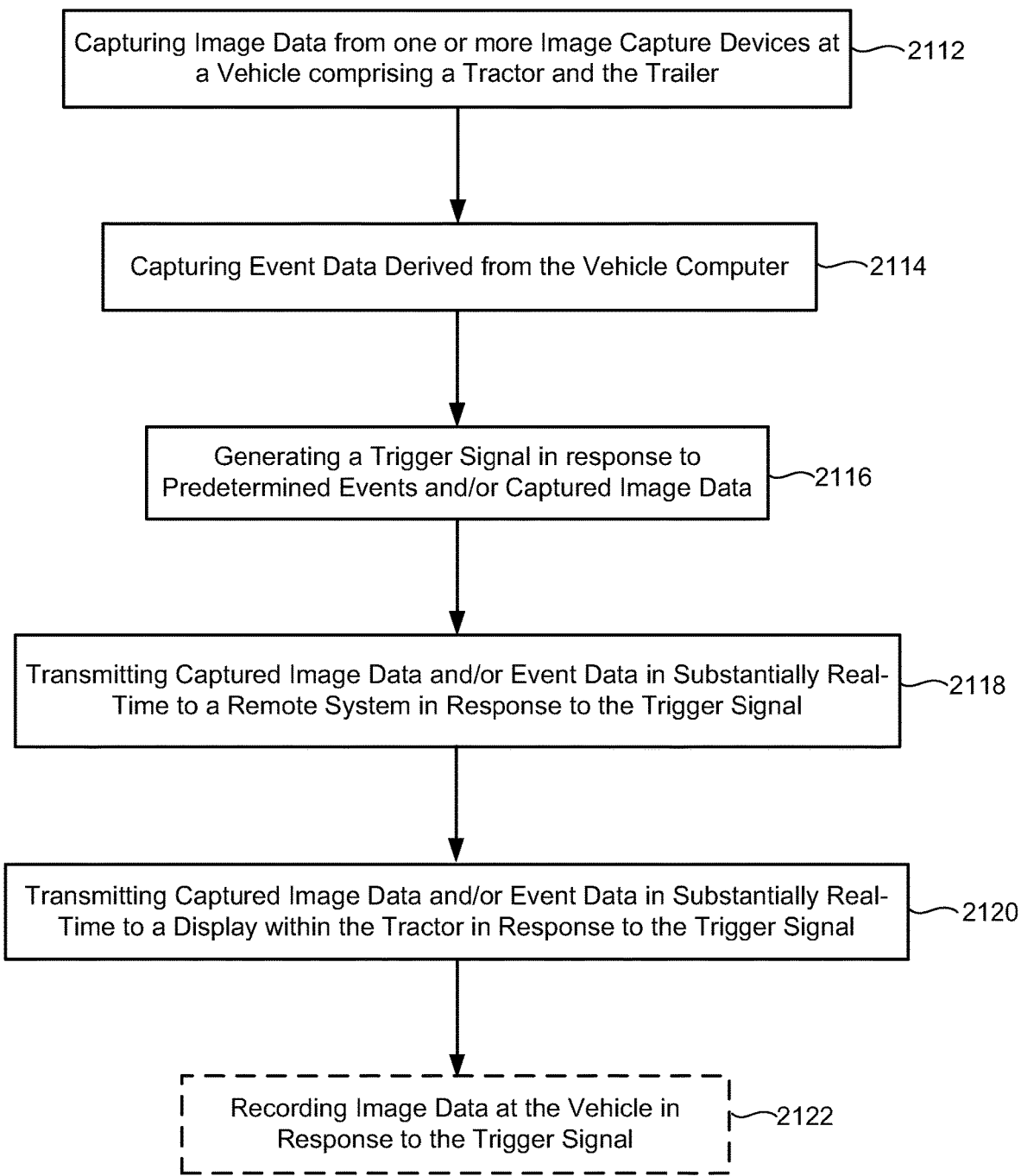

SYSTEM AND METHOD FOR MODIFYING ONBOARD EVENT DETECTION AND/OR IMAGE CAPTURE STRATEGY USING EXTERNAL SOURCE DATA

RELATED PATENT DOCUMENTS

This application claims the benefit of Provisional Patent Application Ser. Nos. 62/038,717, 62/038,720, 62/038,724, and 62/038,725 each filed on Aug. 18, 2014, to which priority is claimed pursuant to 35 U.S.C. § 119(e), and which are incorporated herein by reference in their respective entireties.

TECHNICAL FIELD

This application relates generally to devices, systems, and methods pertaining to image capture devices and other sensors deployed at a vehicle comprising a tractor and a trailer, and modifying one or both of an event detection strategy and an image capture strategy implemented by a computer on the vehicle in response to external source data.

SUMMARY

Embodiments are directed to a system for use on a vehicle comprising a tractor and a trailer. The system comprises an onboard computer configured to communicate with a computer of the vehicle and a central office. An event detector is coupled to the onboard computer and configured to generate a trigger signal in response to detecting an occurrence of predetermined events. One or more image capture devices are situated at the vehicle and communicatively coupled to the onboard computer. A media recorder is coupled to the one or more image capture devices. The onboard computer is configured to one or both of adjust an image capture strategy affecting the one or more image capture devices based at least in part on data received from the central office and modify one or more parameters of the event detector based at least in part on data received from the central office. The onboard computer is further configured to effect storing of image data on the media recorder received from the one or more image capture devices and storing of event data in a memory in response to the trigger signal.

Other embodiments are directed to a system for use on a vehicle comprising a tractor and a trailer. The system comprises a communications device configured to effect communications between the system and a remote system. The communications device is configured to receive data from the remote system. An event detector is configured to generate a trigger signal in response to detecting occurrence of predetermined events. An onboard computer is coupled to the communications device, the event detector, a media recorder, and a computer of the vehicle. One or more image capture devices are situated at the vehicle and communicatively coupled to one or both of the onboard computer and the media recorder. The onboard computer is configured to adjust one or more parameters of the image capture devices based at least in part on the data received from the remote system and/or modify one or more parameters of the event detector based at least in part on the data received from the remote system. The onboard computer is further configured to coordinate recording of image data on the media recorder and to store event data in response to the trigger signal.

Some embodiments are directed to a method for use on a vehicle comprising a tractor and a trailer. The method comprises detecting, via an event detector at the vehicle, occurrences of predetermined events impacting the vehicle or the driver during vehicle operation. The method also comprises recording image data acquired by one or more image capture devices at the vehicle in response to detecting a predetermined event by the event detector, and storing vehicle data associated with the detected event. The method further comprises adjusting an image capture strategy affecting the one or more image capture devices at least in part in response to data received from a source external to the vehicle, and/or modifying one or more parameters of the event detector based at least in part on data received from the external source.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIG. 4 is a block diagram of an apparatus for acquiring and processing image intelligence information and other data for a commercial vehicle having a trailer and modifying one or both of an event detection strategy and an image capture strategy implemented by an onboard computer in accordance with various embodiments;

FIG. 5 is a block diagram of an apparatus for acquiring and processing image intelligence information and other data for a commercial vehicle having a trailer and modifying one or both of an event detection strategy and an image capture strategy implemented by an onboard computer in accordance with various embodiments;

FIG. 7A is a flow chart showing various processes for modifying an image capture strategy implemented by an onboard computer of a commercial vehicle in accordance with various embodiments;

FIG. 7B is a flow chart showing various processes for modifying an event detection strategy implemented by an onboard event detector of a commercial vehicle in accordance with various embodiments;

FIGS. 16A-16H illustrate trailers equipped with image capture devices situated at different locations within the trailer of a commercial vehicle in accordance with various embodiments;

FIG. 17K is a flow chart showing various processes for implementing image intelligence for a trailer of a commercial vehicle and using data received from a remote system in accordance with various embodiments;

FIG. 17L is a flow chart showing various processes for implementing image intelligence and threshold adjustment for a trailer of a commercial vehicle in accordance with various embodiments;

FIG. 17N is a flow chart showing various processes for implementing image intelligence and threshold adjustment for a trailer of a commercial vehicle and using data received from a remote system in accordance with various embodiments;

FIG. 21C is a flow chart showing various processes for implementing real-time image intelligence transmission for a commercial vehicle having a trailer in accordance with various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
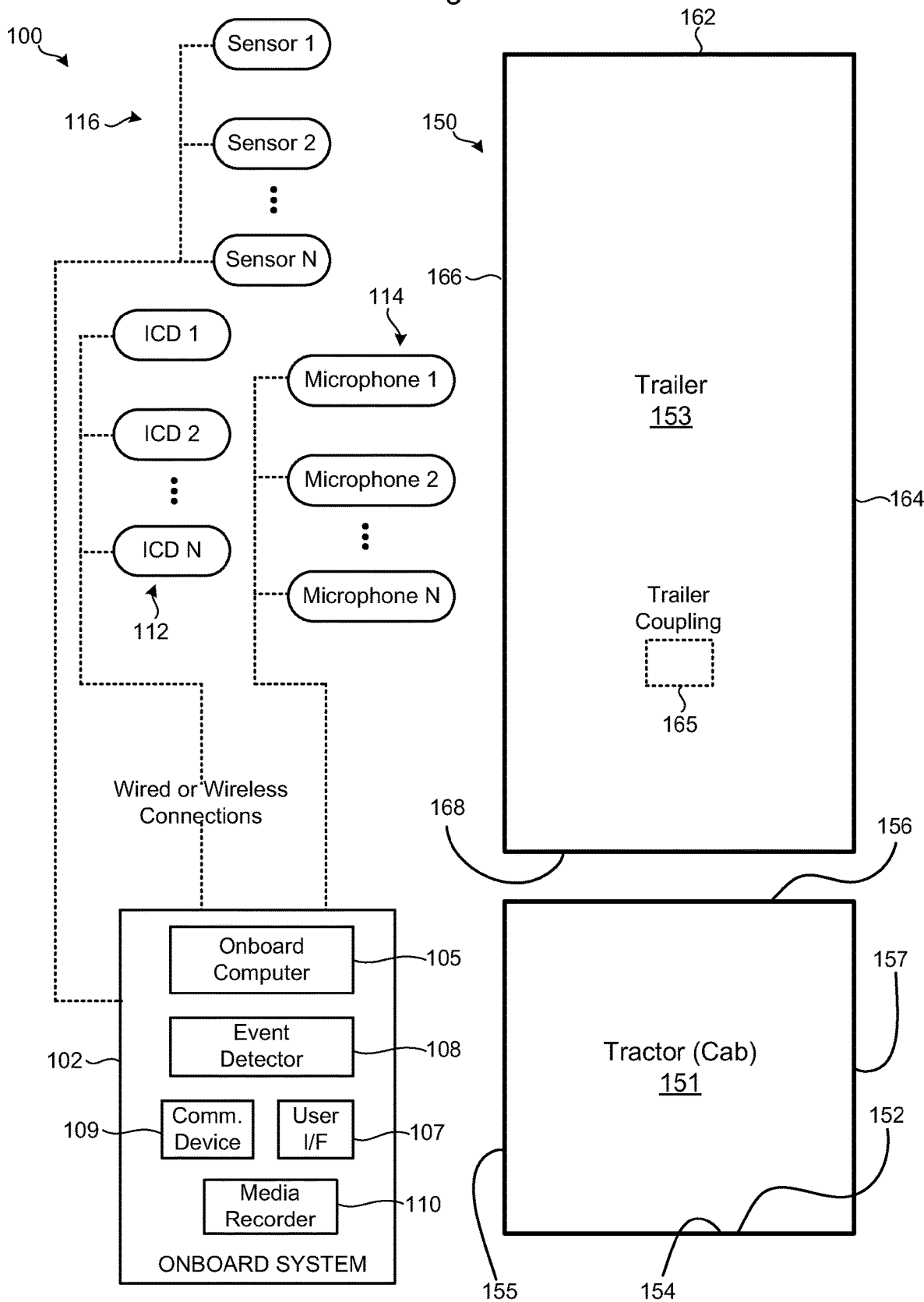
FIG. 1 is a block diagram of an apparatus for acquiring and processing image intelligence information and other data for a commercial vehicle having a trailer and modifying one or both of an event detection strategy and an image capture strategy implemented by an onboard computer in accordance with various embodiments.

FIG. 1 is a block diagram of an apparatus 100 for acquiring and processing image intelligence information and other data for a commercial vehicle 150, and for modifying one or both of an image capture strategy and an event detection strategy implemented by an onboard computer in accordance with various embodiments. Various embodiments described herein involve the use of images to enhance various aspects of vehicle operation and cargo transport. The images may comprise one or more of various types of images, including, but not limited to, still images, video, optical and/or laser scanned images, etc. The use of one or more of types of images to enhance vehicle operation, driver behavior, and/or to inform management of cargo and cargo vehicles is referred to herein as "image intelligence."

The apparatus 100 includes a tractor 151 and a trailer 153 on which various electronic components are respectively mounted. The electronic components include an onboard system 102 which is preferably mounted in the tractor 151 of the vehicle 150. The onboard system 102 is shown to include an onboard computer 105, an event detector 108, a user interface 107, a communication device 108, and a media recorder 110. Each of these components will be described in greater detail hereinbelow. The electronic components further include one or more image capture devices (ICDs) 112, one or more microphones 114, and one or more sensors 116. The image capture devices 112, microphones 114, and sensors 116 are communicatively coupled to the onboard system 102 via wired or wireless connections. It is understood that a given vehicle 150 may be equipped with some, but not necessarily all, of the data acquisition devices shown in FIG. 1 (i.e., image capture devices 112, microphones 114 and sensors 116), and that other data acquisition devices can be mounted to the vehicle 150.

Various embodiments are directed to systems and methods that utilize one or more image capture devices 112 deployed within the tractor 151, and trailer 153, or both the tractor 151 and trailer 153 of the vehicle 150. In addition to the image capture devices 112, the tractor 151 and/or trailer 153 can be equipped to include one or more of the sensors 116 and microphones 114. Various embodiments disclosed herein can include image capture devices 112 situated within the interior or on the exterior of the trailer 153, on the exterior of the tractor 151, and/or within the cab of the tractor 151. For example, the various data acquisition devices illustrated in FIG. 1 can be mounted at different locations in, on, and/or around the trailer 153 and tractor 151 of the vehicle 150. All locations on the interior and exterior surfaces of the trailer 153 and tractor 151 are contemplated.

By way of example, the trailer 153 can include any number of image capture devices 112 positioned in or on the various surfaces of the trailer 153. A single or multiple (e.g., stereoscopic) image capture devices 112 can be positioned on a rear surface 162 of the trailer 153, allowing for driver viewing in a rearward direction of the vehicle 150. One or more image capture devices 112 can be positioned on a left and a right side surface 164 and 166 of the trailer 153, allowing for driver viewing in a rearward and/or lateral direction of the vehicle 150. One or more image capture devices 112 may be positioned on the front surface of the trailer 153, such as at a lower position to facilitate viewing of the hitch area and hose/conduit connections between the trailer 153 and the tractor 151. An image capture device 112 may also be situated at or near the trailer coupling location 165 or at or near other locations along the lower surface of the trailer 153, such as near fuel hoses and other sensitive components of the trailer 153.

In some embodiments, the tractor 151 includes a cab in which one or more image capture devices 112 and optionally microphones 114 and sensors 116 are mounted. For example, one image capture device 112 can be mounted on the dashboard 152 or rearview mirror 154 (or elsewhere) and directed outwardly in a forward-looking direction to monitor the roadway ahead of the tractor 151. A second image capture device 112 can be mounted on the dashboard 152 or rearview mirror 154 (or elsewhere) and directed toward the driver and passenger within the cab of the tractor 151. In some implementations, the second image capture device 112 can be directed toward the driver, while a third image capture device 112 can be directed toward the passenger portion of the cab of the tractor 151.

The tractor 151 can include one or more exterior image capture devices 112, microphones 114, and/or sensors 116 according to various embodiments, such as an image capture device 112 mounted on a left side 157, a right side 155, and/or a rear side 156 of the tractor 151. The exterior image capture devices 112 can be mounted at the same or different heights relative to the top or bottom of the tractor 151. Moreover, more than one image capture device 112 can be mounted on the left side 157, right side 155 or rear side 156 of the tractor 151. For example, single or multiple (e.g., stereoscopic) left and right side image capture devices 112 can be mounted rearward of the left and/or right doors of the tractor 151 or, alternatively, the near or on the left and/or right side mirror assemblies of the tractor 151. A first rear image capture device 112 can be mounted high on the rear side 156 of the tractor 151, while a lower rear image capture device 112 can be mounted at or near the hitch area of the tractor 151.

Figure 2:
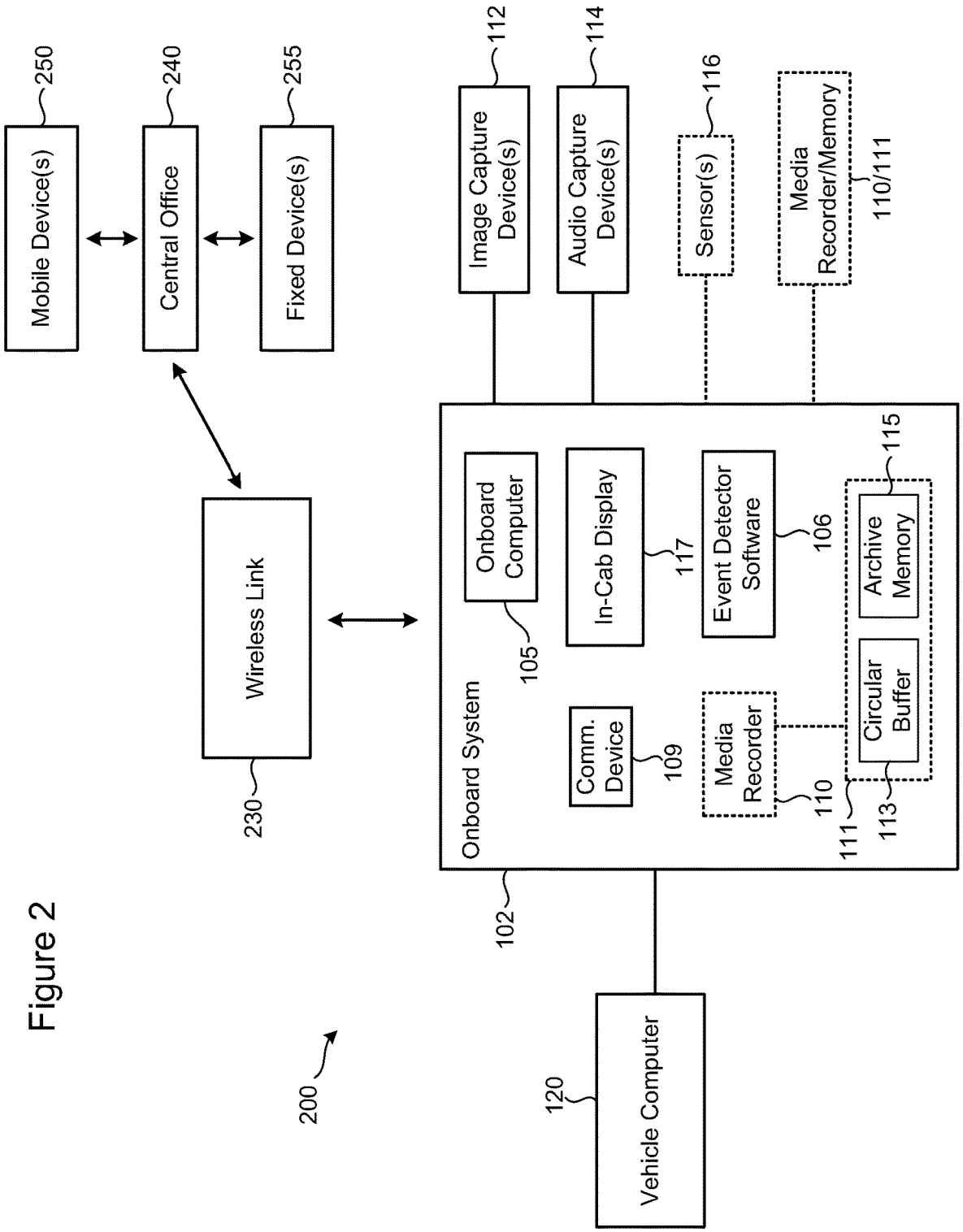
FIG. 2 is a block diagram of an apparatus for acquiring and processing image intelligence information and other data for a commercial vehicle having a trailer and modifying one or both of an event detection strategy and an image capture strategy implemented by an onboard computer in accordance with various embodiments.

FIG. 2 is a block diagram of a system 200 for acquiring and processing image intelligence information and other data, and for modifying one or both of an image capture strategy and an event detection strategy implemented by an onboard computer in accordance with various embodiments. According to the representative embodiment shown in FIG. 2, the system 200 includes an onboard system 102 which is provided at the vehicle. Among various components, the onboard system 102 includes an onboard computer 105 (a microprocessor, controller, reduced instruction set computer (RISC), or other central processing module), an in-cab display 117 which can be mounted in the vehicle cab (e.g., fixedly or as a removable handheld device such as a tablet), and Event Detector software 106 stored in a memory of the onboard system 102. The display 117 can be part of a user interface which may include, for example, a keypad, function buttons, joystick, scrolling mechanism (e.g., mouse, trackball), touch pad/screen, or other user entry mechanisms, as well as a speaker, tactile feedback, etc. The memory of the onboard system 102, which may be integral or coupled to a processor of the onboard computer 105, can store firmware, executable software, and algorithms, and may further comprise or be coupled to a subscriber interface module (SIM), wireless interface module (WIM), smart card, or other fixed or removable memory device/media.

The onboard system 102 is communicatively coupled to a vehicle computer 210, which is typically the information hub of the vehicle, and also to a central office 240 (e.g., remote system) via one or more communication links, such as a wireless link 230 via a communication device 108. The communication device 108 can be configured to facilitate over-the-air (OTA) programming and interrogation of the onboard system 102 by the central office 240 via the wireless link 230 and/or other links. Connectivity between the onboard system 102 and the central office 240 may involve a number of different communication links, including cellular, satellite, and land-based communication links. The central office 240 provides for connectivity between mobile devices 250 and/or fixed (e.g., desktop) devices 255 and one or more servers of the central office 240. The central office 240 can be an aggregation of communication and data servers, real-time cache servers, historical servers, etc. In one embodiment, the central office 240 includes a computing system that represents at least the communication/data servers and associated computing power needed to collect, aggregate, process and/or present the data, including image intelligence data, associated with vehicle events. The computing system of the central office 240 may be a single system or a distributed system, and may include media drives, such as hard and solid-state drives, CD-ROM drives, DVD drives, and other media capable of reading and/or storing information.

In some embodiments, the onboard system 102 incorporates a media recorder 110, such as a digital media recorder (DMR), a digital video recorder (DVR) or other media storage device. In other embodiments, the onboard system 102 is communicatively coupled to a separate media recorder 110 via an appropriate communication interface. The media recorder 110 can include one or more memories of the same or different technology. For example, the media recorder 110 can include one or a combination of solid-state (e.g., flash), hard disk drive, optical, and hybrid memory (combination of solid-state and disk memories). Memory of the media recorder 110 can be non-volatile memory (e.g., flash, magnetic, optical, NRAM, MRAM, RRAM or ReRAM, FRAM, EEPROM) or a combination of non-volatile and volatile (e.g., DRAM or SRAM) memory. Because the media recorder 110 is designed for use in a vehicle, the memory of the media recorder 110 is limited. As such, various memory management techniques, such as that described below, can be employed to capture and preserve meaningful event-based data.

The media recorder 110 is configured to receive and store at least image data, and preferably other forms of media including video, still photographic, audio, and data from one or more sensors (e.g., 3-D image data), among other forms of information. Data produced by one or more image capture devices 112 (still or video cameras), one or more audio capture devices 114 (microphones or other acoustic transducers), and one or more sensors 116 (radar, infrared sensor, RF sensor or ultrasound sensor) can be communicated to the onboard system 102 and stored in the media recorder 110 and/or memory 111.

In addition to storing various forms of media data, the media recorder 110 can be configured to cooperate with the onboard computer 105 or a separate processor to process the various forms of data generated in response to a detected event (e.g., sudden deceleration, user-initiated capture command). The various forms of event-related data stored on the media reorder 110 (and/or memory 111) can include video, still photography, audio, sensor data, and various forms of vehicle data acquired from the vehicle computer 120. In some implementations, the onboard computer 105 or other processor cooperates with the media recorder 110 to package disparate forms of event-related for transmission to the central office 240 via the wireless link 230. The disparate forms of data may be packaged using a variety of techniques, including techniques involving one or more of encoding, formatting, compressing, interleaving, and integrating the data in a common or separate file structures. Various embodiments regarding data packaging by the onboard system 102 are described hereinbelow.

It is noted that in some embodiments, the media recorder 110 is equipped (or is coupled to) its own cellular link separate from that used by the onboard system 102 (e.g., separate from the communication device 109). Use of a separate cellular link by the media recorder 110 allows for tailoring the link and the service plan specifically for image/video communication between the vehicle and the central office 240.

According to some embodiments, the memory of the media recorder or other memory 111 (optional) of the onboard system 102 is configured to manage media and other data using a loop memory or circular buffer management approach, whereby data can be acquired in real-time and overwritten with subsequently captured data. In response to a predetermined event, the data associated with the event (data stored prior to, during, and after a detected event) can be transferred from a circular buffer 113 to archive memory 115 within a memory 111 of the onboard system 102. The archive memory 115 is preferably sufficiently large to store data for a large number of events, and is preferably non-volatile, long-term memory. The circular buffer 113 and archive memory 115 can be of the same or different technology. Archived data can be transmitted from the archive memory 115 to the central office 240 using different transfer strategies.

For example, one approach can be based on lowest expected transmission cost, whereby transmission of archived data is delayed until such time as a reduced cost of data transmission can be realized, which can be based on one or more of location, time of day, carrier, required quality of service, and other factors. Another approach can be based on whether real-time (or near real-time) access to the onboard event data has been requested by the driver, the central office 240 or a client of the central office 240, in which case archive memory data is transmitted to the central office 240 as soon as possible, such as by using a data streaming technique. It is understood that the term "real-time" as used herein refers to as near to real-time as is practicable for a given operating scenario, and is interchangeable with the term "substantially in real-time" which explicitly acknowledges some degree of real-world latency in information transmission.

Figure 3A:
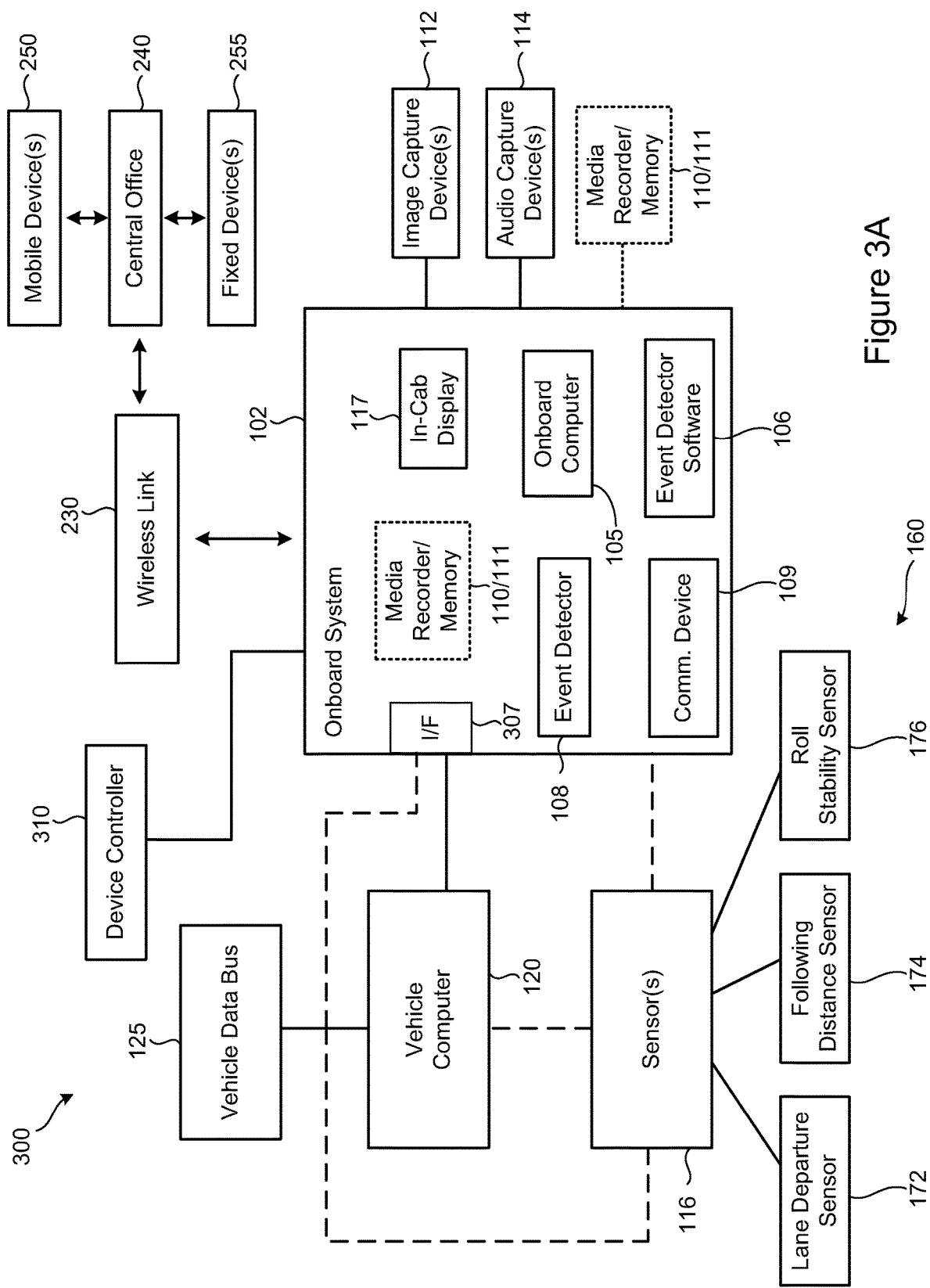
FIG. 3A is a block diagram of an apparatus for acquiring and processing image intelligence information and other data for a commercial vehicle having a trailer and modifying one or both of an event detection strategy and an image capture strategy implemented by an onboard computer in accordance with various embodiments.

FIG. 3A is a block diagram of a system 300 for acquiring and processing image intelligence information and other data, and for modifying one or both of an image capture strategy and an event detection strategy implemented by an onboard computer in accordance with various embodiments. In the representative embodiment shown in FIG. 3A, the system 300 includes an onboard system 102 communicatively coupled to a vehicle computer 120 via an interface 307 and to a central office 240 via a wireless link 230 (and possibly other links). The central office 240 is coupled to the onboard system 102 via a cellular link, satellite link and/or a land-based link, and can be communicatively coupled to various mobile entities 250 and fixed devices 255. The onboard system 102 includes an in-cab display 117, an onboard computer 105, Event Detector software 106, and a communications device 108. The onboard system 102 incorporates a media recorder 110 or, alternatively or in addition, is coupled to a separate media recorder 110 or memory system via an appropriate communication interface. In some embodiments, information acquired by the Event Detector software 106 is obtained from the vehicle computer 120 via the interface 307, while in other embodiments the onboard system 102 is coupled to the vehicle data bus 125 or to both the vehicle computer 120 and data bus 125, from which the needed information is acquired for the Event Detector software 106. In further embodiments, the Event Detector software 106 operates on data received from the central office 240, such as information stored in a transportation management system supported at or coupled to the central office 240.

According to the embodiment shown in FIG. 3A, a variety of vehicle sensors 160 are coupled to one or both of the onboard system 102 and/or the vehicle computer 120, such as via the vehicle data bus 125. A representative, non-exhaustive listing of useful vehicle sensors 160 include a lane departure sensor 172 (e.g., a lane departure warning and forward collision warning system), a following distance sensor 174 (e.g., a collision avoidance system), and a roll stability sensor 176 (e.g., an electronic stability control system). Representative lane departure warning and forward collision warning systems include Mobileye—5 Series, Takata—SAFETRAK, and Bendix—SAFETYDIRECT. Representative electronic stability control systems include Bendix—(ESP) Electronic Stability Program, and Meritor—(RSC) Roll Stability Control. Representative collision avoidance systems include Bendix—WINGMAN and Merito—ONGUARD. Each of these sensors 172, 174, 176 or sensor systems is respectively coupled to the vehicle computer 120 and/or the vehicle data bus 125. In some embodiments, one or more of the vehicle sensors 160 can be directly coupled to the onboard system 102.

A device controller 310 is shown coupled to the onboard system 102. According to some embodiments, the device controller 310 is configured to facilitate adjustment of one or more parameters of the image capture devices 112, the audio capture devices 114, and/or the sensors 116. In some embodiments, the device controller 310 facilitates user or automated adjustment of one or more parameters of the image capture devices 112, such as field of view, zoom, resolution, operating mode (e.g., normal vs. low-light modes), frame rate, and panning or device orientation, for example. The device controller 310 can receive signals generated at the vehicle (e.g., by a component or a driver of the vehicle), by the central office 240, or a client of the central office (e.g., mobile device 250 or fixed device 255).

In some embodiments, the device controller 310 is configured to receive a configuration or control signal from an external source, such as TMS or other remote system, and cooperate with the onboard computer 105 to adjust one or more parameters of the image capture devices 112 in accordance with a predetermined image capture strategy. In other embodiments, the device controller 310 is configured to receive a configuration or control signal from a user interface at the vehicle to facilitate adjustment of one or more parameters of the image capture devices 112 in accordance with a predetermined image capture strategy. In further embodiments, the device controller 310 is configured to receive a configuration or control signal from an external source, such as TMS or other remote system, or from a user interface at the vehicle to facilitate adjustment of one or more parameters of the image capture devices 112 in accordance with a predetermined image capture strategy.

Figure 3B:
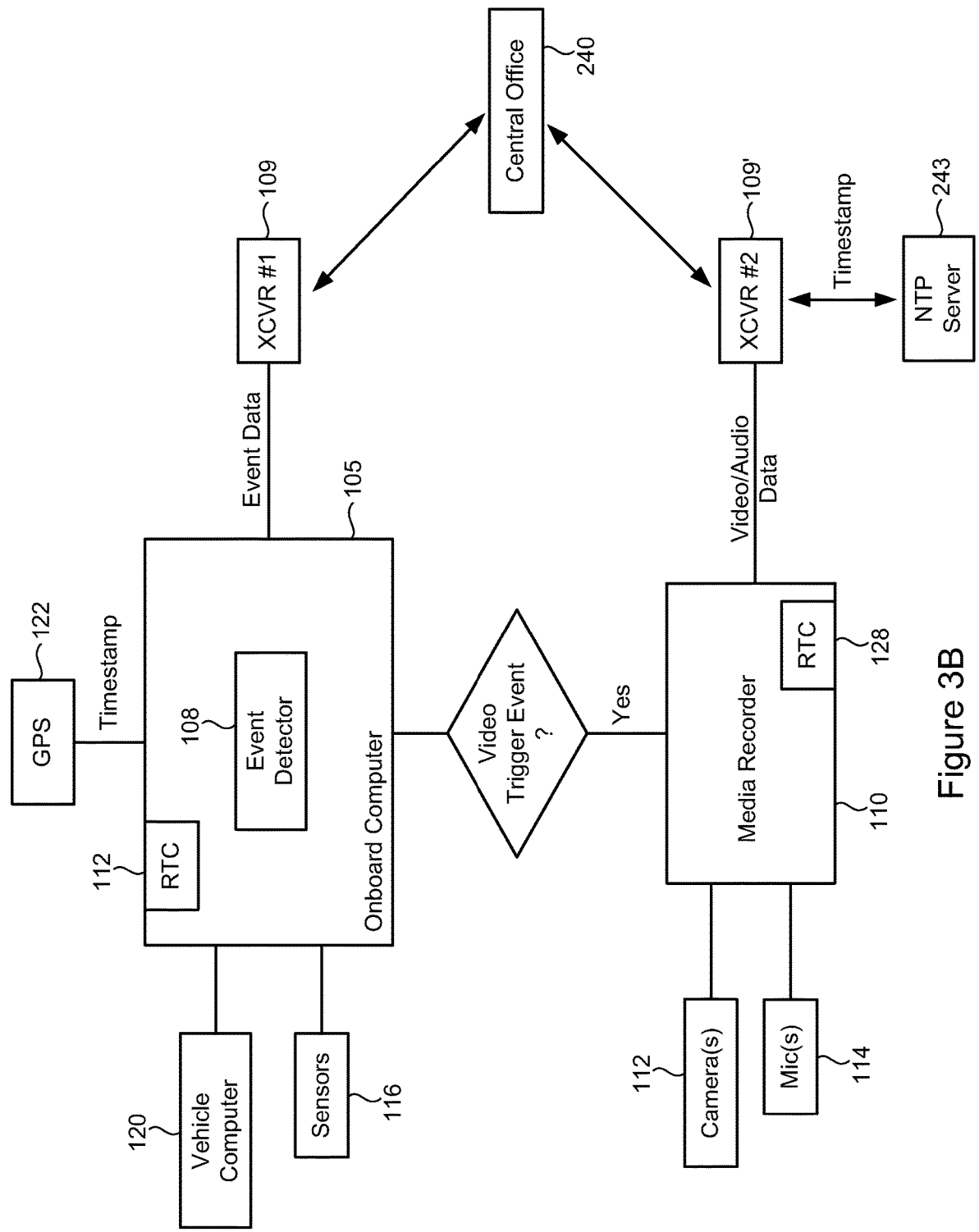
FIG. 3B is a block diagram of a system for communicating event data and video data from a commercial vehicle using separate transceivers in accordance with various embodiments.

Turning now to FIG. 3B, there is illustrated a block diagram of a system for communicating video data and event data for a commercial vehicle using separate transceivers in accordance with various embodiments. In the embodiment shown in FIG. 3B, an onboard computer 105 (or optionally a mobile gateway) is configured to communicate event data to a central office 240 via a first transceiver 109. A media recorder 110 is configured to communicate video (e.g., a video clip or a VLP) and optionally audio to the central office 240 via a second transceiver 109'. For example, the onboard computer 105 can include its own cellular radio 109 with its own SIM card and service plan. Likewise, the media recorder 110 can include its own cellular radio 109' with its own SIM card and service plan. Use of a separate cellular link by the media recorder 110 allows for tailoring the link and service plan specifically for image/video communication between the vehicle and the central office 240.

In the embodiment shown in FIG. 3B, the onboard computer 105 is coupled to a vehicle computer 120 and one or more sensors 116. The onboard computer 105 includes an event detector 108 and a real-time clock (RTC) 112. The media recorder 110 is shown coupled to one or more cameras 112 and optionally to one or more microphones 114. The media recorder 110 includes an RTC 128. The RTC 112 of the onboard computer 105 is updated on a regular basis using timestamp data produced by a GPS sensor 122. For example, the RTC 112 can be updated every 5, 10 or 15 minutes (e.g., a configurable time interval) using the GPS sensor timestamp. The media recorder 110 updates its RTC 128 by synchronizing to timestamp data received from a Network Time Protocol (NTP) server 243. The NTP server 243 is accessed by the media recorder 110 via transceiver 109'. The media recorder 110 can update its RTC 128 using the NTP server timestamp periodically, such as every 5, 10, or 15 minutes (e.g., a configurable time interval), for example. The frequency of RTC updating by the onboard computer 105 and the media recorder 110 can be selected to achieve a desired degree of time base accuracy. It is noted that the onboard computer 105 can also update its RTC 112 using timestamp data received from an NTP server 243 rather than from the GPS sensor 122 (e.g., at times when the GPS sensor is out of satellite range).

An important consideration when communicating event and video data via separate transceivers is time synchronization. Because event data is communicated through a cellular link separate from that used to communicate the video data, proper time synchronization is required so that event and video data associated with a specific vehicle event can be properly associated at the central office 240. Because the RTCs 112 and 128 are frequently updated using highly accurate time bases (e.g., NTS server, GPS sensor), the timestamps included with the event data and the video data for a given event can be synchronized at the central office 240 with high accuracy. The central office 240 can rely on the accuracy of the event data and video data timestamps when associating the disparate data acquired from the two transceivers 109 and 109'.

FIG. 4 is a system block diagram showing various components of a system for acquiring and processing image intelligence information and other data, and modifying one or both of an image capture strategy and an event detection strategy implemented by an onboard computer in accordance with various embodiments. The representative system shown in FIG. 4 includes a vehicle 402, a central office 440 (e.g., a remote system), a TMS 450 supported at or communicatively coupled to the central office 440, and one or more remote entities 460 that can gain access to the central office 440. The vehicle 402 includes a vehicle computer 104 which is typically installed and programmed by the manufacturer of the vehicle 402. The vehicle 402 also includes an onboard system 102, which is typically installed in the vehicle 402 after manufacturing. The onboard system 102 includes a number of components, including an onboard computer or processor 105, an event detector 108, a media record 110, and a communication device 109. The communication device 109 includes a wireless transceiver configured to communicate with the central office 440 via one or more networks. The onboard computer 105 includes an interface to communicate with the vehicle computer 104, typically over a communication bus of the vehicle computer 104 or vehicle network.

According to various embodiments, the event detector 108 includes a trip recorder 410. The trip recorder 410 may be implemented as a software program executable by the onboard computer 105. In some embodiments, the trip recorder 410 collects various types of data, and compares the collected data with various thresholds or templates (e.g., image template) to determine if a vehicle event has occurred. For example, the trip recorder can collect one or more of vehicle data 422 from the vehicle computer 104, sensor data 424 from one or more vehicle sensors, image and audio data from one or more image and audio capture devices 112, 114, and TMS data 426 acquired from TMS 450.

In some embodiments, data acquired by the trip recorder 410 is collected in a bolus every n seconds (e.g., every 2 seconds in 2 second breadcrumbs). The event detector 108 analyzes the data acquired by the trip recorder 410 for possible violation of one or more predetermined event parameter violations. In some embodiments, data acquired by the trip recorder 410 is communicated wirelessly to the central office 440 in 2 second breadcrumbs and on a continuous basis, assuming presence of a reliable communication link. Image data can be communicated as breadcrumbs at the same rate as other data or at a different rate (e.g., less frequently), due to the greater size of image files. Image files are preferably compressed to reduce image file size. In cases where a reliable connection link is not established, the trip recorder data is buffered at the vehicle and transmitted to the central office 440 when communication is reestablished with the central office 440. The central office 440 may be configured to operate on the trip recorder data for a variety of purposes.

The vehicle data 422 collected by the trip recorder 410 can include sudden acceleration, sudden deceleration, vehicle fault codes (safety related codes, codes indicative of onerous repair costs), shifting behavior data (engine RPM versus speed for evaluating shifting behavior), and electronic driver log data. Other vehicle can be collected by the trip recorder 410, including vehicle electronic control module (ECM) data (e.g., ECM emissions, fuel, air, speed, fluid pressures, and temperatures) and vehicle fault codes. The sensor data collected by the trip recorder 410 can include roll stability, lane departure, following distance, tire pressure and tire pressure exception data, refrigeration system (e.g., fuel, temperature), trailer information system, seatbelt usage, ambient temperature, GPS, heading, and date/time. Video and still image data from one or more image capture devices 112 and audio data from one or more audio capture devices 114 can be collected by the trip recorder 410. Various types of TMS data 426 can be collected by the trip recorder 410 (or other device in the vehicle 402), including driver ID and certification data, driver HOS status and CSA scoring data, cargo or load information (e.g., hazmat data, value, weight, volume, special handling requirements), route and mapping information (e.g., bridge clearance, hazmat restrictions, road conditions), fuel stop scheduling, fuel levels, vehicle maintenance and equipment information, VIN, ambient temperature, fault codes, and vehicle location (latitude/longitude).

Thresholds for each of these representative event parameters can be established and/or modified by an authorized user of the onboard system 102, such as a fleet owner, during system installation and/or during operation by way of the central office 440. The event detector 108 can be configured to analyze the various vehicle computer data, sensor data, image and audio data, TMS data, and other data to determine if a threshold associated with any of the predetermined established event parameters has been exceeded. If so, the event detector 108 declares an event violation and, in response, vehicle alert data is transmitted from the onboard system 102 to one or both of an output device in the cab (e.g., display, lights, speaker, vibratory element) and the central office 440 via the communications device 114. The vehicle alert data can include a variety of data surrounding the vehicle event, for example, a predetermined amount of data prior to and after the declared vehicle event can be collected and transmitted as vehicle alert data to the central office 440. In one embodiment, 90 seconds worth of vehicle and/or sensor data is collected (e.g., in 2 second breadcrumbs) prior to a detected vehicle event, and 30 seconds worth of vehicle and/or sensor data is collected (e.g., in 2 second breadcrumbs) after the detected vehicle event. It is understood that the collected data includes data produced during the vehicle event.

The data collected during and surrounding a detected vehicle event can be analyzed by the central office 440 to produce a myriad of output. The central office 440 can be configured to generate various output data based on the collected vehicle event data and other data available in the central office 440, such as TMS data. The central office 440 can, for example, produce detailed event data, various graphs and maps, electronic driver log data, driver history information, vehicle history information, hours of service (HOS) data, cargo or load data, routing data, fuel stop data, bridge clearance and road data, and traffic data. Some or all of this data can be requested by an authorized remote entity 460, and transmitted to a mobile device or other electronic device associated with the authorized remote entity 460.

FIG. 5 is a diagrammatic view of a vehicle information system with which various embodiments of the disclosure are particularly applicable. As illustrated in FIG. 5, a fleet of vehicles may include various types of commercial vehicles 510 moving through different predetermined regions of a city, state or the country. Each of the vehicles 510 is configured to communicate wirelessly with a central office 540 (e.g., central server). As used herein, references to a central center, data center or other similar reference, do not imply that the entity is necessarily a single facility, although it may be. While the vehicles illustrated in FIG. 5 are depicted as trucks, other vehicles that traverse cellular areas or other wireless communication areas may alternatively or additionally be equipped with communication devices. The vehicles may be, for example, trucks, cars, buses, motorcycles or other vehicles that include the relevant communication capability. Thus, it should be recognized that references to any one or more of the vehicle types is not intended to limit the particular description to the particular type of vehicle unless specifically noted as such.

Communication between each vehicle 510 and the central office 540 is predominately effected over-the-air (OTA) using any of a variety of wireless communication technologies. Wireless communication can take the form of cellular communication, such as known CDMA technology, global system for mobile communications (GSM) technology, worldwide interoperability for microwave access (WiMax) technology, Wi-Fi® or any other suitable technology now known or later developed. Additionally, vehicle event data may be communicated between the individual vehicles 510 and the central office 540 using a cellular data channel or via a messaging channel, such as one used to support SMS messaging (i.e. a text message).

According to various embodiments, the vehicles 510 are equipped with an onboard computing device which includes a cellular transceiver that communicates wirelessly across multiple wireless carriers 520. Typically, these carriers 520 may include, for example, providers of CDMA, TDMA, analog, satellite, etc. The communications traverse multiple backbone networks 530 before reaching one or more servers 540 of the central office. Database(s) associated with the servers 540 are populated with at least vehicle event data, and may further include geographical location and time data associated with each vehicle event (e.g., location and time for each vehicle event that resulted in a vehicle event being declared). These data are aggregated and processed when received at the servers 540 and made available for long-term storage. Aggregated data may be converted into, for example, views, reports, graphs, charts maps, and paging setups for consumption by authorized end users 550, such as a fleet manager or supervisor who is responsible for a predetermined region within which a vehicle event occurred.

Embodiments of an image intelligence information system and methodology for transmitting image intelligence information substantially in real-time to a remote system can be implemented in a wide variety of existing and future fleet management systems, such as those described in commonly owned U.S. Pat. No. 8,442,555, US Published Patent Application No. 2012/0194679, and U.S. application Ser. No. 14/061,371, filed Oct. 23, 2013, and Ser. No. 14/066,590, filed Oct. 29, 2013, all of which are incorporated herein in their respective entireties.

According to some embodiments, a mobile gateway unit can be implemented at the onboard system. A mobile gateway provides a wireless access point (e.g., Wi-Fi hotspot) and a server that provides sensor, image capture, and other data via a network server. This server runs locally on the vehicle, and may utilize a known data access protocol, such as Hypertext Transport Protocol (HTTP). In this way, a commodity user device such as smartphone or tablet can be used to access the vehicle data and other fleet management-type data. This can reduce costs and leverage the development and improvements in general-purpose consumer and/or commercial mobile devices. For example, features such as voice recognition, biometric authentication, multiple applications and protocol compatibility, are available "out-of-the-box" with modern mobile devices, and these features can be useful for in-cab applications.

The mobile gateway serves generally as a data collection and disbursement device, and may include special- or general-purpose computing hardware, such as a processor, a memory, and input/output (I/O) circuitry. In some embodiments, the event recorder of the onboard system can be wirelessly coupled to the mobile gateway, such as via WiFi® or Bluetooth®. The mobile gateway can also include a sensor interface that may be coupled to external data gathering components such as sensor controller, one or more image capture devices, add-on sensors, microphones, among others. The sensor interface may include data transfer interfaces such as serial port (e.g., RS-232, RS-422, etc.), Ethernet, Universal Serial Bus (USB), FireWire, etc.

The sensor controller coupled to the mobile gateway may be configured to read data from vehicle type busses, such as Controller Area Network (CAN). Generally, CAN is a message-based protocol that couples nodes to a common data bus. The nodes utilize bit-wise arbitration to determine which node has priority to transmit onto the bus. Various embodiments need not be limited to CAN busses; the sensor controller (or other sensor controllers) can be used to read data from other types sensor coupling standards, such as power-line communication, IP networking (e.g., Universal Plug and Play), I²C bus, Serial Peripheral Interface (SPI) bus, vehicle computer interface, etc. The sensor controller may be external to the mobile gateway, or it may be incorporated within the mobile gateway, e.g., integrated with main board and/or as an expansion board/module.

In addition to providing data sources, the mobile gateway can employ a publish/subscribe model, which also allows for flexible and extendable views of the data to vehicle occupants (e.g., such as via a user device). The mobile gateway can include a readily-available proximity radio that may use standards such as Wi-Fi® or Bluetooth®. The proximity radio may provide general-purpose Internet access to the user device, e.g., by routing data packets via the wireless network used to communicate with a cloud gateway. A server component can provide local content (e.g., content produced within the mobile gateway) to the user device over the proximity radio via well-known protocols, such as HTTP, HTTPS, Real-Time Streaming Protocol (RTSP), File Transfer Protocol (FTP), Simple Mail Transfer Protocol (SMTP), etc. A commercially available application such as a browser or media player running on the user device can utilize the services of the server component without any customization of the user device. Embodiments of the present disclosure can be implemented to include a mobile gateway facility and functionality as disclosed in the following commonly owned U.S. Provisional Patent Applications: U.S. Provisional Patent Application Ser. 62/038,611 filed Aug. 18, 2014; U.S. Provisional Patent Application Ser. 62/038,592 filed Aug. 18, 2014; and U.S. Provisional Patent Application Ser. 62/038,615 filed Aug. 18, 2014, each of which is incorporated herein by reference in its respective entirety.

Figure 6A:
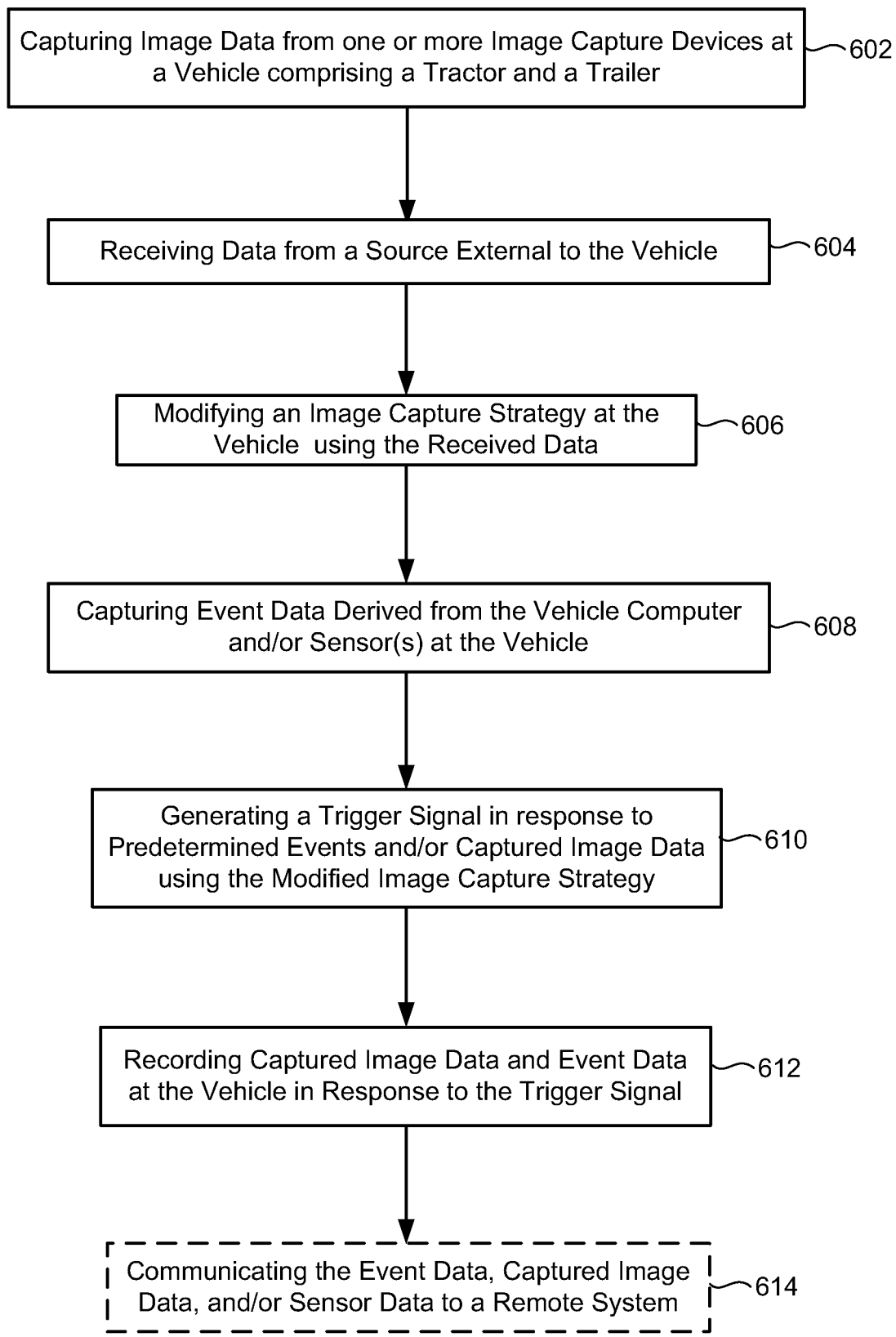
FIG. 6A is a flow chart showing various processes for modifying an image capture strategy implemented by an onboard computer of a commercial vehicle in accordance with various embodiments.

Turning now to FIG. 6A, there is illustrated a flow chart showing various processes for implementing image capture strategy modification using image intelligence for a commercial vehicle having a trailer in accordance with various embodiments. The methodology shown in FIG. 6A involves capturing 602 image data from one or more image capture devices at a vehicle comprising a tractor and a trailer. The methodology involves receiving 604 data from a source external to the vehicle, and modifying 606 an onboard image capture strategy for the vehicle using the received data. The methodology also involves capturing 608 event data derived from the vehicle computer and/or one or more sensors at the vehicle, and generating 610 a trigger signal in response to predetermined events and/or captured image data using the modified image capture strategy. The methodology further involves recording 612 captured image data and event data at the vehicle in response to the trigger signal, and optionally involves communicating 614 the event data, captured image data, and/or sensor data to a remote system.

Figure 6B:
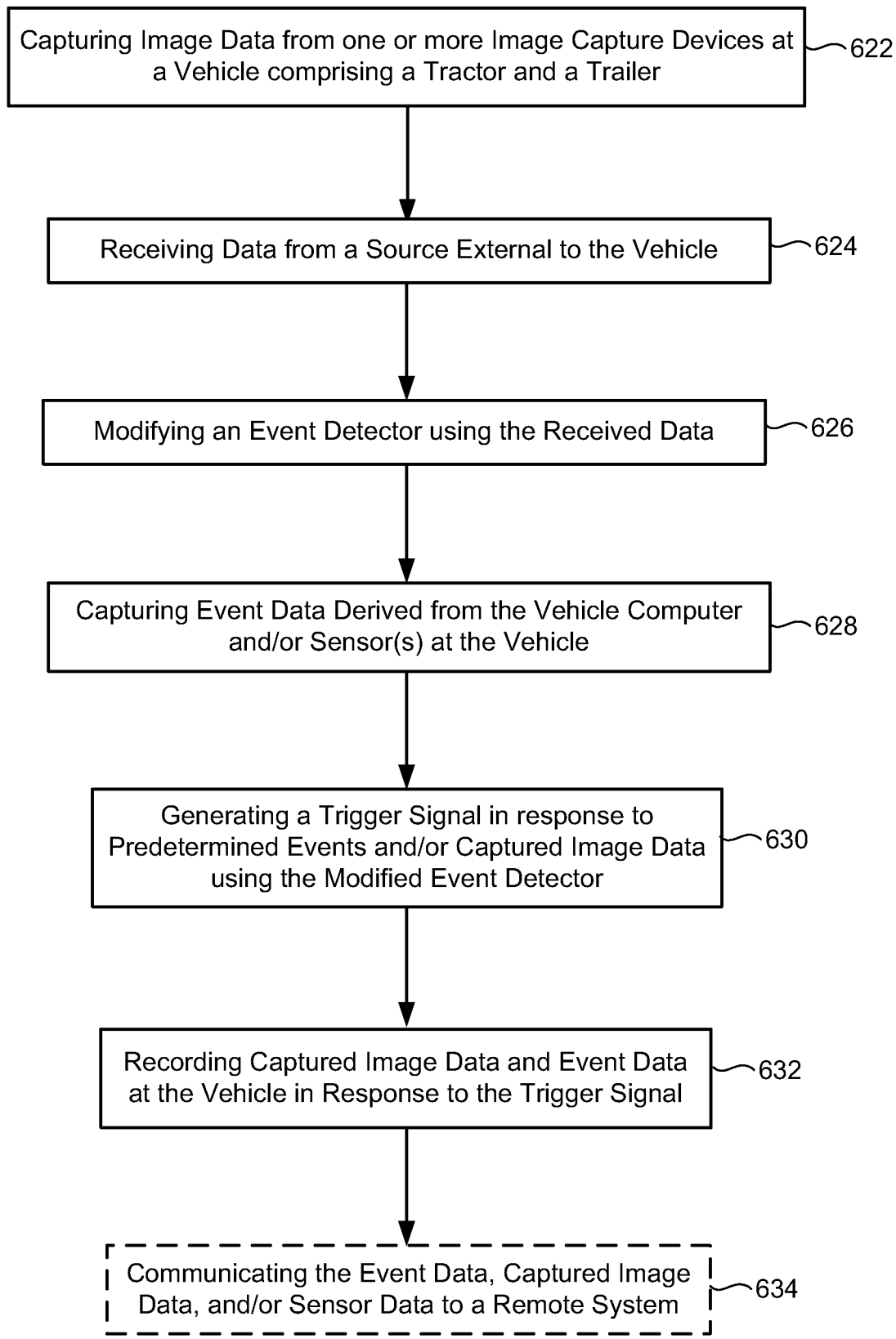
FIG. 6B is a flow chart showing various processes for modifying an event detection strategy implemented by an onboard event detector of a commercial vehicle in accordance with various embodiments.

Turning now to FIG. 6B, there is illustrated a flow chart showing various processes for implementing event detection modification using image intelligence for a commercial vehicle having a trailer in accordance with various embodiments. The methodology shown in FIG. 6B involves capturing 622 image data from one or more image capture devices at a vehicle comprising a tractor and a trailer. The methodology involves receiving 624 data from a source external to the vehicle, and modifying 626 an onboard event detector using the received data. The methodology also involves capturing 628 event data derived from the vehicle computer and/or one or more sensors at the vehicle, and generating 630 a trigger signal in response to predetermined events and/or captured image data using the modified event detector. The methodology further involves recording 632 captured image data and event data at the vehicle in response to the trigger signal, and optionally involves communicating 634 the event data, captured image data, and/or sensor data to a remote system. It is understood that the processes of FIGS. 6A and 6B can be implemented alone or in combination.

FIG. 7A is a flow chart showing various processes for implementing image capture strategy modification using image intelligence for a commercial vehicle having a trailer in accordance with various embodiments. The methodology shown in FIG. 7A involves capturing 702 image data from one or more image capture devices at a vehicle comprising a tractor and a trailer, and receiving 704 data from a remote transportation management system (TMS). The methodology also involves modifying 706 one or more parameters of an onboard event detector using the TMS data, capturing 708 event data derived from the vehicle computer and/or one or more sensors at the vehicle, and generating 710 a trigger signal in response to predetermined events and/or captured image data using the modified image capture strategy. The methodology further involves recording 712 captured image data and event data at the vehicle in response to the trigger signal, and optionally involves communicating 714 the event data, captured image data, and/or sensor data to the TMS.

FIG. 7B is a flow chart showing various processes for implementing event detection modification using image intelligence for a commercial vehicle having a trailer in accordance with various embodiments. The methodology shown in FIG. 7B involves capturing 722 image data from one or more image capture devices at a vehicle comprising a tractor and a trailer, and receiving 724 data from a remote transportation management system (TMS). The methodology also involves modifying 726 one or more parameters of an onboard event detector using the TMS data, capturing 728 event data derived from the vehicle computer and/or one or more sensors at the vehicle, and generating 730 a trigger signal in response to predetermined events and/or captured image data using the modified event detector. The methodology further involves recording 732 captured image data and event data at the vehicle in response to the trigger signal, and optionally involves communicating 734 the event data, captured image data, and/or sensor data to the TMS. It is understood that the processes of FIGS. 7A and 7B can be implemented alone or in combination.

Figure 8A:
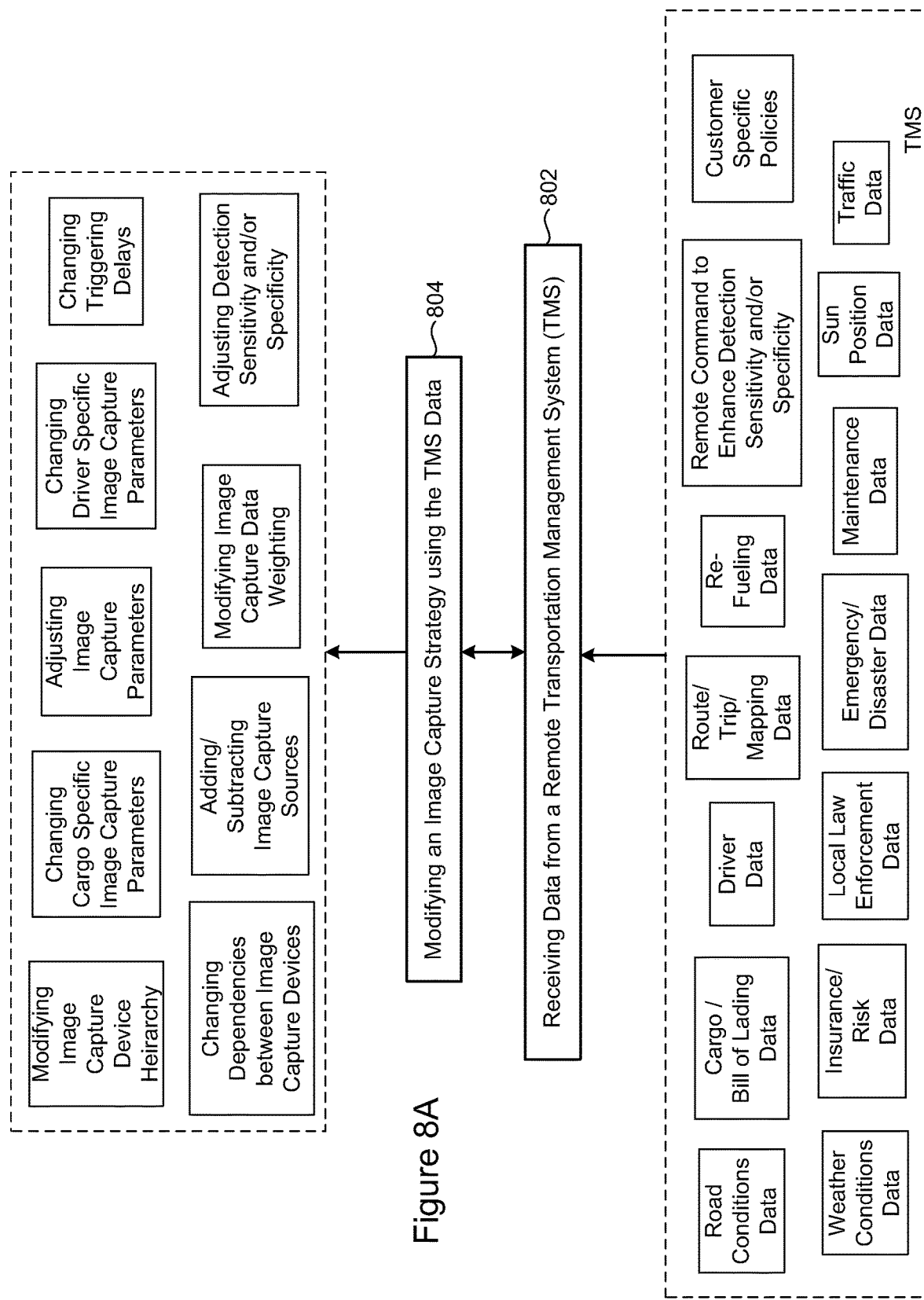
FIG. 8A is a flow chart showing various processes for modifying an image capture strategy implemented by an onboard computer of a commercial vehicle in accordance with various embodiments.
Figure 8B:
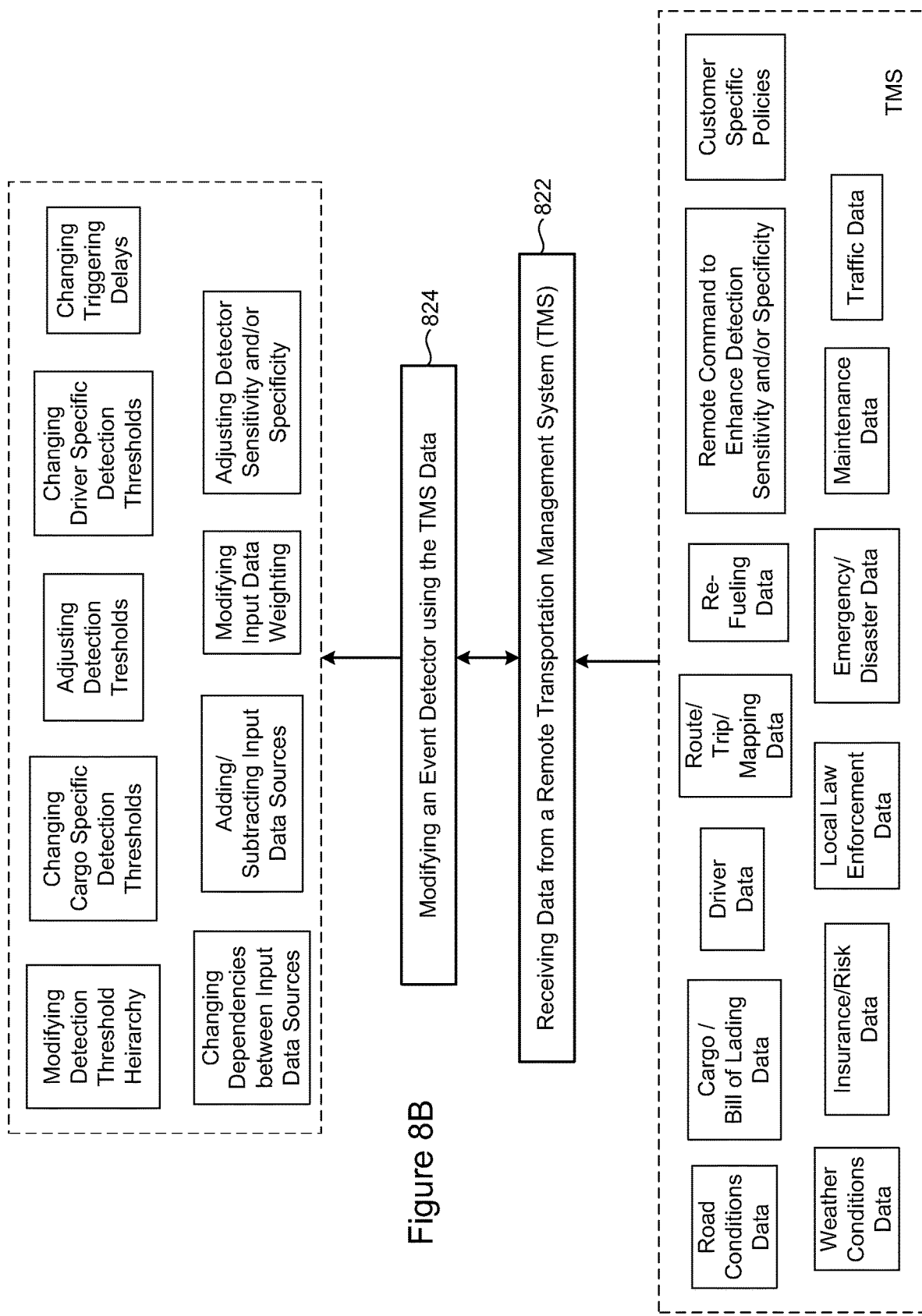
FIG. 8B is a flow chart showing various processes for modifying an event detection strategy implemented by an onboard event detector of a commercial vehicle in accordance with various embodiments.

FIG. 8A is a flow chart showing various processes for modifying an image capture strategy using data acquired from a TMS in accordance with various embodiments. FIG. 8B is a flow chart showing various processes for modifying an event detection strategy using data acquired from a TMS in accordance with various embodiments. The processes illustrated in FIG. 8A involve receiving 802 data from a remote TMS and modifying 804 one or more parameters of an image capture strategy using the TMS data. Modifying an image capture strategy for a particular vehicle can involve one or a combination of modifying one or more parameters of particular image capture devices, one or more parameters affecting collection of image capture data, and one or more parameters affecting detection of events using image capture data acquired at the vehicle. The processes shown in FIG. 8B involve receiving 822 data from a remote TMS and modifying 824 an event detector using the TMS data. The processes shown in FIGS. 8A and 8B can involve receiving 802/822 data from a remote TMS and modifying 804/824 both an image capture strategy and an event detector using the TMS data.

The various types of TMS data shown in FIGS. 8A and 8B are provided as non-limiting representative examples of useful information that can be transferred from a remote system, such as a TMS, to an onboard video telematics system for purposes of modifying one or both of an image capture strategy and an event detection strategy implemented by an onboard computer of a commercial vehicle. The representative examples of TMS data shown in FIGS. 8A and 8B include data about road conditions, traffic conditions, sun conditions (e.g., sun position, daytime vs. nighttime), and weather conditions (e.g., ice, hail, tornadoes, downpours, flooding, high winds) impacting the vehicle. Data concerning the cargo and/or bill of lading as well as data concerning the specific driver of the vehicle can be transferred from the TMS to the onboard video telematics system. Data about the route and/or trip (e.g., mapping data) can be uploaded from the TMS to the onboard system.

Data concerning refueling stops, such as authorized fuel stations and how much fuel should be obtained from such fuel stations, and fuel levels can be transferred from the TMS to the onboard system. Various information concerning the locale through which the vehicle is passing or will be passing can be transferred from the TMS to the onboard system. Such information can include bridge clearance information, law enforcement data (e.g., law enforcement activity within the locale of the vehicle such as criminal activity or Amber alert activity), and emergency/disaster data (e.g., accident on or nearby a highway, road damage due to the local flooding, or an earthquake or other natural disaster impacting the vehicle or roadway/route).

Vehicle information (e.g., specific VIN information) and maintenance data stored in the TMS can be transferred to the onboard system for purposes of modifying one or both of an image capture strategy and an event detection strategy for a particular vehicle. For example, the TMS may know that a given component of the vehicle is aging and that monitoring (e.g., such as by video monitoring) of the aging component can provide for enhanced safety. The TMS may also store various types of insurance or risk data which can be transferred to the onboard system and used to modify one or both of an image capture strategy and an event detection strategy. For example, the TMS may receive and store recall or safety warning information about a potentially defective part, and monitoring (e.g., such as by video monitoring) of the defective part on the vehicle while driving can enhance detection of reduced part functionality prior to failure (e.g., tire wear). The TMS may also inform the driver of the vehicle that a repair station on or close to the scheduled route can repair or replace the defective part when the vehicle arrives at the repair shop.

In some embodiments, one or both of an image capture strategy and an event detection strategy implemented by the onboard system can be tailored or adjusted based on one or both of the cargo within the trailer and bill of lading data for the trip. For example, one or both of an image capture strategy and an event detection strategy can be tailored or adjusted based on one or more of the value of the type of cargo, volume of the cargo, weight of the cargo, fragility of the cargo, orientation of the cargo within the trailer, location of cargo items within the trailer, position of cargo items relative to other cargo items within the trailer, hazardous material classification of the cargo, and special handling instructions concerning the cargo, among other factors. One or both of an image capture strategy and an event detection strategy implemented by the onboard system can be tailored in view of various other factors, including driver specific data. The various types of driver data acquired by the onboard system from the TMS can include one or more of driver ID, certification data, driver history, education, specialization, driver HOS status, and CSA scoring data, among other data.

According to various embodiments, one or both of an image capture strategy and an event detection strategy implemented by the onboard system can be based at least in part on customer-specific data, such as a customer's safety policies and/or procedures. For example, specific risk areas can be weighted higher or lower based on a customer's safety policies and procedures, and these weighted risk areas can influence the image capture and/or event detection strategy implemented by the onboard system. The customer-specific data can also provide information on driver coaching (how, when and what content is to be used), such as in the case of in-route training as discussed in detail hereinbelow. Acquiring customer-specific data from the TMS or other external data source provides for tailoring the image capture and/or event detection strategy to the needs and requirements of specific customers across a fleet of vehicles, as well as imposing consistency on driver review and training policies on an individual customer basis.

The TMS may also store data that can be used by the onboard system to modify the sensitivity and/or specificity parameters of the event detector that receives image capture and/or sensor/vehicle data. The sensitivity and/or specificity parameters of the event detector can be global parameters or parameter specific to each detector input (e.g., each video or still camera input, accelerometer input, or other data source or sensor input). The event detector's sensitivity measures the proportion of actual positives which are correctly identified as such. The event detector's specificity measures the proportion of negatives which are correctly identified as such. The sensitivity and specificity parameters of the event detector can be tailored for each of individual image capture device, data source, and/or sensor as needed or desired.

FIG. 8A shows various aspects of an image capture strategy that can be modified using TMS or other external source data in accordance with embodiments of the disclosures. In some embodiments, TMS data can be received by the onboard system and used to modify one or more parameters of all or individual image capture devices. For example, TMS data can include configuration data that is used by the onboard system to modify one or more parameters of the image capture devices, including field of view, zoom, resolution, operating mode (e.g., normal vs. low-light modes), frame rate, and panning or device orientation, among others.

FIG. 8B further show various aspects of the event detector that can be modified using TMS data received by the onboard system. In some embodiments, event detector modification can be accomplished by the onboard computer of the video telematics system. In other embodiments, event detector modification can be accomplished remotely, such as from a TMS, central office, or third-party system. Modifying the onboard event detector may involve adjusting one or more detection thresholds, such as a threshold for a given sensor or other data source. For example, modifying the event detector may involve changing driver specific detection thresholds, so that event detection is tailored to the idiosyncrasies of a particular driver who is presently operating the vehicle. A particular driver, for example, may have a history stored in the TMS indicating a tendency to over correct steering when losing traction. For such a driver, one or more image capture devices can be used to detect and/or confirm over corrected steering by the driver. The threshold for roll stability and/or breaking in the event detector may be adjusted to be more sensitive or less sensitive to such steering behavior. In some cases, it may be desirable to decrease the threshold for roll stability and/or breaking for this particular driver in order to facilitate coaching of the driver, thereby increasing driver awareness of over corrections. In other cases, it may be desirable to increase the threshold for roll stability and/or breaking for this particular driver in order to reduce detection of false positive events in view of a driver history evidencing a low accident rate due to steering overcorrection.

Modifying the event detector (operating on image capture data, for example) may involve changing cargo specific detection thresholds, such as thresholds for various sensors and/or image capture devices that monitor cargo within the trailer. For example, one or more accelerometers can be deployed in the trailer to monitor vibration and shocks imparted to the cargo during shipping. The TMS stores cargo and/or bill of lading data so that various details about the cargo is known by the TMS. The cargo information may indicate relatively light cargo currently being transported in the trailer, and may be subject to greater vertical and lateral displacement when traveling over bumps and through depressions along the roadway. Conversely, the cargo information received from the TMS can indicate that the cargo is relatively heavy, and therefore subject to less vertical and lateral displacement during shipping. However, heavier cargo when subject to shifting within a trailer, can result in significant damage or rollover events. By way of further example, the cargo information received from the TMS may indicate that the cargo is fragile or unstable (e.g., glassware, delicate electronics, munitions or explosives), while in other scenarios the cargo information may indicate that the cargo is durable and/or inert (e.g., mulch or wood chips). Accordingly, the event detector thresholds for monitoring cargo shifting or displacement via one or more accelerometers or other sensors (or cameras) can be adjusted based on the load currently being transported within the trailer. For example, in cases where the cargo is less susceptible to damage due to shifting or displacement while shipping, one or more cargo detection thresholds can be increased. In cases where the cargo is more susceptible to damage due to shifting or displacement while shipping, one or more cargo detection thresholds can be decreased.

FIGS. 8A and 8B further show that modification of event detector parameters, some of which involve image capture data, can include modifying a hierarchy of image capture devices used to evaluate a potential event of interest and/or detection thresholds. In some embodiments, the event detector can be configured to analyze a multiplicity of image capture and/or event data inputs, and the relative importance of these data inputs can be organized in a hierarchical or prioritized fashion. For example, the event detector may analyze image capture and/or input data from a forward-looking camera in the tractor cab, one or more in-trailer cameras directed at the cargo, and a rearward looking camera mounted at the rear of the vehicle, data from the vehicle computer or other onboard processor, roll stability sensor, lane departure sensor, and acceleration/deceleration sensor. The relative importance of these cameras and/or event data inputs can be established and adjusted based on projected or current conditions while operating the vehicle. For example, the detection threshold for in-trailer cameras or a roll stability sensor may be designated as the top priority detector input and/or detection threshold in a particular threshold hierarchy when the vehicle is traversing a narrow mountainous road, as indicated by route/trip/mapping data received from the TMS. In such cases, the event detector can determine that an event has occurred based primarily or exclusively on the in-trailer camera or roll stability sensor data received while traversing the narrow mountainous road. The event detector can either ignore or reduce the relative significance of other camera or input data due to the prioritization of in-trailer image data or roll stability detection at a critical time during vehicle operation. When the vehicle in this illustrative scenario returns to relatively flat open road, for example, the detection threshold hierarchy can again be modified so that other event data inputs are given prominence within the detection threshold hierarchy (e.g., the forward-looking camera is given top priority).

As is mentioned in the previous illustrative example, modifying the image capture strategy and/or event detector using TMS data can involve adding or subtracting image capture and/or input data sources that are subject to analysis by the event detector. Current vehicle location and/or conditions may warrant inclusion or exclusion of different image capture and/or input data sources due to their significance or lack of significance in a particular operating scenario. Inclusion or exclusion of the various image capture and/or input data sources from analysis by the event detector allows for tailoring of the image capture and/or event detection strategy to the particular circumstances impacting vehicle operation and driver behavior.

In some image capture and/or event detection strategies, detection of a particular event by the event detector can be based on a multiplicity of image capture and/or input data sources, wherein one image capture and/or input data source is subservient or dependent on another image capture and/or input data source. For example, the event detector may be configured to detect a particular event only in response to a particular image capture and/or input data source exceeding its specified threshold, notwithstanding that detection thresholds of other image capture and/or input data sources have been exceeded. The event detector can be configured to adjust or change the dependency among image capture and/or input data sources based on TMS data.

Modification to one or both of an image capture strategy and an event detection strategy can involve changing triggering delays of the event detector. For example, a triggering delay can be used to allow the event detector additional time to consider subsequently received input data after detecting a particular event prior to generating a trigger signal. This additional time, referred to herein as a triggering delay, can allow for additional and often times slower developing data to be considered by the event detector prior to generating a trigger signal in response to a detected event. For example, an acceleration sensor can indicate the occurrence of a sudden deceleration that could result in damage to the cargo within the trailer. Although the sudden deceleration could be sufficient to warrant generation of a trigger signal, the event detector may initiate a triggering delay to allow time for other sensor information to be processed and/or to be used to corroborate or verify the significance of the detected event. In-trailer image capture data, for example, can be evaluated by the onboard computer to determine whether and the extent to which cargo was subject to shifting or displacement resulting from the detected sudden deceleration events. If the video evidence indicates significant cargo displacement has occurred, and assuming the video evidence is made available to the event detector during the triggering delay period, the event detector can generate a trigger signal after expiration of the triggering delay. If, on the other hand, the video evidence indicates insignificant cargo displacement due to the detected sudden deceleration event, the event detector can withhold generation of a trigger signal after expiration of the triggering delay.

Figure 9:
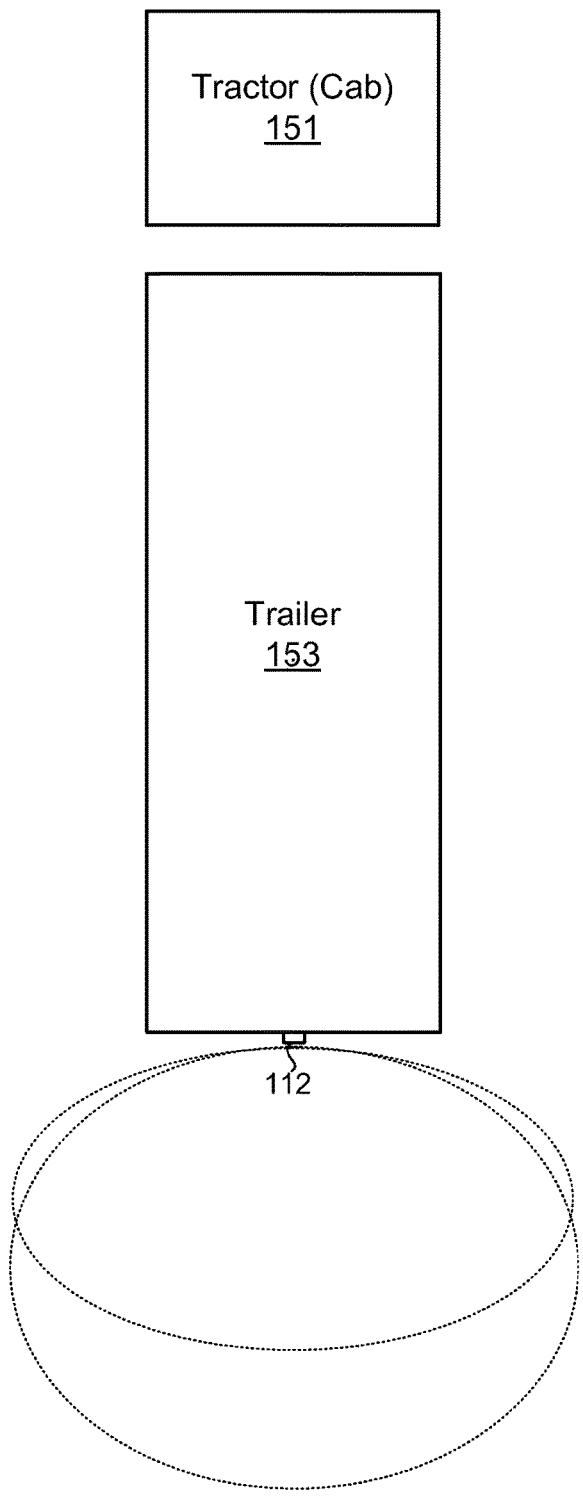
FIGS. 9 and 10 illustrate a vehicle comprising a tractor and a trailer equipped with a rearview image capture capability in accordance with various embodiments.
Figure 10:
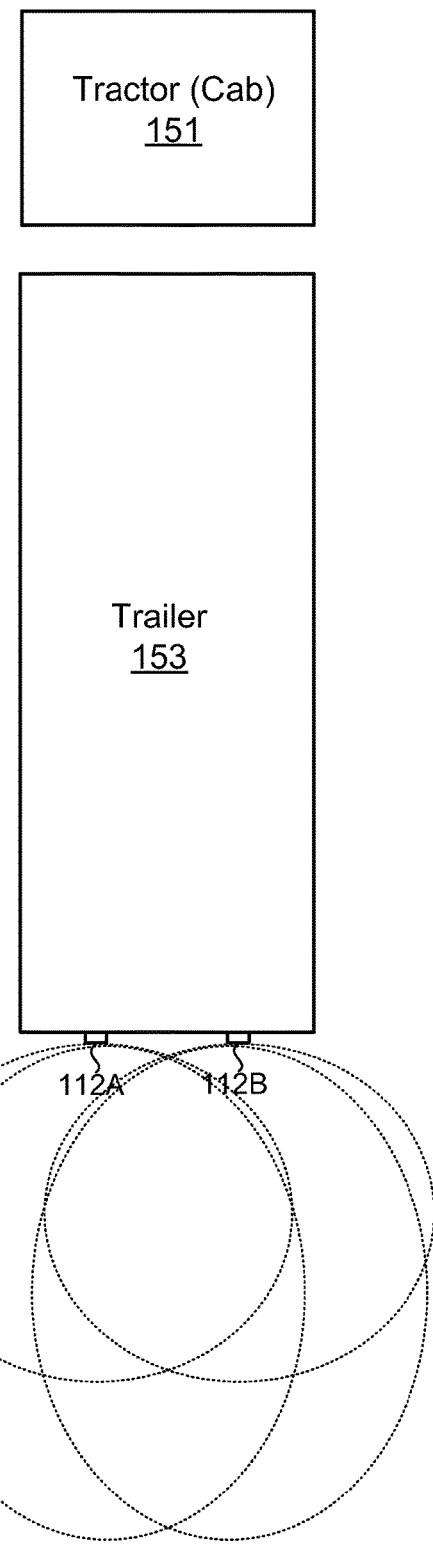

FIGS. 9 and 10 illustrate a vehicle comprising a tractor 151 and a trailer 153 equipped with a rearview image capture capability in accordance with various embodiments. In the embodiment shown in FIG. 9, the rear of the trailer 153 is equipped with an image capture device 112 with a field of view that extends rearwardly and somewhat laterally from the rear exterior side of the trailer 153. The image capture device 112 can be mounted generally anywhere at a relatively central location on the rear exterior side of trailer 153. For example, the image capture device 112 can be mounted above the doors to limit damage caused by moving cargo into and out of the trailer 153. The image capture device 112 can also be mounted at or below the floor the trailer 153 and protected by a cowling or situated at a recessed location to limit or prevent contact with cargo and personnel accessing the rear of the trailer 153.

FIG. 10 shows a trailer 153 equipped with a pair of image capture devices 112A and 112B that can operate independently or in a stereoscopic imaging mode. When operating in a stereoscopic imaging mode, for example, images produced by the pair of image capture devices 112A and 112B can be rendered in three dimensions, allowing for enhanced viewing and detection of activity at the rear of the trailer 153. In the case of dual or multiple image capture devices 112 used on the rear of the trailer 153, the field of view of the devices 112 can, if desired, be narrower than in the case of a single device 112 as is shown in FIG. 9, and can extend a greater distance in a rearward direction from the rear of the trailer 153.

According to various embodiments, one or more of the field of view, resolution, frame rate, zoom, panning, device orientation, operating mode or other parameter of an image capture device 112 situated on the rear of the trailer 153 can be adjusted by the onboard system (or an external system) based on data received from an external source, such as a TMS. An image capture and/or event detection strategy that employs data received from a rear image capture device 112 can be modified by the onboard system (or an external system) in a manner previously discussed based on data received from an external source, such as a TMS. In addition or alternatively, one or more image capture device parameters can be adjusted based on image capture data, event data, and other sensor data acquired at the vehicle.

Figure 11:
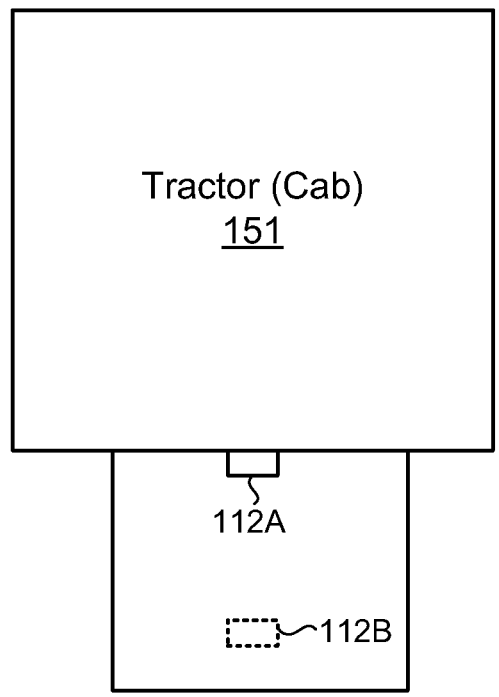
FIGS. 11 and 12 illustrate a bobtail tractor equipped with a rearview image capture capability in accordance with various embodiments.
Figure 12:
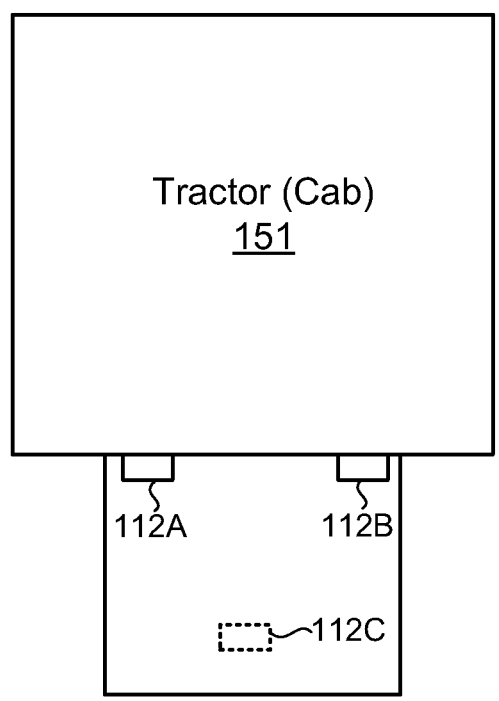

FIGS. 11 and 12 illustrate a bobtail tractor 151 equipped with one or more image capture devices situated on a rear exterior surface of the tractor 151. The term bobtail tractor refers to a tractor to which a trailer is not presently hitched. A single or multiple image capture device 112 (e.g., 112A and 112B in Figured 12) can be positioned on the rear side of the tractor 151 to facilitate enhanced viewing of objects behind the tractor 151. In some embodiments, a hitch camera (112B in FIG. 11, 112C in FIG. 12) can be situated at or near a hitch coupler of the tractor 151, which produces images on a display within the tractor 151 useful to the driver when hitching the tractor 151 to a trailer. An image capture and/or event detection strategy that employs data received from a rear image capture device 112 of the bobtail tractor 151 can be modified by the onboard system (or an external system) in a manner previously discussed based on data received from an external source, such as a TMS.

Figure 13:
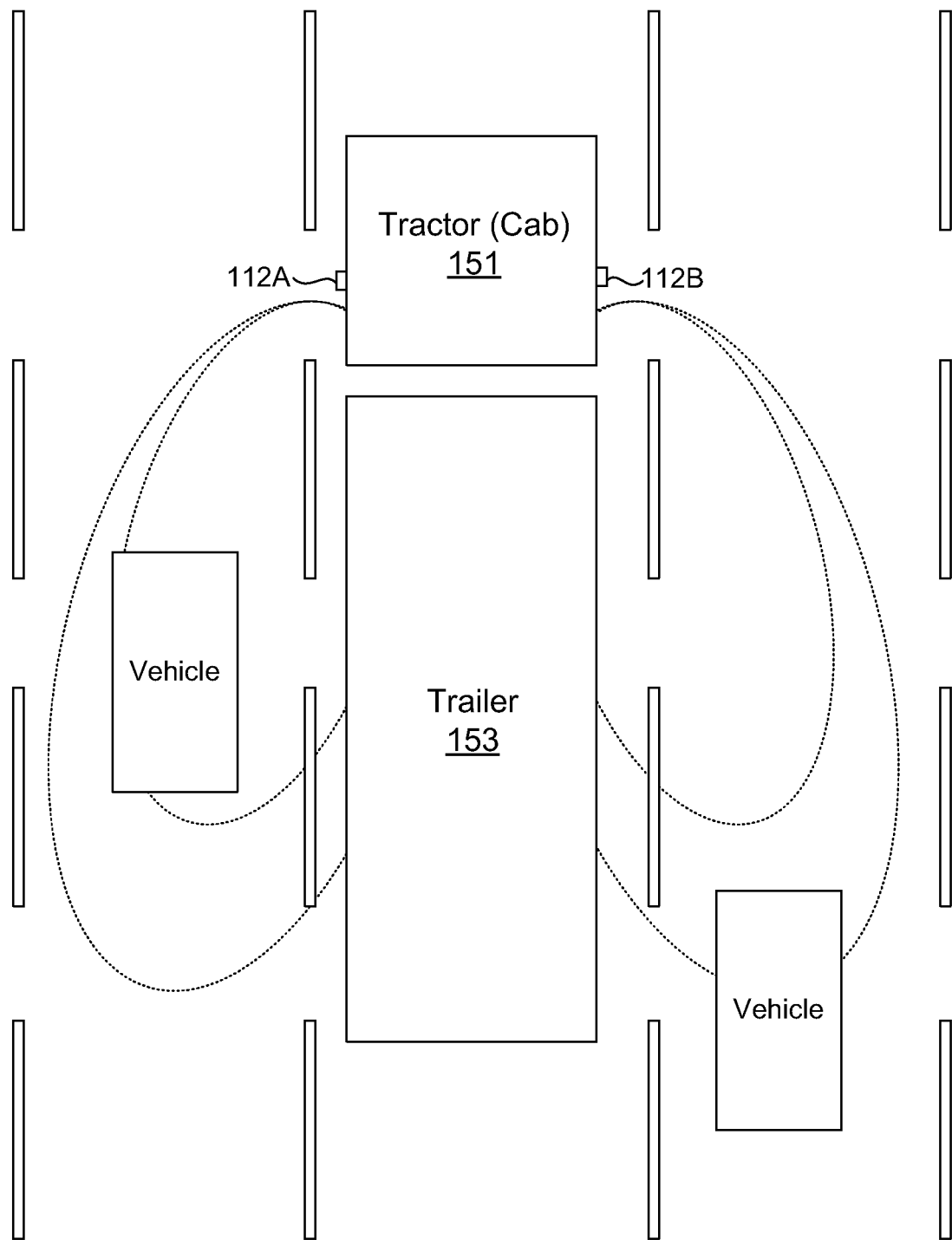
FIG. 13 illustrates a vehicle comprising a tractor and a trailer equipped with a left and right side blind spot image capture capability in accordance with various embodiments.
Figure 14:
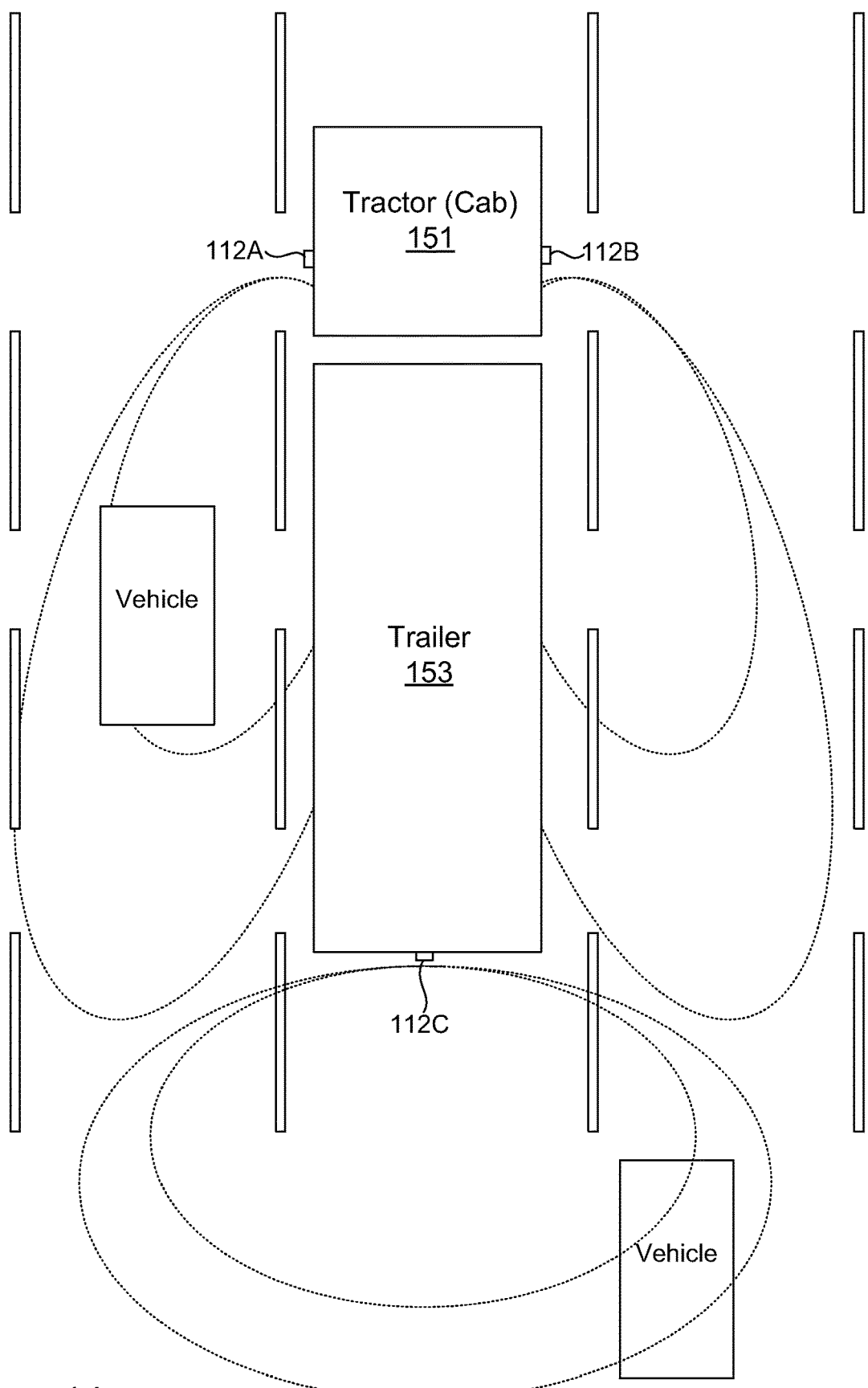
FIG. 14 illustrates a vehicle comprising a tractor and a trailer equipped with a left and right side blind spot image capture capability and a rearview image capture capability in accordance with various embodiments.
Figure 15:
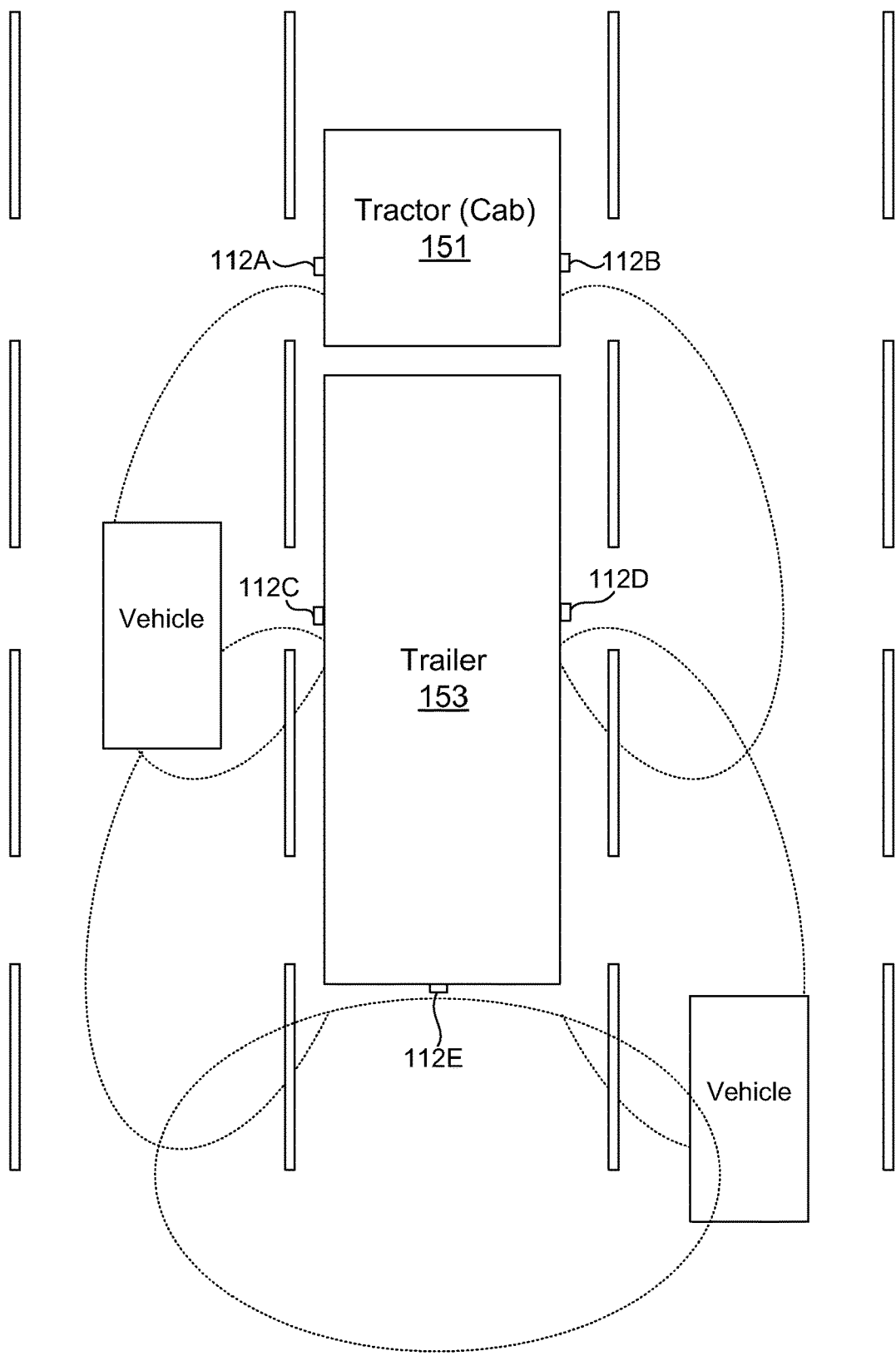
FIG. 15 illustrates a vehicle comprising a tractor and a trailer equipped with a left and right side blind spot image capture capability and a rearview image capture capability in accordance with various embodiments.

FIG. 13 illustrates a tractor 151 equipped with one or more image capture devices 112A and 112B situated on a site external surface of the tractor 151. The representative embodiment shown in FIG. 13 includes a left side image capture device 112A configured to sense for blind spots on the left side of the tractor 151 and trailer 153. A right side image capture device 112B is configured to sense for blind spots on the right side of the tractor 151 and trailer 153. FIG. 14 illustrates a tractor 151 equipped with left and right side image capture devices 112A and 112B and, in addition, a rear image capture device 112C. FIG. 15 illustrates a tractor 151 equipped with left and right side image capture devices 112A and 112B, a rear image capture device 112E, and, in addition, left and right side image capture devices 112C and 112D on the trailer 153. The addition of left and right side trailer devices 112C and 112D provides for enhanced blind spot detection for trailers that are relatively long. An image capture and/or event detection strategy that employs data received from the image capture devices shown in FIGS. 13-15 can be modified by the onboard system (or an external system) in a manner previously discussed based on data received from an external source, such as a TMS.

FIGS. 16 and 17 illustrate trailers 153 equipped with image capture devices 112 situated in different locations within the trailer 153. FIGS. 16A-16D illustrate different configurations for deploying one or more image capture devices 112 at in-trailer locations suitable for monitoring the status of one or more trailer doors 1602 in accordance with various embodiments. FIG. 16A shows a trailer 153 having a pair of rear doors 1602, and a single image capture device 112 mounted on the trailer roof proximate the rear doors 1602. The image capture device 112 shown in FIG. 16A preferably has a field of view that encompasses the doors, allowing for continuous monitoring of door status (e.g., opening and closing). FIG. 16B shows a pair of image capture devices 112A and 112B mounted on the trailer roof proximate the rear doors 1602. In the configuration shown in FIG. 16B, device 112A is positioned near a mid-point location of the left door, and the device 112B is positioned near a mid-point location of the right door.

Figure 17A:
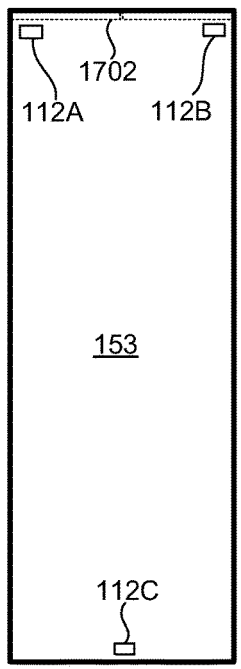
FIGS. 17A-17H illustrate trailers equipped with image capture devices situated at different locations within the trailer of a commercial vehicle in accordance with various embodiments.
Figure 17B:
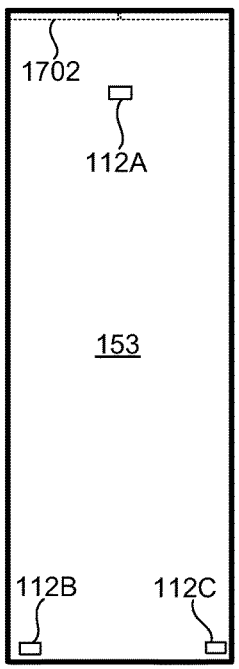
Figure 17C:
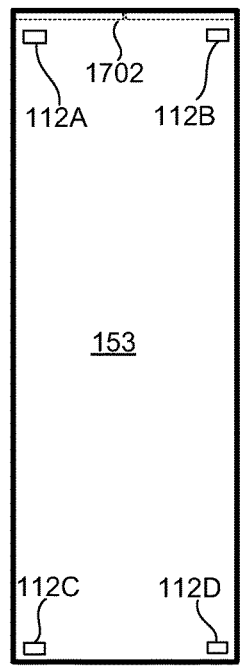
Figure 17D:
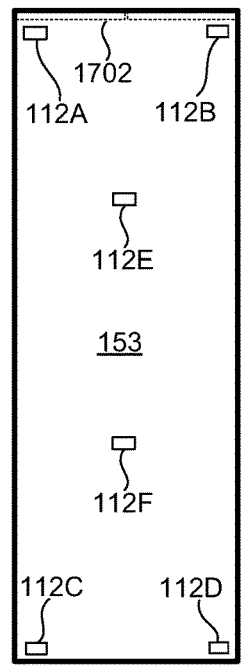

FIGS. 16C and 17D illustrate trailers 153 having side doors 1602. In the embodiment shown in FIG. 16C, a single image capture device 112 is mounted on the trailer roof proximate the side doors 1602. In the embodiment shown in FIG. 16D, a pair of image capture devices 112A and 112B are mounted at a roof location near mid-point locations of the left and right doors, respectively. It is understood that some trailers 153 may include both rear and side doors 1602, and that one or more image capture devices 112 can be deployed for monitoring the status of the rear and side doors 1602.

FIGS. 16E-16H illustrate different configurations for deploying one or more image capture devices 112 at in-trailer locations suitable for monitoring the status of the cargo area within the trailer 153 in accordance with various embodiments. FIG. 16E shows a single image capture device 112 mounted on the trailer roof and situated toward the rear doors 1602 in a forward-looking direction. The image capture device 112 shown in FIG. 16E provides a forward-looking view of the cargo area within the trailer 153. FIG. 16F illustrates a dual image capture device deployment, and which one image capture device 112A is directed toward the rear doors 1602 and another image capture device 112B is directed toward the cargo area within the trailer 153. FIG. 16G shows a pair of image capture devices 112A and 112B situated at upper rear corner locations of the trailer 153 and oriented in a forward-looking direction. FIG. 16H shows a pair of image capture devices 112A and 112B situated at upper forward corner locations of the trailer 153 and oriented in a rearward-looking direction.

FIGS. 17A-17F illustrate other configurations for deploying a multiplicity of image capture devices 112 at in-trailer locations suitable for monitoring the status of the cargo area within the trailer 153 in accordance with various embodiments. FIG. 17A shows a pair of image capture devices 112A and 112B situated at upper rear corner locations of the trailer 153 and oriented in a forward-looking direction. Another image capture device 112C is situated at an upper mid-point location of the forward wall of the trailer 153, and oriented in a rearward-looking direction for viewing the cargo area and the rear door 1702. FIG. 17B shows a pair of image capture devices 112B and 112C situated at upper forward corner locations of the trailer 153 and oriented in a rearward-looking direction. FIG. 17B also shows a single image capture device 112A situated at a roof locations suitable for viewing the rear doors 1702.

Figure 17E:
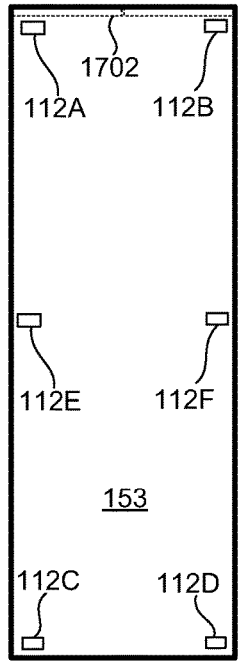
Figure 17F:
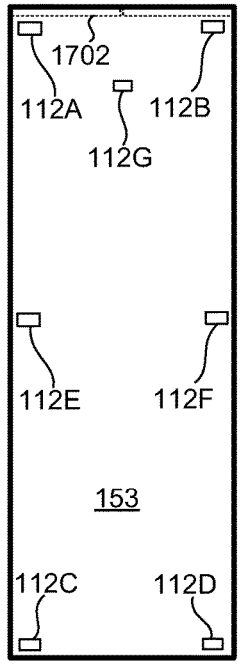

FIG. 17C shows a first pair of image capture devices 112A and 112B situated at upper rear corner locations of the trailer 153 and oriented in a rearward-looking direction, and a second pair of image capture devices 112C and 112D situated at upper forward corner locations of the trailer 153 and oriented in a forward-looking direction. The configuration shown in FIG. 17D is the same as that shown in FIG. 17C, and adds a pair of mid-line roof cameras 112E and 112F. The two mid-line roof cameras 112E and 112F provide a generally downward-looking view of the cargo area, which may be helpful for trailers 153 having relatively long cargo bays. FIG. 17E shows a configuration similar to that of FIG. 17C, with the addition of two mid-trailer side image capture devices 112E and 112F. The configuration shown in FIG. 17F is similar to that shown in FIG. 17E, with the addition of a rear door image capture device 112G.

Figure 17G:
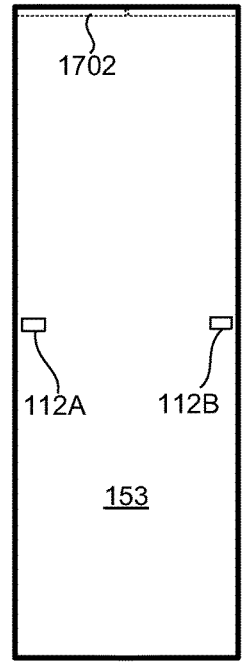
Figure 17H:
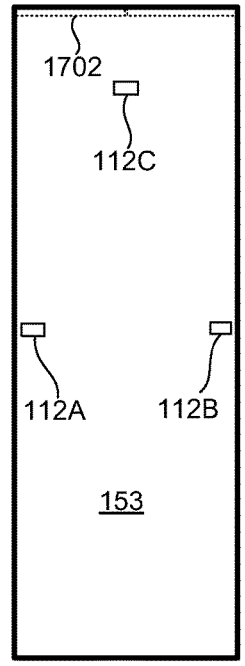

FIGS. 17G and 17H illustrate deployment of a pair of image capture devices 112A and 112B each configured to provide a panoramic field of view. In some embodiments, each of the image capture devices 112A and 112B provides a panoramic field of view of at least 180°. In other embodiments, each of the image capture devices 112A and 112B provides a panoramic field of view of less than 180°, such as 120°, 140°, or 160°. FIG. 17H shows a configuration the same as that illustrated in FIG. 17G, with the addition of a rear door image capture device 112C. It is understood that other image capture device deployment configurations are contemplated, and those illustrated in the Figures are provided for non-limiting illustrative purposes.

Figure 17I:
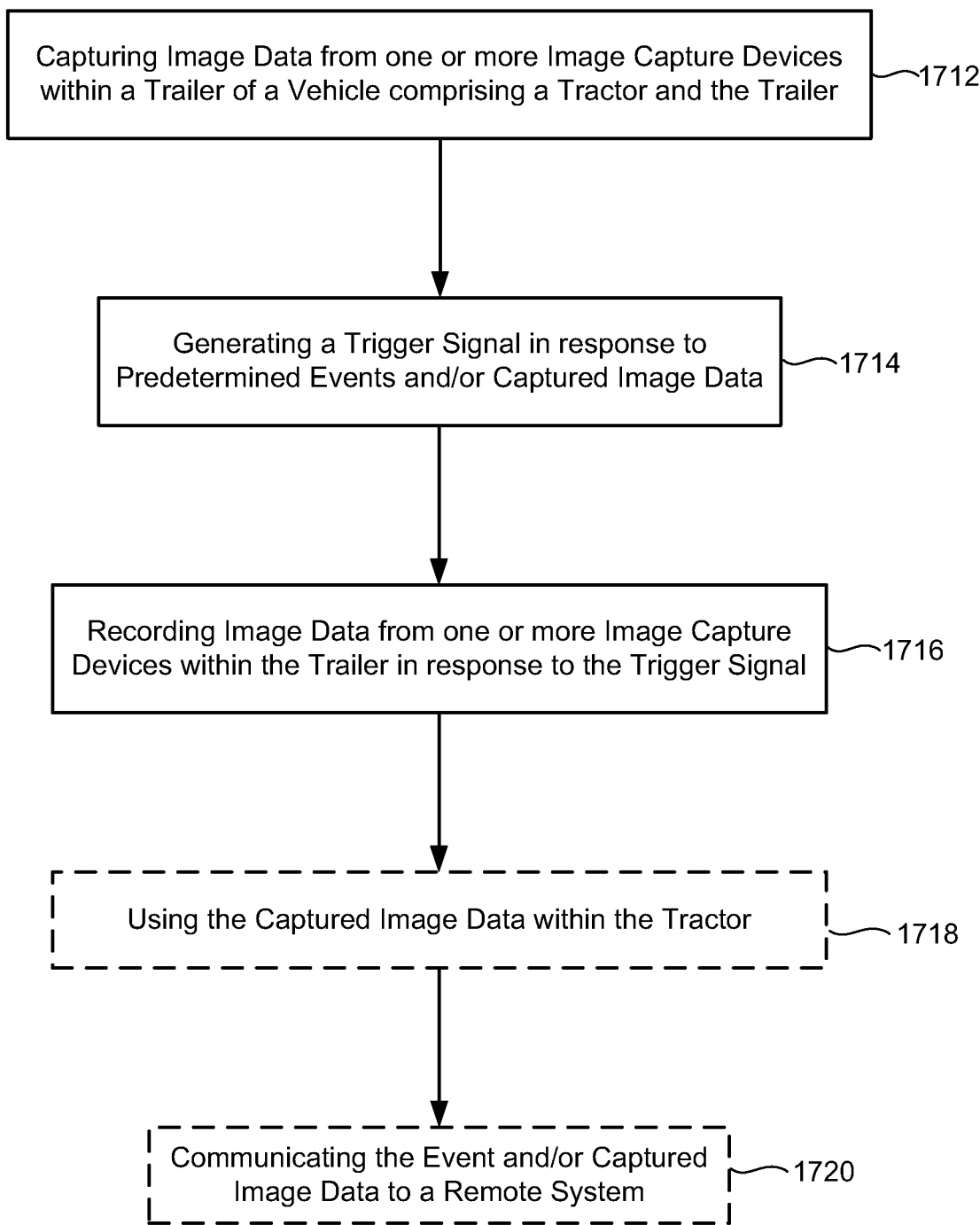
FIG. 17I is a flow chart showing various processes for implementing image intelligence for a trailer of a commercial vehicle in accordance with various embodiments.

Turning now to FIG. 17I, there is illustrated a flow chart showing various processes for implementing image intelligence involving a trailer of a vehicle in accordance with various embodiments. The methodology illustrated in FIG. 17I involves capturing 1712 image data from one or more image capture devices within a trailer of a vehicle comprising a tractor and the trailer. The methodology also involves generating 1714 a trigger signal in response to predetermined events and/or captured image data, and recording 1716 image data from one or more image capture devices within the trailer in response to the trigger signal. The methodology of FIG. 17I may optionally involve using 1718 the captured image data within the tractor, and communicating 1720 the event and/or captured image data to a remote system.

Figure 17J:
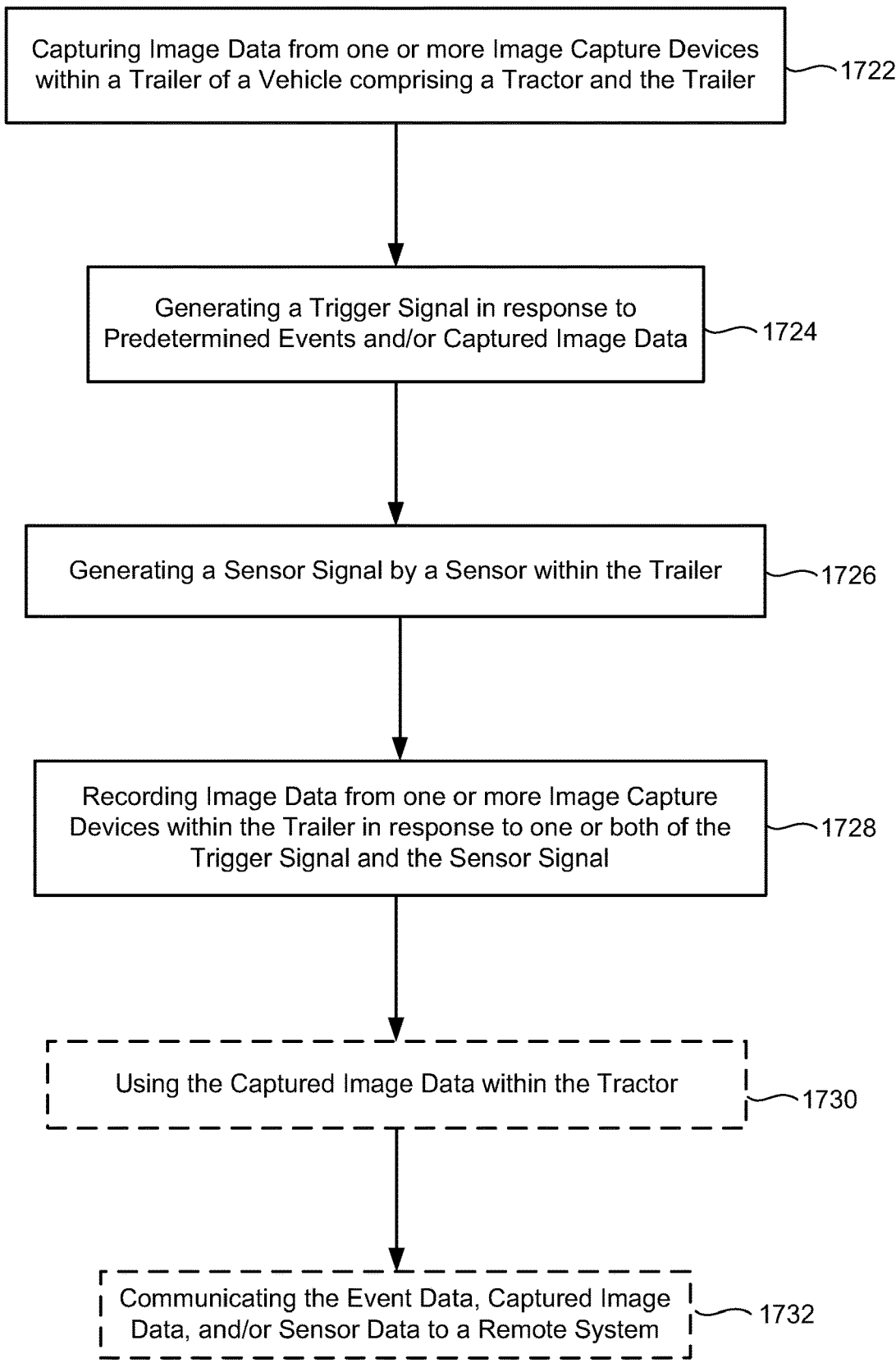
FIG. 17J is a flow chart showing various processes for implementing image intelligence for a trailer of a commercial vehicle including one or more sensors in accordance with various embodiments.

FIG. 17J is a flow chart showing various processes for implementing image intelligence involving a trailer of a vehicle in accordance with various embodiments. The methodology illustrated in FIG. 17J involves capturing 1722 image data from one or more image capture devices within a trailer of a vehicle comprising a tractor and the trailer, and generating 1724 a trigger signal in response to predetermined events and/or captured image data. The methodology shown in FIG. 17J also involves generating 1726 a sensor signal by a sensor within the trailer, and recording 1728 image data from one or more image capture devices within the trailer in response to one or both of the trigger signal and the sensor signal. The methodology of FIG. 17J may optionally involve using 1730 the captured image data within the tractor, and communicating 1732 the event data, captured image data, and/or sensor data to a remote system.

FIG. 17K is a flow chart showing various processes for implementing image intelligence involving a trailer of a vehicle in accordance with various embodiments. The methodology illustrated in FIG. 17K involves capturing 1734 image data from one or more image capture devices within a trailer of a vehicle comprising a tractor and the trailer, and generating 1736 a trigger signal in response to predetermined events and/or captured image data. The methodology shown in FIG. 17K also involves receiving 1738 data from a remote system, and recording 1740 image data from one or more image capture devices within the trailer in response to one or both of the trigger signal and the received data. The methodology of FIG. 17K may optionally involve using 1742 the captured image data within the tractor, and communicating 1744 the event data, captured image data, and/or received data to a remote system.

Figure 17M:
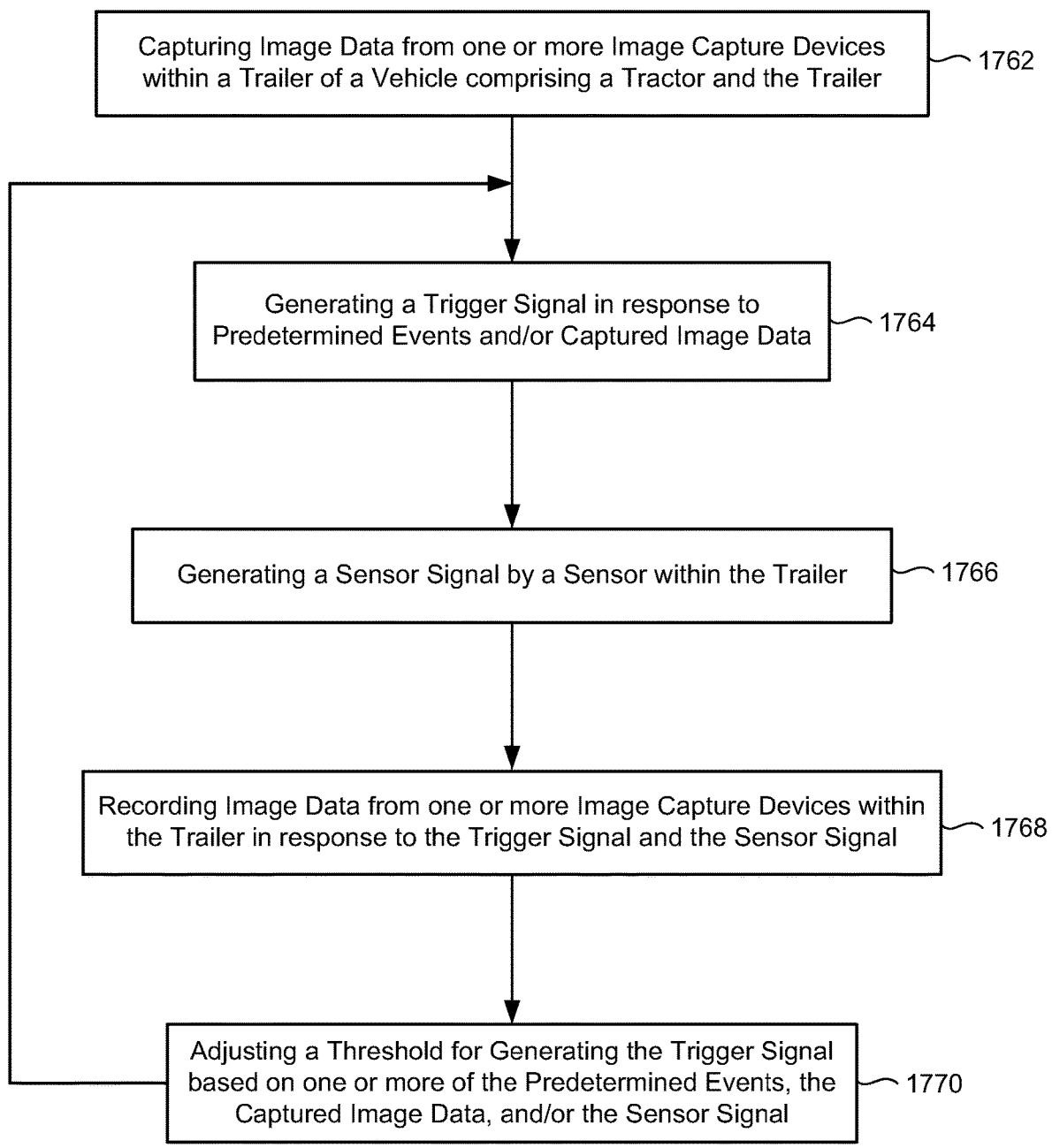
FIG. 17M is a flow chart showing various processes for implementing image intelligence and threshold adjustment for a trailer of a commercial vehicle including one or more sensors in accordance with various embodiments.

FIGS. 17L-17N are flow charts showing various processes for implementing image intelligence involving a trailer of a vehicle in accordance with various embodiments. FIGS. 17L-17N are directed to adjustment of one or more thresholds (or image templates) involved in generating a trigger signal, which provides for dynamic modification of the event detection methodology under changing conditions involving the vehicle, driver, trip, road conditions, and/or cargo within the trailer, among other factors. According to FIG. 17L, the methodology involves capturing 1752 image data from one or more image capture devices within a trailer of a vehicle comprising a tractor and the trailer, and generating 1754 a trigger signal in response to predetermined events and/or captured image data. The methodology also involves recording 1756 image data from one or more image capture devices within the trailer in response to the trigger signal, and adjusting 1758 one or more thresholds for generating the trigger signal based on one or both of the predetermined events and/or the captured image data.

FIG. 17M is a flow chart showing various processes for implementing image intelligence involving a trailer of a vehicle in accordance with various embodiments. The methodology shown in FIG. 17M involves capturing 1762 image data from one or more image capture devices within a trailer of a vehicle comprising a tractor and the trailer, and generating 1764 a trigger signal in response to predetermined events and/or captured image data. The methodology also involves generating 1766 a sensor signal by a sensor within the trailer, and recording 1768 image data from one or more image capture devices within the trailer in response to the trigger signal and the sensor signal. One or more thresholds for generating the trigger signal are adjusted 1770 based on one or more of the predetermined events, the captured image data, and the sensor signal.

FIG. 17N is a flow chart showing various processes for implementing image intelligence involving a trailer of a vehicle in accordance with various embodiments. The methodology shown in FIG. 17N involves capturing 1772 image data from one or more image capture devices within a trailer of a vehicle comprising a tractor and the trailer, and generating 1774 a trigger signal in response to predetermined events and/or captured image data. The methodology also involves receiving 1776 data from a remote system, and recording 1778 image data from one or more image capture devices within the trailer in response to the trigger signal and the received data. One or more thresholds for generating the trigger signal are adjusted 1780 based on one or more of the predetermined events, the captured image data, and the received data.

Figure 18:
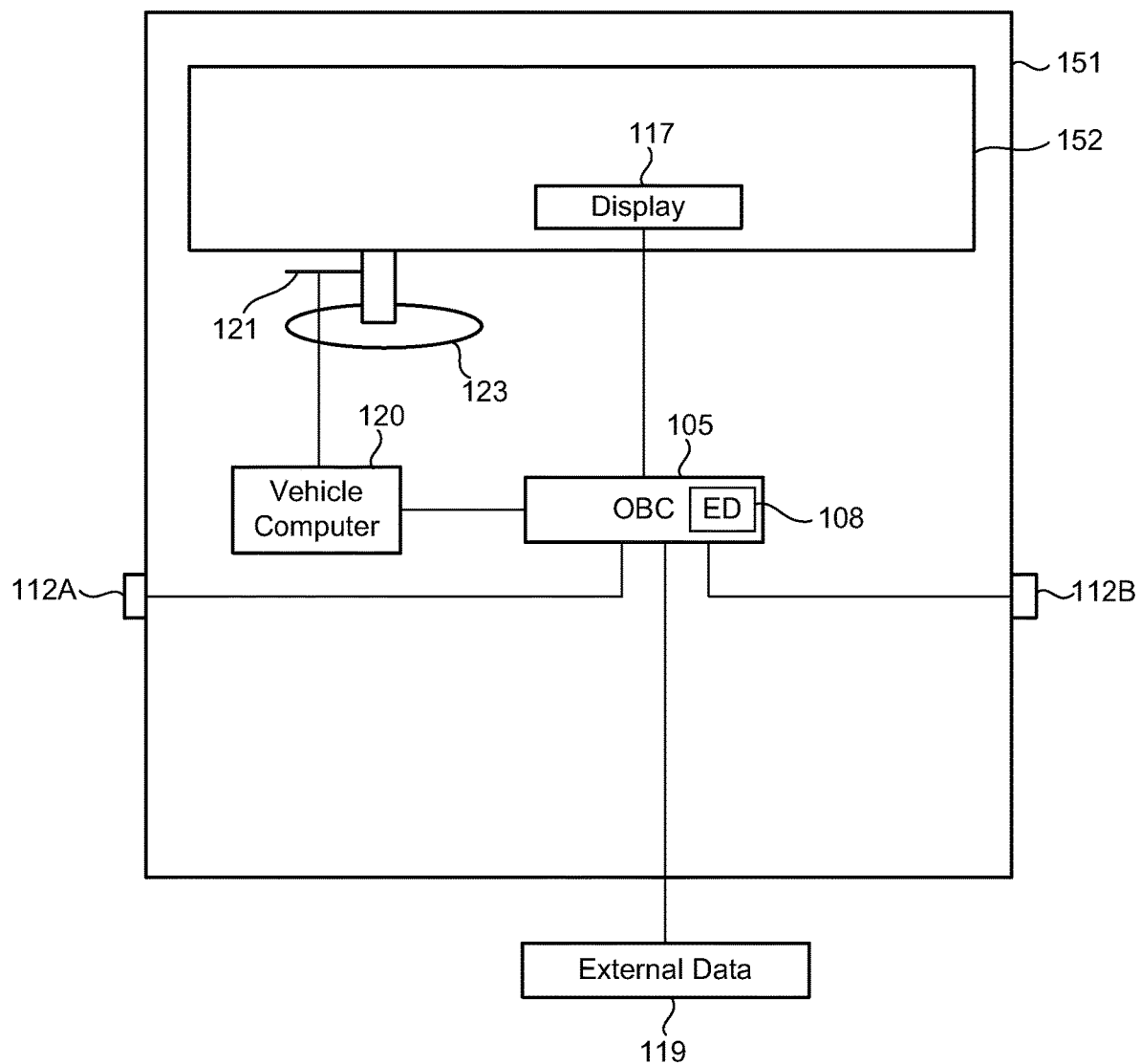
FIG. 18 illustrates an embodiment of an image intelligence system implemented in a tractor of a vehicle configured to connect to a trailer in accordance with various embodiments.

FIG. 18 illustrates an embodiment of a system implemented in a tractor 151 of a vehicle configured to connect to a trailer in accordance with various embodiments. The tractor 151 shown in FIG. 18 includes an onboard computer 105 coupled to a vehicle computer 120 and a display 117 mounted (fixedly or detachably) to a dashboard 152 of the tractor 151. The tractor 151 includes left and right side image capture devices 112A and 112B. Although not shown, one or more rear exterior image capture devices can be situated on the tractor 151. The vehicle computer 120 is communicatively coupled to a turn signal lever 121 near a steering wheel 123 extending from the front console of the tractor 151. The onboard computer 105 is configured to receive data 119 from an external source, such as a TMS.

According to various embodiments, moving the turn signal lever 121 by the driver to indicate a left lane change or turn causes the onboard computer 105 to activate the left side image capture device 112A and the left side blind spot detection scheme implemented by the event detector 108. Moving the turn signal lever 121 by the driver to indicate a right lane change or turn causes the onboard computer 105 to activate the right side image capture device 112B and the right side blind spot detection scheme implemented by one or both of the onboard computer 105 and the event detector 108. It is noted that the left and right side blind spot detection schemes implemented by the onboard computer 105 and event detector 108 can be different, due to the greater difficulty of seeing objects by the driver on the right side of the vehicle where the steering wheel 123 is located on the left side of the tractor 151. Actuation of the left and right image capture devices 112A and 112B causes captured images of the left and right side of the vehicle respectively to appear on the display 117.

In accordance with various embodiments, the onboard computer 105 is configured to receive data 119 from an external source, such as a TMS, that can be used to modify the left and/or right blind spot detection schemes implemented by the onboard computer 105 and/or event detector 108. For example, driver specific data can be received from a TMS which can be used to adjust (e.g., optimize) the blind spot field of view or other parameter of the left and/or right image capture devices 112A and 112B and/or event detector 108. Data 119 concerning the cargo or loading of the trailer which is hitched to the tractor 151 can be used by the onboard computer 105 and/or event detector 108 to adjust (e.g., optimize) the blind spot field of view or other parameter of the left and/or right image capture devices 112A and 112B and/or event detector 108. Other TMS data 119 or data from other external sources can be used to modify the blind spot field of view or other parameter of the left and/or right image capture devices 112A and 112B and/or the event detector 108, including road conditions data, route/trip/mapping data, traffic data, maintenance data, emergency/disaster data, weather conditions data, and other data described previously in reference to FIGS. 8A and 9B and other figures.

Figure 19:
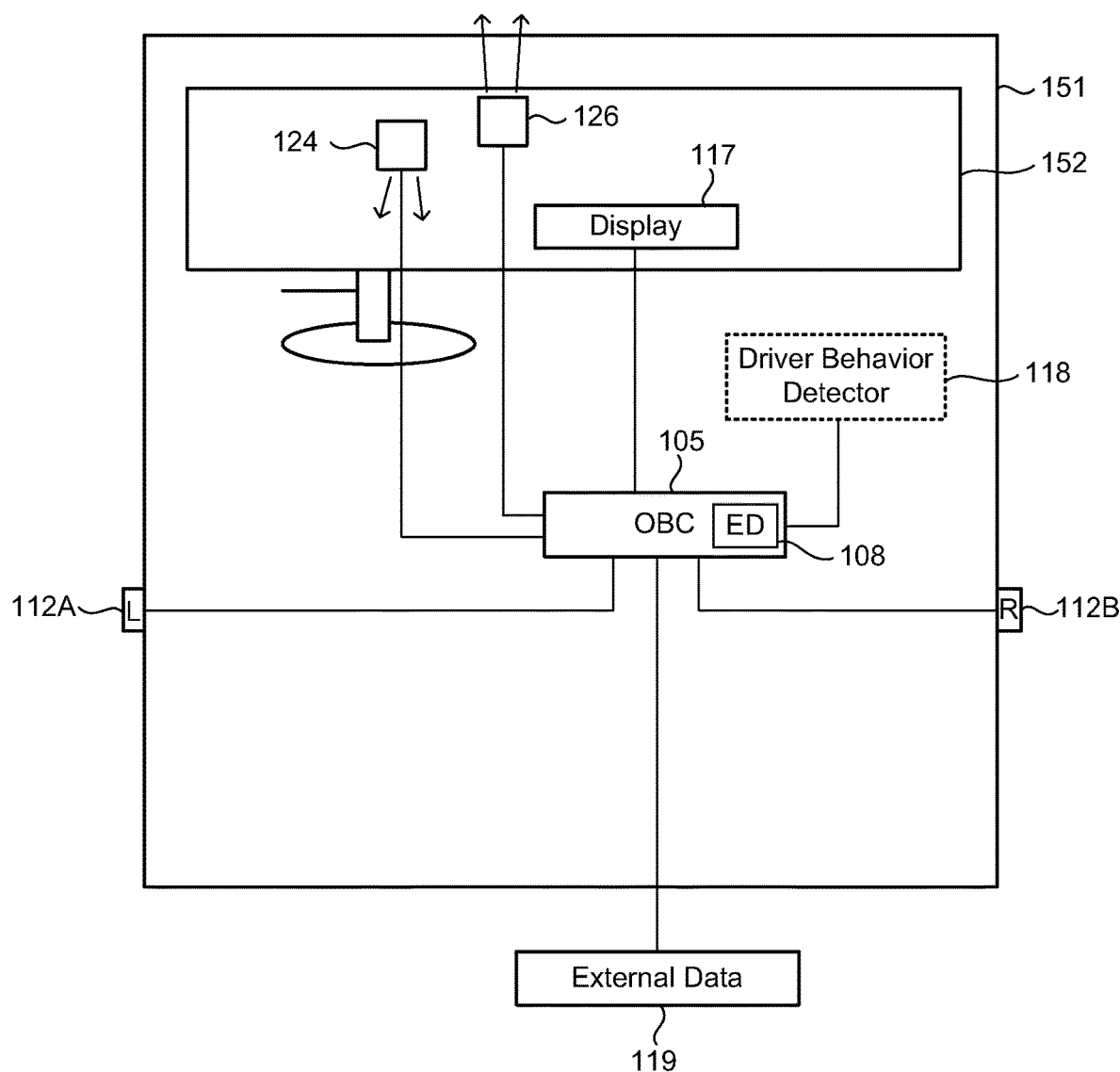
FIG. 19 illustrates an embodiment of an image intelligence system implemented in a tractor of a vehicle configured to connect to a trailer in accordance with various embodiments.

FIG. 19 illustrates an embodiment of a system implemented in a tractor 151 of a vehicle configured to connect to a trailer in accordance with various embodiments. The embodiment shown in FIG. 19 is similar to that shown in FIG. 18, but includes a first image capture device 124 and the second image capture device 126. It is noted that the left and/or right image capture devices 112A and 112B can be included or excluded from the embodiment shown in FIG. 19. The first and second image capture devices 124 and 126 are coupled to the onboard computer 105. The first image capture device 124 is positioned on the dashboard 152, rearview mirror, or elsewhere in the cabin so that it captures the driver (e.g., face, upper torso, and preferably arms) within its field of view. In some embodiments, the first image capture device 120 is positioned in the cabin of the tractor 151 to capture both the driver and the passenger(s). In other embodiments, a third image capture device (not shown) can be included to capture images of the passenger (s). The second image capture device 124 is positioned on the dashboard 52, rearview mirror, or elsewhere in the cabin so that its field of view is directed in a forward-looking direction ahead at the roadway in front of the tractor 151.

In accordance with various embodiments, the onboard computer 105 is configured to receive data 119 from an external source, such as a TMS, that can be used to modify one or more parameters of the first and second image capture devices 124 and 126. External data 119 can also be used by the onboard computer 105 and/or in the event detector 108 to modify an event detection strategy involving one or both of the first and second image capture devices 124 and 126, such as in manners previously discussed with reference to FIG. 8 and other Figures. In some embodiments, a driver behavior detector 118 is coupled to the onboard computer 105. The event detection strategy involving one or both of the first and second image capture devices 124 and 126 can be modified by driver behavior detected by the driver behavior detector 118 in accordance with the methodologies described in commonly owned U.S. Provisional Patent Application Ser. 62/038,711 filed Aug. 18, 2014; which is incorporated herein by reference.

Figure 20A:
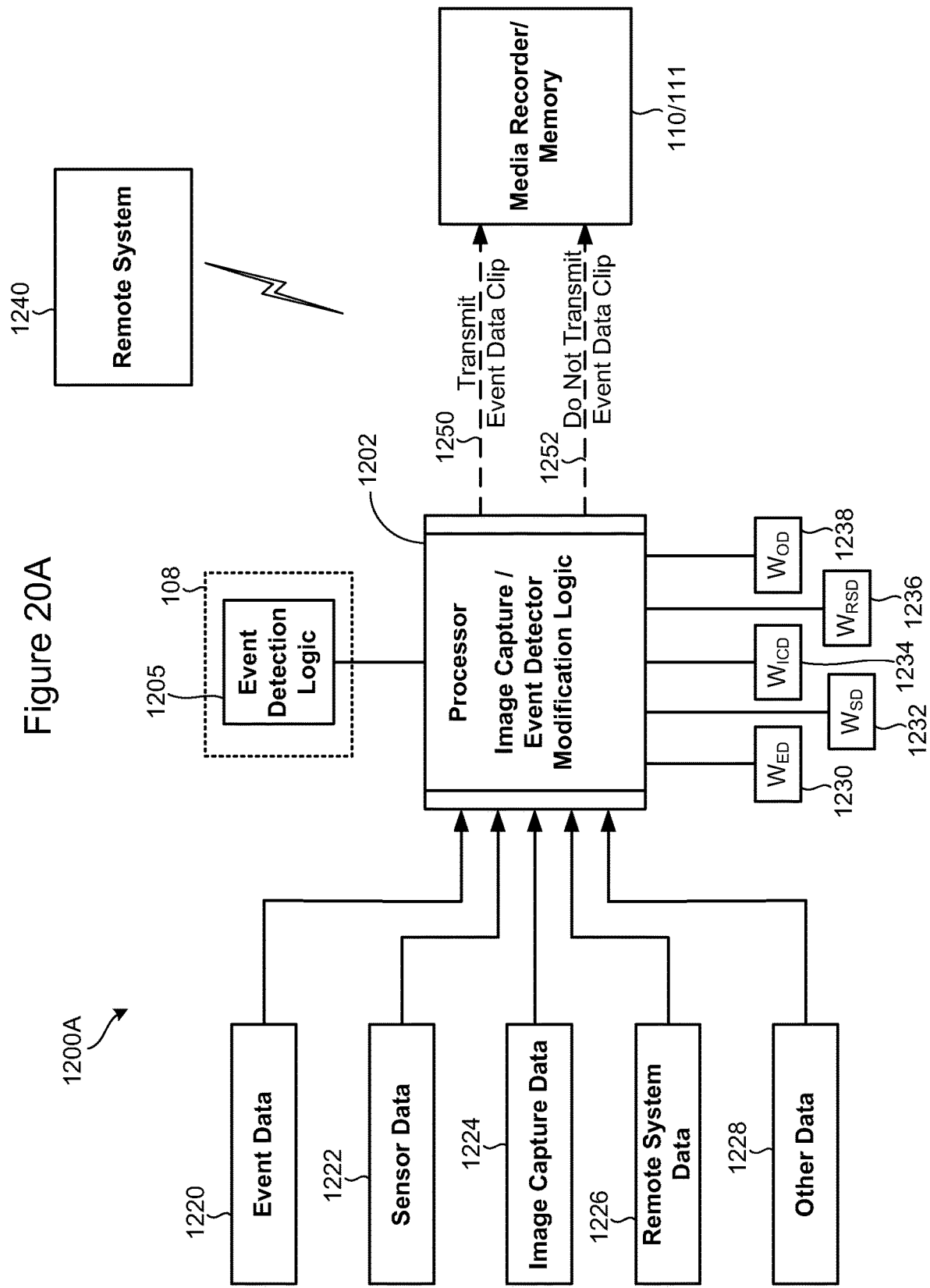
FIG. 20A is a block diagram showing a portion of a system configured for implementation in a vehicle comprising a tractor and a trailer, and for modifying one or both of an image capture strategy and an event detection strategy implemented by an onboard computer in accordance with various embodiments.

FIG. 20A is a block diagram showing a portion of a system 1200A configured for implementation in a vehicle comprising a tractor and a trailer and for modifying one or both of an image capture strategy and an event detection strategy implemented by an onboard computer in accordance with various embodiments. The system 1200A shown in FIG. 20A includes a processor 1202 configured to implement one or both of image capture and event detector modification logic in accordance with various embodiments. The processor 1202 is coupled to or otherwise incorporates a media recorder 110 and/or other memory 111. The media recorder 110 can be of a type previously described, and configured for recording various forms of image data, audio data, sensor data, graphical data and textual data, for example. In some implementations, the processor 1202 receives data from the remote system 1240, which is typically communicatively coupled to the processor 1202 via a wireless communication link. The remote system 1240 can support or be communicatively coupled to a transportation management system.

The processor 1202 is configured to receive various input data available at the vehicle. The data made available to the processor 1202 includes event data 1220, sensor data 1222, image capture data 1224, and remote system data 1226. Various other forms of data 1228 can also be received by the processor 1202. These data can be used by the processor 1202 to implement one or both of an image capture strategy and an event detection strategy, such as via an event detector 108 configured to implement event detection logic 1205.

The event detector 108 can be implemented in software and/or hardware within the processor 1202 or in separate circuitry. The various forms of data 1220-1228 can be received by the processor 1202 and event detector 108 to implement an event detection strategy. The processor 1202 can receive external source data used to modify one or more parameters of the event detector 108 via image capture/event detector modification logic executable by the processor 1202. It is noted that the remote system data 1226 can include one or both of information from the remote system 1240 (e.g., TMS data) and a command or configuration signal, such as a signal for remotely reconfiguring one or both of the image capture devices and the event detector 108.

The sensor data 1222 can be generated by one or a number of sensors deployed in or on the tractor and/or the trailer. The following is a non-limiting, non-exhaustive list of useful sensors that can be situated in or on the trailer 153: a motion sensor, accelerometer, a multiple axis accelerometer, a gyroscope, a temperature sensor, a moisture and/or humidity sensor, a gas sensor, a chemical sensor, and acoustic sensor, a microphone, a radiation sensor, a pressure sensor, an ambient pressure sensor, a proximity or presence sensor, and any combination of these and other sensors.

The various forms of data 1220-1228 input to the processor 1202 can have different levels of significance, which may vary in time, depending on the nature of the data source, the relative importance of the data, and current conditions and factors. In some embodiments, the processor 1202 cooperates with the event detector 108 to determine that an event has occurred and, in response, record an event data clip in the media recorder/memory 110, 111 and/or transmit same in real-time (or in batch) to the remote system 1240. In other embodiments, the processor 1202 cooperates with the event detector 108 to determine that an event has occurred and, in response, performs additional analysis to determine if the detected event is of sufficient important to warrant generation of a trigger signal, such as by use of a triggering delay procedure.

In the following illustrative example, it is assumed that data has been acquired about a potential event of interest, and the processor 1202 is analyzing various data to determine if the potential event of interest is sufficiently important to warrant generate a trigger signal, thereby declaring occurrence of a detected event. The relative importance of the acquired data concerning a potential event can be analyzed by the processor 1202 based on the disparate forms of data 1220-1228 received by the processor 1202. The disparate forms of data 1220-1228 can be weighted the same or differently by a weighting scheme implemented by use of a weighting algorithm. The weighting algorithm can involve a multiplicity of weights that allow for adjustment of the relative importance of each of the disparate forms of data 1220-1228 (e.g., each data form can be weighted between 0% and 100% depending on its relative importance to other data forms) based on external source data, such as TMS data. For example, and as shown in FIG. 20A, the relative importance of the event data 1220 can be adjusted by modification of an event data weight, $W_{ED}$, 1230. The relative importance of the sensor data 1222 can be adjusted by modification of a sensor data weight, $W_{SD}$, 1232, while the relative importance of image capture data 1224 can be adjusted by modification of an image capture data weight $W_{ICD}$, 1234. The relative importance of the remote system data 1226 can be adjusted by modification of a remote system data weight, $W_{RSD}$, 1236, and the relative importance of other data 1228 can be adjusted by modification of and other data weight, $W_{OD}$, 1238. The processor 1202 is configured to implement image capture and/or event detector modification logic to adjust a weight of one or more data input to the event detector 108 based on external source data, such as TMS data, received from the remote system 1240.

Other embodiments may include or exclude a weighting scheme such as the type described hereinabove. Such other embodiments may involve performing Boolean algebraic operations on the various input data, and these operations can be adjusted based on external source data, such as TMS data, received from the remote system 1240. For example, assessment of acquired data surrounding a potential event of interest by the processor 1202 and event detector 108 may involve use AND or NAND logic on all or selected combinations of the input data. In some implementations, assessment of acquired data surrounding a potential event of interest by the processor 1202 and event detector 108 may involve use a combination of AND, NAND, OR and XOR logic on all or selected combinations of the input data. More complex real-time transmission logic can be implemented by the processor 1202 and event detector 108 using a combination of various logic gate constructs, such as a combination of AND, NAND, OR, NOR, XOR, and XNOR logic constructs.

The processor 1202 and the event detector 108 can operate cooperatively using one or both of a weighting algorithm and a Boolean logic scheme to determine whether or not event data indicates that an event of interest has occurred. As is shown in FIG. 20A, if the processor 1202 and event detector 108 determine that an event of interest has occurred based on one or both of the weighting algorithm and the Boolean logic scheme, an event data clip is packaged and transmitted to the media recorder 110/memory 111 for storage therein (and may also be transmitted in real-time to the remote system 1240). If the processor 1202 and event detector 108 determine that an event of interest has not occurred based on one or both of the weighting algorithm and the Boolean logic scheme, an event data clip is not created or, if created, is not transmitted to the media recorder 110/memory 111 for storage therein. Alternatively, a summary record of the potential event of interest (which does not rise to the level of an actual event) can be stored in the media recorder 110/memory 111.

In some embodiments, one of the forms of input data such as event data 1220, sensor data 1222, or image capture data 1224, can serve as a primary data input from which the processor 1202 and event detector 108 determine whether or not an event data clip is to be stored in the media recorder 110/memory 111. For example, sensor and image capture data may indicate occurrence of a potential event, but an event data clip is not stored in the media recorder 110/memory 111 unless the event data 1220 also indicates occurrence of the detected event. By way of further example, image capture data 1224 may indicate occurrence of a potential event, but an event data clip is not stored in the media recorder 110/memory 111 unless both the event data 1220 and sensor data 1222 also indicate occurrence of the detected event. In some modes of operation, event data 1220, image capture data 1224 or sensor data 1222 alone can trigger storage of the event data clip in the media recorder 110/memory 111, irrespective of the relevance of other data.

In some modes of operation, image capture data 1224 alone can trigger storing of the event data clip in response to sensing an occurrence of an event of interest, such as in the case of excessive movement of cargo within the trailer. In some implementations, the event detector 108 or a separate detector coupled to the image capture data stream 1224 can be configured to detect a change of the image within the field of view of a particular image capture device. An image change of a predefined magnitude relative to a threshold can cause the detector to generate a trigger signal and recording of the sensed event (e.g., image data as well as event, sensor and other data is recorded). The event detector 108 or separate detector can be configured to detect the change of the image within the field of view by analyzing changes (e.g., motion) between captured frames of image data, such as on a pixel-by-pixel or pixel cluster-by-pixel cluster basis.

The remote system data 1226 can represent data received from the remote system 1240 by the processor 1202. The remote system data 1224 can, for example, comprise data generated by a transportation management system. As discussed previously, various types of useful remote system data 1224 include data about cargo within the trailer, data about a driver of the tractor, data about a route over which the vehicle is scheduled to traverse or is currently traversing, trip data about a trip to be executed by the vehicle, mapping data, and refueling data such as scheduled refueling station data. Other useful remote system data 1224 include weather data, road condition data, bridge clearance data, traffic data, emergency data, Amber alert data, and terror threat data for a locale or region through which the vehicle is passing or is scheduled to pass. Other data 1228 can include data received from an on-board system, such as a refrigeration system.

Figure 20B:
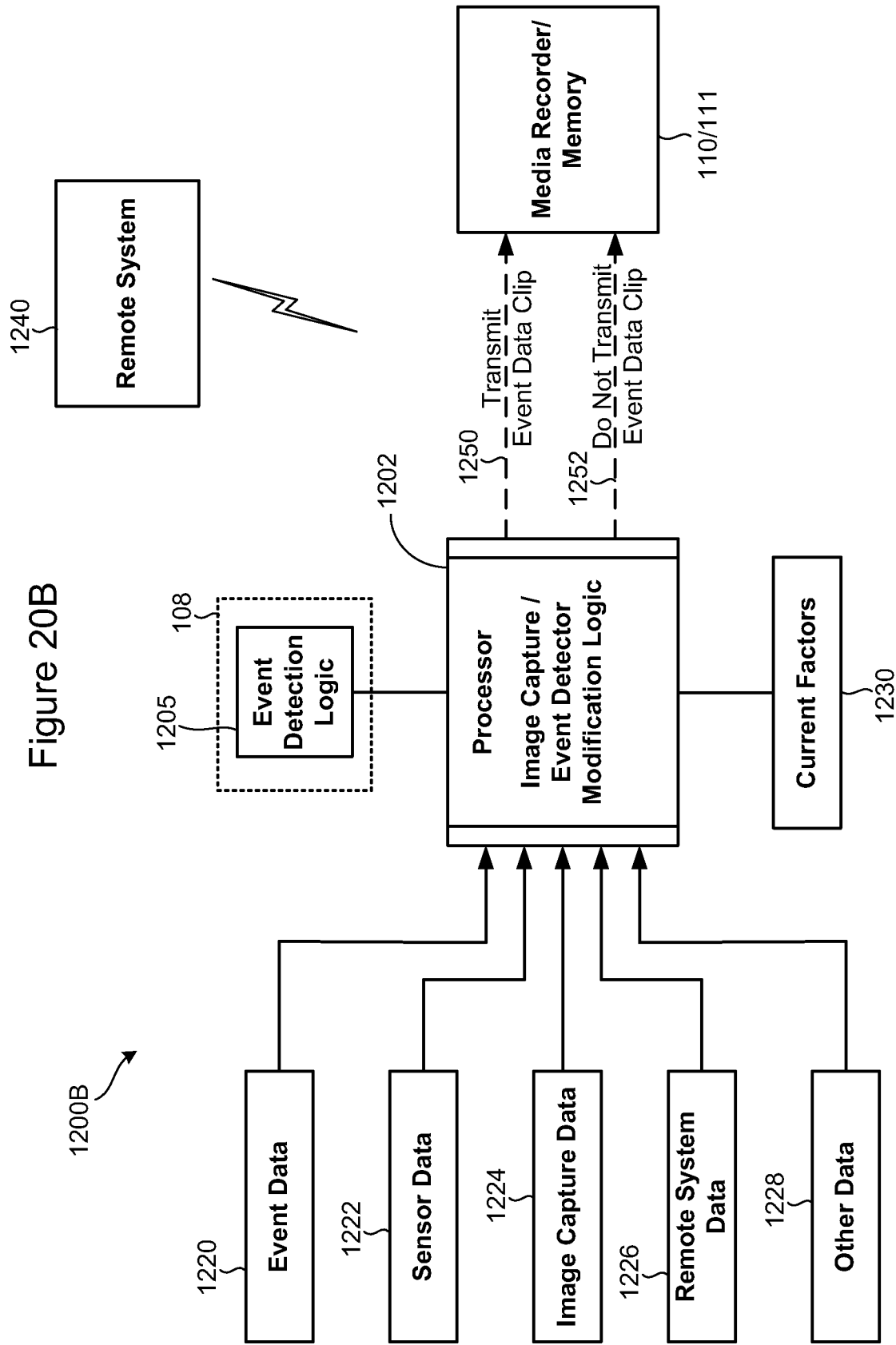
FIG. 20B is a block diagram showing a portion of a system configured for implementation in a vehicle comprising a tractor and a trailer, and for modifying one or both of an image capture strategy and an event detection strategy implemented by an onboard event detector in accordance with various embodiments.

FIG. 20B is a block diagram showing a portion of a system 1200B configured for implementation in a vehicle comprising a tractor and a trailer and for modifying one or both of an image capture strategy and an event detection strategy in accordance with various embodiments. The system 1200B of FIG. 20B is similar to that shown in FIG. 20A, with the exception that current factors 1230, rather than a weighting scheme, are used to implement image capture and/or event detector modification by the processor 1202. In the illustrative embodiment shown in FIG. 20B, current factors 1230 in addition to, or exclusive of, those indicated by event data 1220, sensor data 1222 or image capture data 1224 are used by the processor 1202 when determining whether or not an event data clip for a detected event should or should not be stored in the media recorder 110/memory 111.

Current factors 1230 that can be used by the processor 1202 when implementing image capture and/or event detector modification logic include one or more of data about the cargo within the trailer, data about the driver of the tractor, road conditions impacting the vehicle, weather conditions impacting the vehicle, road repair activity impacting the vehicle, law enforcement activity impacting the vehicle, an accident impacting the vehicle or the vehicle's progress, an emergency situation impacting the vehicle or the vehicle's progress, an operating status of the vehicle, an operating mode of the tractor, whether the tractor is in park or drive, whether or not the tractor is in reverse, whether or not the trailer is hitched to the tractor, whether or not the trailer is actively being hitched to the tractor, and whether cargo is being loaded or unloaded respectively into and from the trailer.

It is noted that, according to some embodiments, the remote system 1240 can comprise a device separate from the vehicle system 1200A (FIG. 20A)/1200B (FIG. 20B) but is in proximity (e.g., short range RF or Bluetooth range) to the system 1200A/1200B. Such a remote system 1240 can be a smartphone, a laptop, a tablet, or other system that can communicatively couple (e.g., pair) to the vehicle system 1200A/1200B. Data from such a portable system 1240 can be transferred between the portable system 1240 and the processor 1202. The portable system 1240 can, for example, serve as a modem, allowing the vehicle system 1200A/1200B to communicate with other remote systems via a cellular or other communication link.

According to some embodiments, the event detection logic 1205 implemented by the event detector 108 can be responsive to a variety of predefined events involving the trailer of the vehicle. The following are non-exhaustive illustrative examples of various predefined events involving the trailer that can cause the event detector 108 to generate a trigger signal. In some implementations, a door of the trailer is equipped with a sensor configured to generate a signal when the door is open and/or closed. The event detector 108 can be configured to generate a trigger signal in response to opening of the trailer door, and the processor 1202 can be configured to coordinate recording of image and other data in response to the trigger signal. The processor 1202 can be configured to terminate a recording of the image data and storing of other related data in response to closing of trailer door.

According to some embodiments, the processor 1202 is configured to coordinate recording of image data and other data during loading and unloading of the trailer. This image data is particularly useful in assessing whether damage has occurred during the loading or unloading phases of shipping, and can assist in determining which party is liable for such damage. This image data can also be useful to confirm safe shipment (including during loading and unloading) of cargo from the shipper to the consignee, particularly in situations where cargo damage occurs subsequent to the unloading phase or where the cargo is out of the shipper's control. Image data capture during cargo loading and unloading can be useful in assessing claims made by workers for injury that are alleged to have occurred during the loading and unloading phases, for example.

In some embodiments, the one or more capture devices are configured to capture images of cargo items within the trailer. The processor 1202 is configured to coordinate recording of image data for each of the cargo items during loading and unloading of the cargo items within the trailer. In some implementations, the event detector 108 is configured to generate a trigger signal in response to an anomaly in a captured image of a particular cargo item (e.g., fragile cargo item beneath a heavy cargo item, a cargo item placed upside down, a cargo item misplaced in the trailer due to size or weight factors). The processor 1202 is configured to coordinate recording of image data for the particular cargo item in response to the trigger signal.

According to some embodiments, and with reference once again to FIGS. 1-4, the one or more image capture devices 112 can comprise single lens devices, while in other embodiments, the image capture devices can comprise multiple lens devices. For example, at least one of the image capturing devices 112 may comprise a stereoscopic image capture device. In some implementations, at least one pair of the image capture devices may be configured to operate as a stereo camera arrangement. In other embodiments, one, two or more of the image capture devices 112 can have a panoramic field of view.

In some embodiments, at least one of the image capture devices can comprise a still photography camera. In other embodiments, at least one of the image capture devices can comprise a motion video camera. In further embodiments, at least one of the image capture devices comprises a still photography camera while at least one other image capture device comprises a motion video camera. In the case of a motion video camera, this device can be configured to operate at a selected frame rate in response to a control signal (e.g., via the device controller 310 shown in FIG. 3A). The frame rate may be a rate between approximately 1 and 30 frames per second (fps). In some implementations, the frame rate may be greater than 30 fps to allow for high-speed (slow-motion) image capture, such as 60 fps, 100 fps, 200 fps or between 200 and 1,000 fps, for example. It is noted that higher frame rates can result in reduced resolution. The frame rate can be selected via the control signal in response to various factors, either manually or automatically by the system 1200, such as via a control system received from a TMS or other remote system. For example, the frame rate of a particular image capture device can be increased from a normal frame rate (e.g., 30 fps) to a relatively high frame rate (e.g., 200 fps) in response to detecting sudden acceleration or sudden deceleration of the vehicle 150. Increasing the frame rate can produce slow-motion images that can be useful for assessing whether and when stress or damage to cargo or vehicle occurred during shipping.

A variety of different image capture devices can be deployed at, on or within a tractor and/or trailer of a vehicle depending on need or desired functionality. For example, one or more of the image capture devices can include a near infrared (NIR) camera, a night-vision camera, or a thermal-vision camera. It is noted that some or all of the image capture devices 112 deployed at the vehicle can include a microphone, and one or more of the devices 112 can incorporate proximity sensors. In some embodiments, at least one of the image capture devices can be configured for selective operation in a normal light mode and a low-light mode, such as a night-vision mode. In other embodiments, at least one of the image capture devices 112 can be configured for selective operation in a normal light mode and a near infrared mode.

In accordance with various embodiments, the image capture strategy implemented by the onboard system 102 (shown in FIG. 3A) in response to external source data (e.g., TMS data) can be tailored for a particular vehicle and/or the particular cargo carried by the vehicle. The image capture strategy implemented by the onboard system 102 can be tailored in view of various other factors, including route, weather, road conditions, driver behavior, history and/or status (e.g., HOS status), and traffic, among others. In some embodiments, the image capture strategy implemented by the onboard system 102 can be tailored or adjusted based on the cargo or load within the trailer. For example, the image capture strategy can be tailored or adjusted based on one or more of the value of the cargo, volume of the cargo, weight of the cargo, fragility of the cargo, orientation of the cargo within the trailer, location of cargo items within the trailer, position of cargo items relative to other cargo items within the trailer, hazardous material classification of the cargo, and special handling instructions concerning the cargo, among other factors.

Figure 21A:
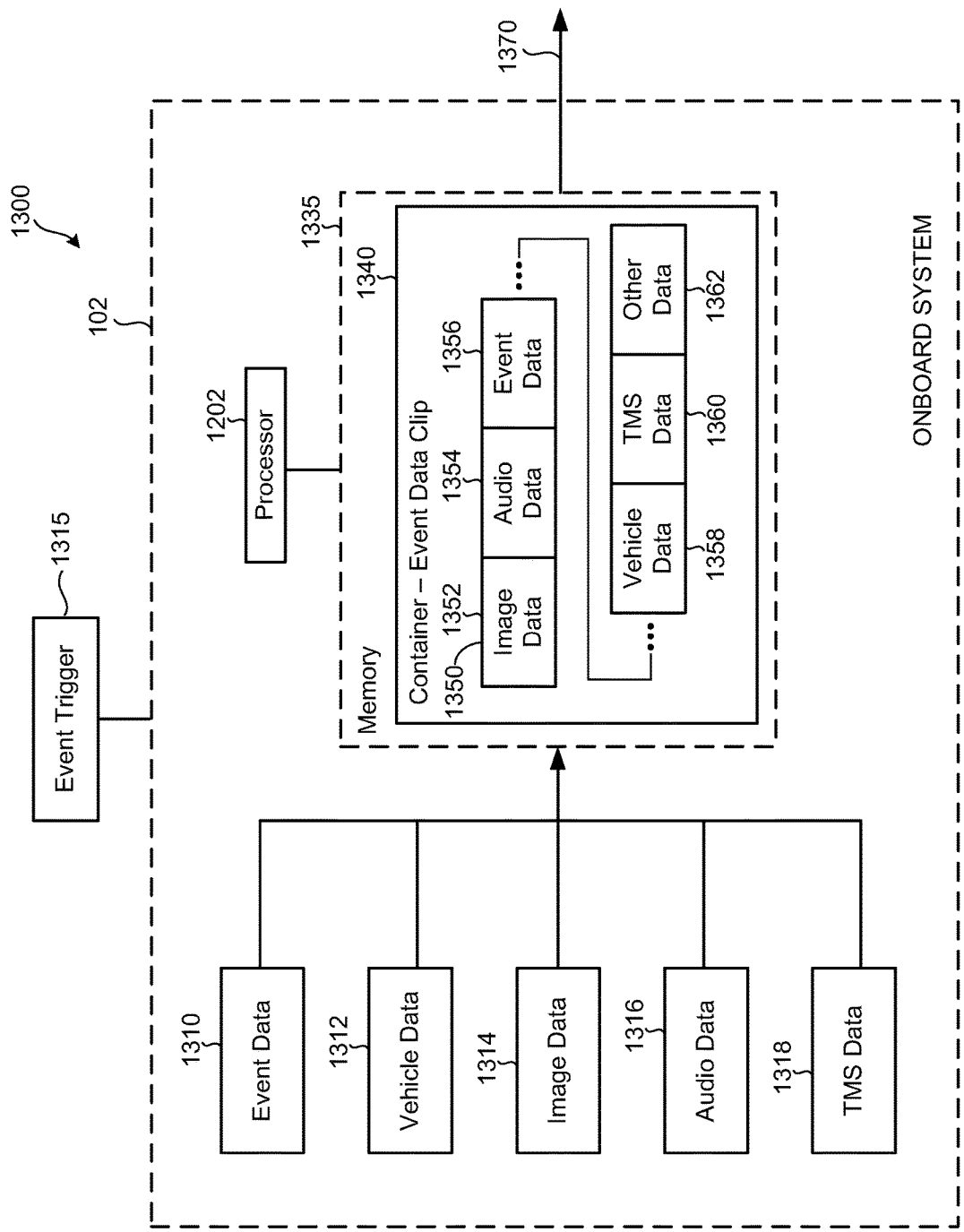
FIG. 21A illustrates a system for acquiring and processing image intelligence information and for modifying one or both of an image capture strategy and an event detection strategy implemented by an onboard computer in accordance with various embodiments.

FIG. 21A illustrates a system 1300 for acquiring and processing image intelligence information, event data, vehicle data, and other data for modifying one or both of an image capture strategy and an event detection strategy by an onboard computer in accordance with various embodiments. In particular, FIG. 21A illustrates an arrangement for processing disparate forms of information acquired and/or used by an onboard system 102 for use and storage onboard and, optionally, for transmission substantially in real-time to a remote destination. The onboard system 102 is configured to receive various types of information from a variety of data sources and to process such data while a vehicle is in operation (or optionally when the vehicle is not in operation). The system 1300 includes an event trigger 1315 which initiates capturing, processing, storing, and transmission of various data associated with a triggering event. The onboard system 102 includes a number of sources that provide for various forms of captured data, including event data 1310, vehicle data 1312, image data 1314, audio data 1316, and TMS data 1318. In response to a triggering event, the event trigger 1315 generates a trigger signal which is received by each of the sources of the data 1310-1318, causing capturing and storing or buffering of its associated data for subsequent transmission to a remote destination substantially in real-time or in a batch mode.

Each of the forms of captured data shown in FIG. 21A is associated with a particular data or file type, format, and/or protocol. In the illustrative example shown in FIG. 21A, the captured event data 1310, captured vehicle data 1312, and captured TMS data 1318 may have a known data format, such as an ASCII, Unicode or UCS data format. The captured image data 1314 may have a file format which is dependent on a particular codec (encoder/decoder) that is used to encode the image data. The captured audio data 1316 may have a file format which is dependent on a particular codec that is used to encode the audio data.

The image data can be video and/or still image data, and as such, different codecs can be associated with the different types of captured image data 1314. Examples of useful video coding formats include MPEG-2 Part 2, MPEG-4 Part 2, H.264 (MPEG-4 Part 10), HEVC, Theora, Dirac, RealVideo RV40, VP8, VP9, VC-1, WMV, and AVS. Examples of useful digital image (e.g., still photographs) coding formats include JPEG (Exif, JFIF), TIFF, PNG, RAW, GIF, BMP, Netpbm (PPM, PGM, PBM, PNM), WEBP, HDR raster formats, CGM, RS-274X, SVG, 2D vector formats, and 3D vector formats. Useful compound digital image coding formats include EPS, PDF, PostScript, PICT, SWF, and XAML. Useful stereo digital image coding formats include MPO (Multi Picture Object), PNS (PNG Stereo), and JPS (JPEG Stereo). A variety of audio coding formats can be used for captured audio data 1316. Examples of useful audio coding formats include 8SVX, AAC, AC3, AMR, Cook Codec, ATRAC3, DTS, FLAC, Monkey's Audio, WavPack, Shorten, Sonic Audio, MP3, RealAudio, Speex, Vorbis, WMA, Musepack, TTA, and QCELP.

In some embodiments, image data can be packaged or associated with other forms of data that have some relation to the captured image data 1314. Suitable image data formats for such embodiments include those that allow for the appending or associating of data related to the image data. The related data may be included with the image data as a payload, a sidecar file, metadata or a tag. In some implementations, related data may be packaged (e.g., embedded) with captured image data 1314 in accordance with an XMP (Extensible Metadata Platform) standard, without the use of a sidecar file. Embedding related data using an XMP standard serves to avoid problems that can occur when related data (e.g., payload or metadata) are stored separately from the captured image data 1314. A similar approach can be implemented for packaging or associating audio data with other forms of data that have some relation to the captured audio data 1316.

With further reference to FIG. 21A, the onboard system 102 includes a processor 1202 coupled to a memory 1335. The memory 1335 is configured to store, among other elements, a container 1340 generated by the processor 1202 in response to receiving various forms of captured data (e.g., data sets 1310-1318 shown in FIG. 21A). The container 1340 is a file which contains various forms of captured data to be packaged for transmission as a data signal or data stream. In some embodiments, the container 1340 can include an envelope file, such as a ZIP file, within which various disparate files are stored and typically compressed. In response to a triggering event, the processor 1202 cooperates with the memory 1335 to capture and organize disparate forms of data generated by disparate sources of the system 1300. The captured data for a given event can be processed into an envelope file (e.g., ZIP file), thus packaging the available source information concerning a particular vehicle event within a common file structure. In some implementations, the envelope file can be named in a manner which uniquely identifies the source and date/time of the event. The envelope file for the event can be transmitted as a data signal or data stream 1370 for reception at a remote destination.

According to some embodiments, an interleaved file structure can be generated by the processor 1202 in order to produce a data signal or data stream 1370 which incorporates the various disparate data source information generated by the onboard system 102. In some implementations, the processor 1202 and memory 1335 cooperate to capture and organize disparate event data received from disparate sources distributed throughout the vehicle and communicatively coupled to the onboard system 102. The captured data represents pertinent information concerning a particular event captured by the various data sources in response to a trigger signal generated by the event trigger 1315. The captured data thus represents all pertinent information acquired by the system 1300 for a given event. The processor 1202 and memory 1335 cooperate to generate a container 1340 which, according to some embodiments, represents an event data clip which can include image, audio, and other data representing the various forms of disparate data captured by the onboard system 102.

In general terms, the container 1340 shown in FIG. 21A describes the structure of a file where the various pieces or "chunks" of captured data associated with a given event are stored, how these data are interleaved, and which codecs are used by each piece of data. The container 1340, also referred to as a wrapper, can be configured to package image data (video and/or still photography), audio data, related metadata, and payload or sidecar data. The container 1340 can be configured to contain a wide variety of data formats and codecs. By way of example, a .MOV container can hold almost any kind of codec data. .MP4 and .AVI container files can also hold a wide variety of codecs as their contents. A .MOV file, for example, can contain H.264 data, while a .AVI file can contain DivX data. The quality, degree of compression, and features of the image and/or audio data itself is based in large part on the specifications of the particular codec being used. A non-exhaustive list of useful containers 1340 include those that conform to an AIFF (e.g., AIFF-C), WAV, AVI, MPEG-4 Part 14, FLV, MOV, OGG (e.g., OGM, OGV), MKV, VOB, and ASF specification. As was discussed hereinabove, various related pieces of data relating to a common vehicle event may be embedded with captured image data 1314 and/or captured audio data 1316 and packaged within a container 1340 in accordance with an XMP (Extensible Metadata Platform) standard.

In the embodiment illustrated in FIG. 21A, the container 1340 includes an event data clip 1350 which is processed to comprise various forms of disparate data associated with a given vehicle event. The representative event data clip 1350 shown in FIG. 21A can include image data 1352, audio data 1354, event data 1356, vehicle data 1358, TMS data 1360 and possibly other data 1362. In some implementations, the event data clip 1350 represents a single composite data signal or stream that contains all of the pertinent pieces of data for a given vehicle event. In other implementations, the image data 1352 and audio data 1354 are processed as an individual or, alternatively, a combined data stream, while the other forms of event data are processed as a separate data stream, all of which are wrapped in the container 1340. In such implementations, the container 1340 can include two or more event-related data streams. As was previously mentioned, each of the pieces or "chunks" of data defining the event data clip 1350 can have its own codec(s) within the container 1340. The event data clip 1350 is stored locally within the memory 1335 of the onboard system 102 and is transmitted as an output data stream 1370 substantially in real-time for reception by a remote system. Various data packaging methodologies disclosed herein can obviate the need for timestamp data associated with some or all of the disparate data streams that define an event data clip, thereby reducing processing complexity.

In some embodiments, the processor 1202 cooperates with the event detector to determine that an event has occurred and, in response, performs additional analysis to determine if the detected event is of sufficient important to warrant real-time transmission of an event data clip to the remote system. It is understood that real-time transmission of information, particularly multimedia data (e.g., video, photo, aural), can be bandwidth intensive, involving increased transmission time and cost relative to non-multimedia data, such as ASCII data for example. Accordingly, the real-time transmission logic implemented by the processor 1202 provides for judicious selection (e.g., via a weighting algorithm and/or Boolean logic scheme) of what data should or should not be transmitted in real-time to the remote system 1240, even if such data caused an event of interest to be detected by the event detector.

In some embodiments, real-time transmission of data and command signaling can occur bi-directionally between the processor 1202 of the vehicle system and the remote system. For example, the processor 1202 can request data (e.g., via a command signal) from the remote system in real-time, and the remote system can provide the requested data to the processor 1202 in real-time. In other embodiments, the processor 1202 can be configured to coordinate taking a snapshot of a driver of a particular vehicle and transmit the driver snapshot to the remote system in real-time. The processor 1202 can be configured to receive in real-time a verification signal from the remote system in response to transmission of the driver snapshot. The verification signal can indicate confirmation or lack of confirmation that the driver is authorized to drive the particular vehicle or to haul particular cargo (e.g., hazardous material, munitions) loaded in the trailer. In response to receiving a lack of conformation signal from the remote system, the processor 1202 can be configured to take corrective action, such as rendering the vehicle undriveable, broadcasting and/or displaying a warning, dispatching a message to a supervisor of the driver or to local law enforcement, etc.

Image data capture and real-time transmission of same to the remote system can also be useful in cases where a scheduled detention time at a drop-off destination exceeds a predetermined duration (e.g., as indicated in TMS data received by the processor 1202 from the remote system). Detention time is understood as the total amount of time a delivery vehicle is scheduled to remain at a drop-off location (e.g., consignee cargo bay) for a particular delivery. The scheduled detention time typically takes into account the amount of time required to load and/or unload cargo to/from the vehicle while at the drop-off location. When the scheduled detention time is exceeded as monitored by the processor 1202, the processor 1202 can be configured to initiate real-time transmission of image capture data (e.g., taken in and/or around the trailer) and other data (e.g., audio data) to the remote system. This data can also be recorded on the media recorder of the vehicle system. Real-time viewing of conditions at the vehicle by remote system viewers allows for remote entities to determine reasons for excessive detention times and appropriate allocation of cost and responsibility associated with such excesses.

Figure 21B:
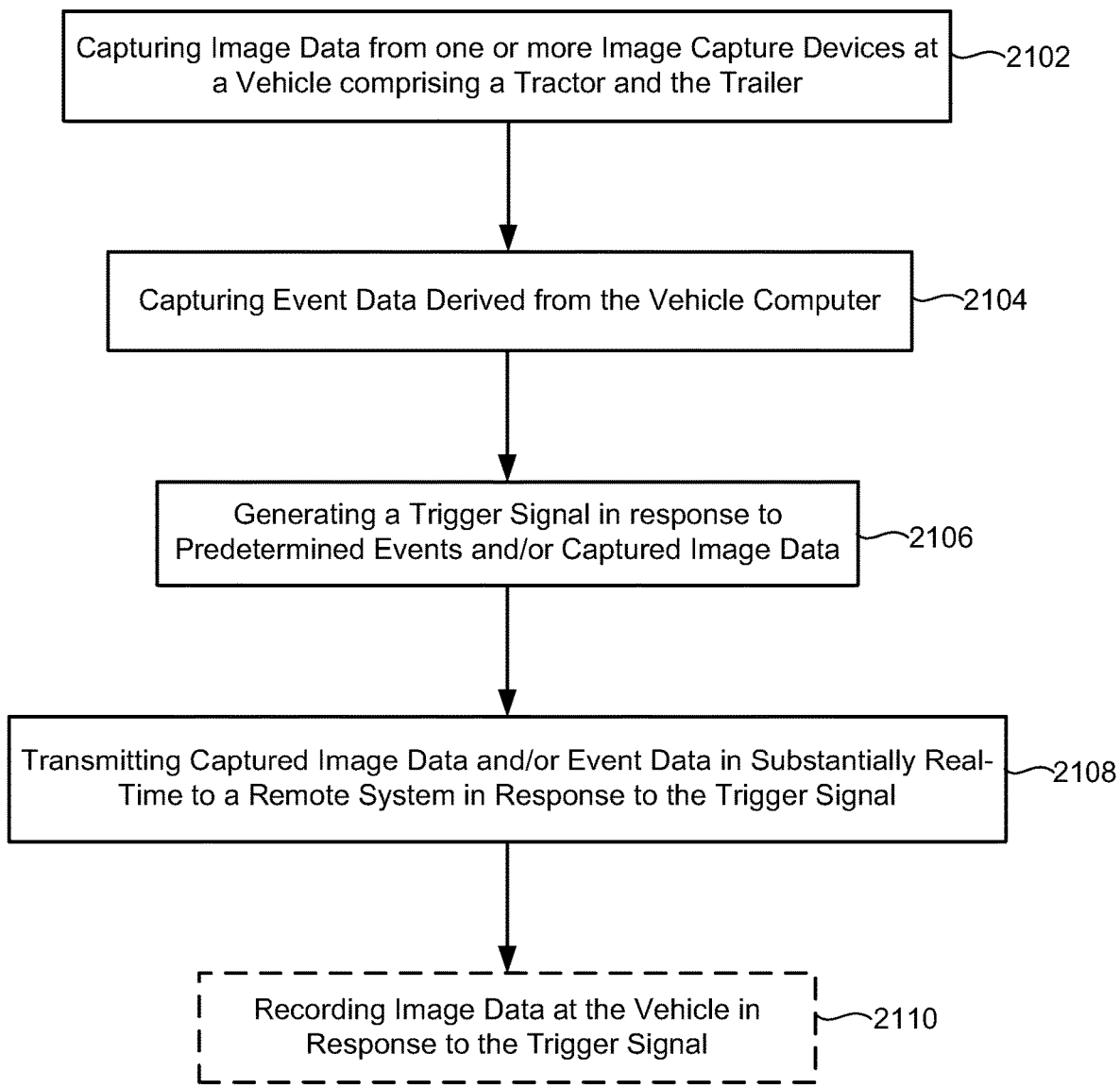
FIG. 21B is a flow chart showing various processes for implementing real-time image intelligence transmission for a commercial vehicle having a trailer in accordance with various embodiments.

Turning now to FIG. 21B, there is illustrated a flow chart showing various processes for implementing real-time image intelligence transmission involving a vehicle comprising a tractor and a trailer in accordance with various embodiments. The methodology illustrated in FIG. 21B involves capturing 2102 image data from one or more image capture devices at the vehicle, and capturing 2104 event data derived from the vehicle computer, such as via a vehicle network bus. The methodology also involves generating 2106 a trigger signal in response to predetermined events and/or captured image data, and transmitting 2108 captured image data and/or event data in substantially real-time to a remote system in response to the trigger signal. The methodology illustrated in FIG. 21B can also involve recording 2110 image data in the vehicle in response to the trigger signal.

FIG. 21C is a flow chart showing various processes for implementing real-time image intelligence transmission involving a vehicle comprising a tractor and a trailer in accordance with various embodiments. The methodology illustrated in FIG. 21C involves capturing 2112 image data from one or more image capture devices at the vehicle, and capturing 2114 event data derived from the vehicle computer. The methodology also involves generating 2116 a trigger signal in response to predetermined events and/or captured image data, and transmitting 2118 captured image data and/or event data in substantially real-time to a remote system in response to the trigger signal. The methodology further involves transmitting 2120 captured image data and/or event data in substantially real-time to a display within the tractor in response to the trigger signal. The methodology illustrated in FIG. 21C can also involve recording 2122 image data in the vehicle in response to the trigger signal.

Figure 21D:
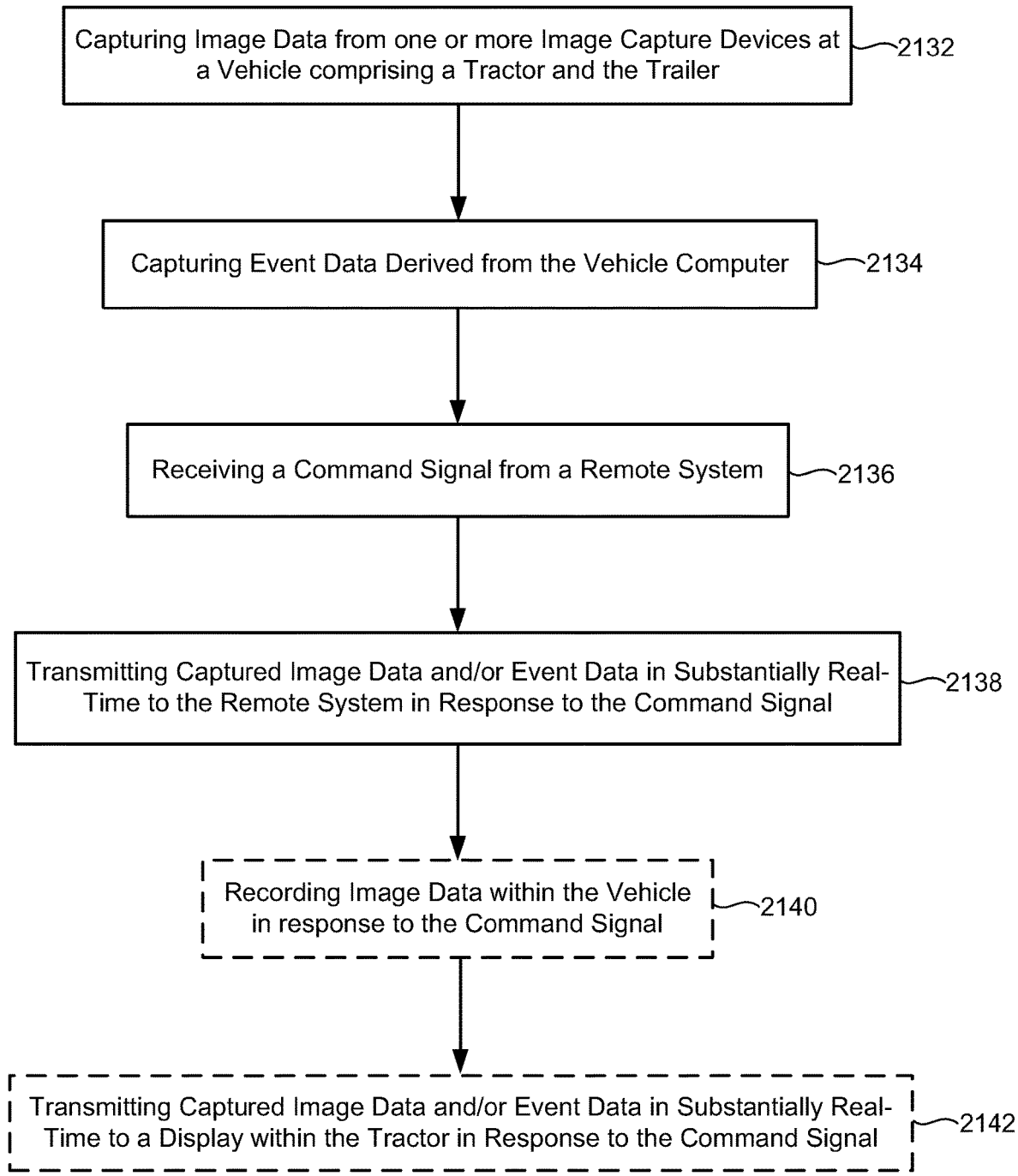
FIG. 21D is a flow chart showing various processes for implementing real-time image intelligence transmission for a commercial vehicle having a trailer in accordance with various embodiments.

FIG. 21D is a flow chart showing various processes for implementing real-time image intelligence transmission involving a vehicle comprising a tractor and a trailer in accordance with various embodiments. The methodology illustrated in FIG. 21D involves capturing 2132 image data from one or more image capture devices at the vehicle, and capturing 2134 event data derived from the vehicle computer. The methodology also involves receiving 2126 a command signal from a remote system, such as a transportation management system, and transmitting 2128 captured image data and/or event data in substantially real-time to the remote system in response to the command signal. The methodology illustrated in FIG. 21D can further involve recording 2140 image data within the vehicle in response to the command signal, and may also involve transmitting 2142 captured image data and/or event data in substantially real-time to a display within the tractor in response to the command signal.

Figure 21E:
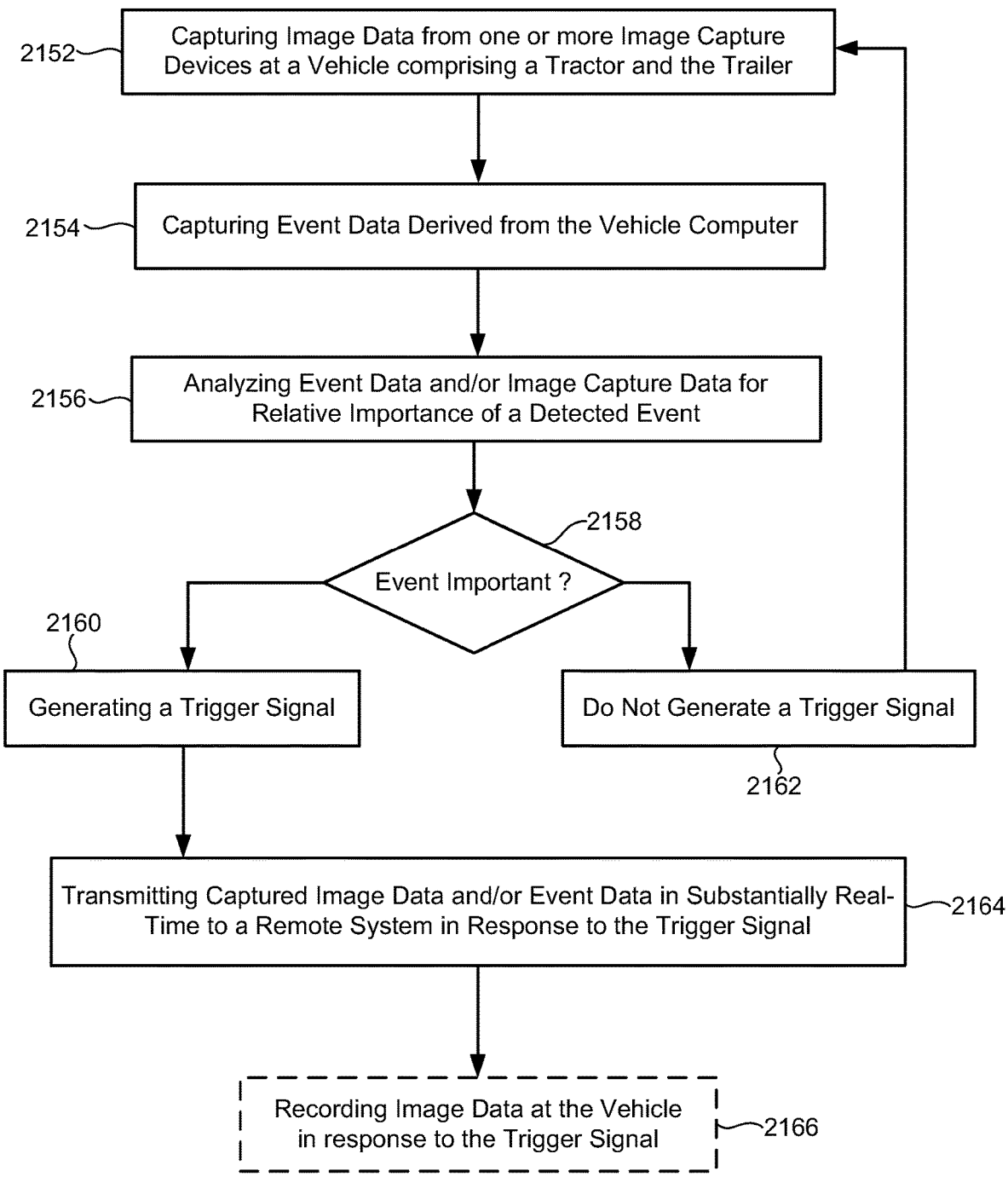
FIG. 21E is a flow chart showing various processes for implementing real-time image intelligence transmission for a commercial vehicle having a trailer in accordance with various embodiments.

FIG. 21E is a flow chart showing various processes for implementing real-time image intelligence transmission involving a vehicle comprising a tractor and a trailer in accordance with various embodiments. The methodology illustrated in FIG. 21E involves capturing 2152 image data from one or more image capture devices at the vehicle, and capturing 2154 event data derived from the vehicle computer. The methodology also involves analyzing 2156 event data and/or image capture data for relative importance of a detected event. A determination 2158 is made as to whether or not the event is important, various approaches of which are described hereinabove. If deemed important, a trigger signal is generated 2160. If deemed not important, a trigger signal is not generated 2162, and processing continues at block 2152. In response to the trigger signal 2160, captured image data and/or event data is transmitted 2164 in substantially real-time to a remote system. The methodology illustrated in FIG. 21E can optionally include recording 2166 image data at the vehicle in response to the trigger signal.

Figure 21F:
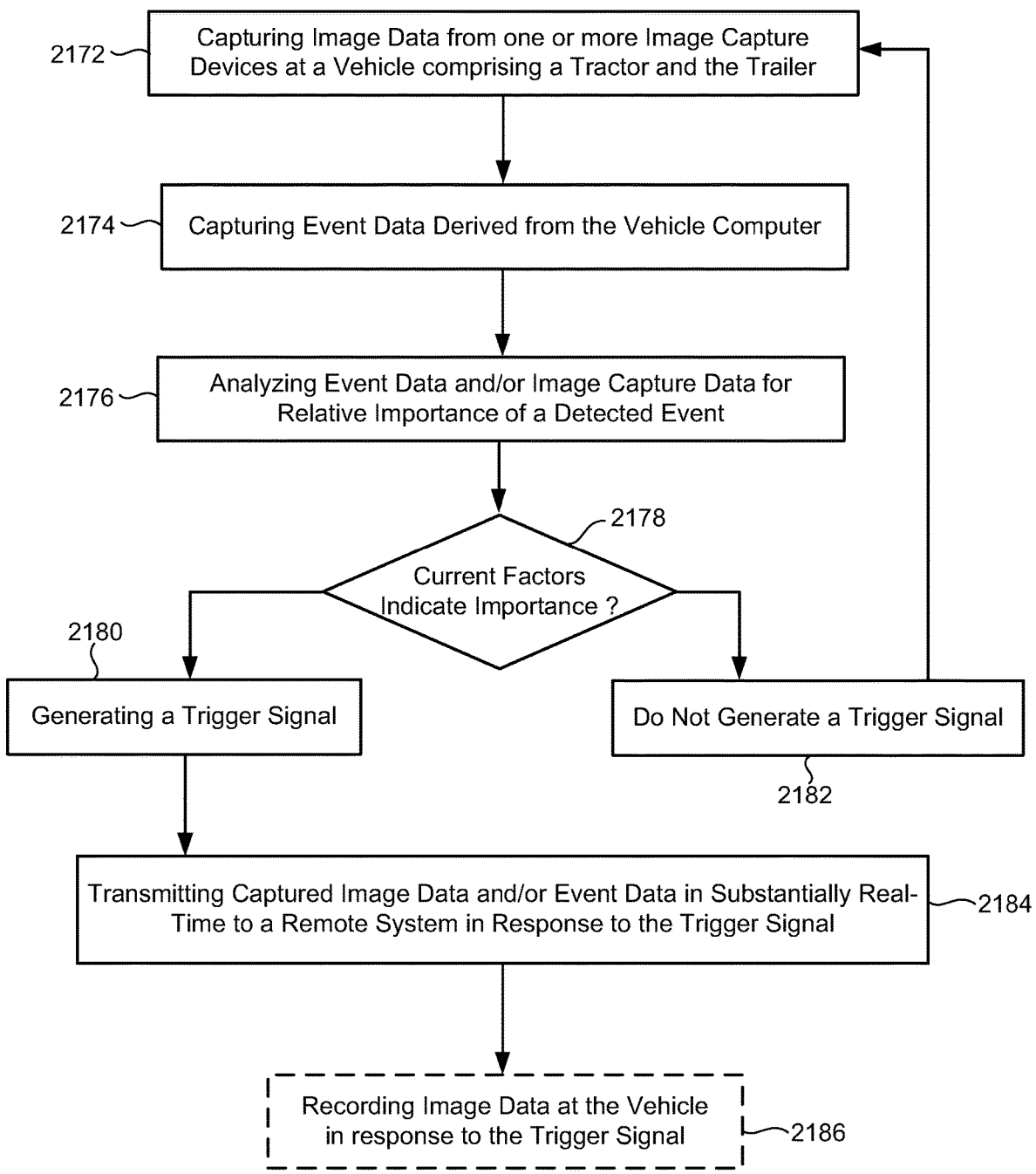
FIG. 21F is a flow chart showing various processes for implementing real-time image intelligence transmission for a commercial vehicle having a trailer in accordance with various embodiments.

FIG. 21F is a flow chart showing various processes for implementing real-time image intelligence transmission involving a vehicle comprising a tractor and a trailer in accordance with various embodiments. The methodology illustrated in FIG. 21F involves capturing 2172 image data from one or more image capture devices at the vehicle, and capturing 2174 event data derived from the vehicle computer. The methodology also involves analyzing 2176 event data and/or image capture data for relative importance of a detected event. A determination 2178 is made as to whether or not the event is important based on one or more current factors. If deemed important, a trigger signal is generated 2180. If deemed not important, a trigger signal is not generated 2182, and processing continues at block 2172. In response to the trigger signal, captured image data and/or event data is transmitted 2184 in substantially real-time to a remote system in response to the trigger signal. The methodology illustrated in FIG. 21F can optionally include recording 2186 image data at the vehicle in response to the trigger signal.

Figure 21G:
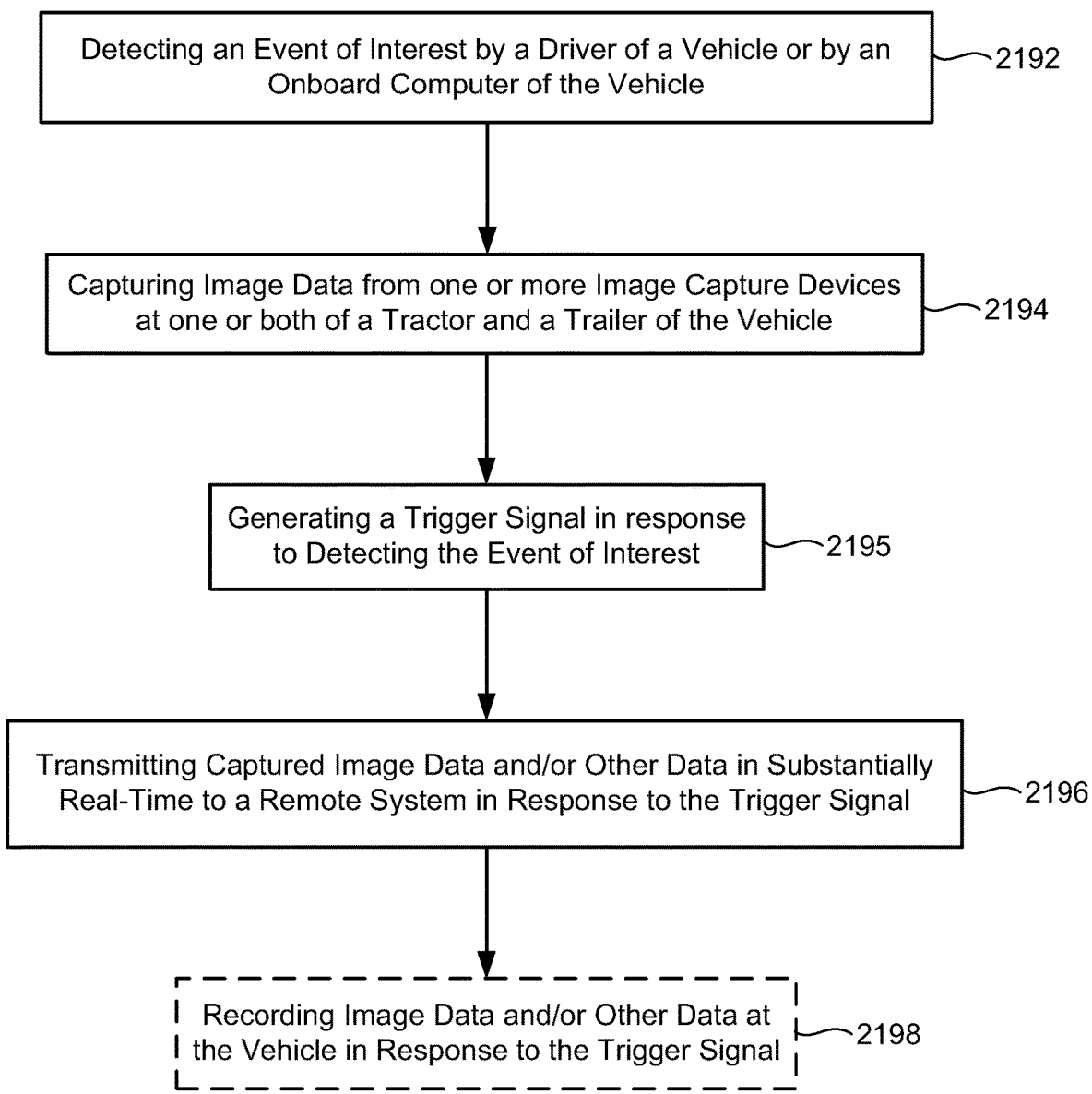
FIG. 21G is a flow chart showing various processes for implementing real-time image intelligence transmission for a commercial vehicle having a trailer in accordance with various embodiments.

FIG. 21G is a flow chart showing various processes for implementing real-time image intelligence transmission involving a vehicle comprising a tractor and a trailer in accordance with various embodiments. The methodology illustrated in FIG. 21G involves detecting 2192 an event of interest by a driver of a vehicle or by an onboard computer of the vehicle. The methodology also involve capturing 2194 image data from one or more image capture devices at one or both of a tractor and a trailer of the vehicle. The methodology further involves generating 2195 a trigger signal (manually or automatically initiated) in response to detecting the event of interest, and transmitting 2196 captured image data and/or data in substantially real-time to a remote system in response to the trigger signal. The methodology illustrated in FIG. 21G can optionally involve recording 2198 image and/or other data in the vehicle in response to the trigger signal, and can optionally involve transmitting image data and/or data in substantially real-time to a display within the tractor in response to the trigger signal.

Various embodiments are directed to systems and methods for providing near real-time feedback to a driver soon after an event of interest occurs while operating a vehicle. Embodiments of the disclosure provide for training or coaching of a driver soon after occurrence of a driving event that negatively impacts the vehicle, cargo, or safety while operating the vehicle. Rather than waiting for completion of the entire trip to receive feedback, driving or safety infractions can be addressed directly with the driver during the trip, such as during non-driving periods including when the driver reaches the next scheduled fuel stop, a toll plaza, a service break, or other suitable time when the vehicle is either parked or in a non-driving state. Image and event data associated with the driving event of interest can be played back and reviewed by the driver, alone or together with a trainer or coach via the onboard system, a cell phone, a laptop, a tablet, Skype or Face Time, or other mode of communication.

Figure 22:
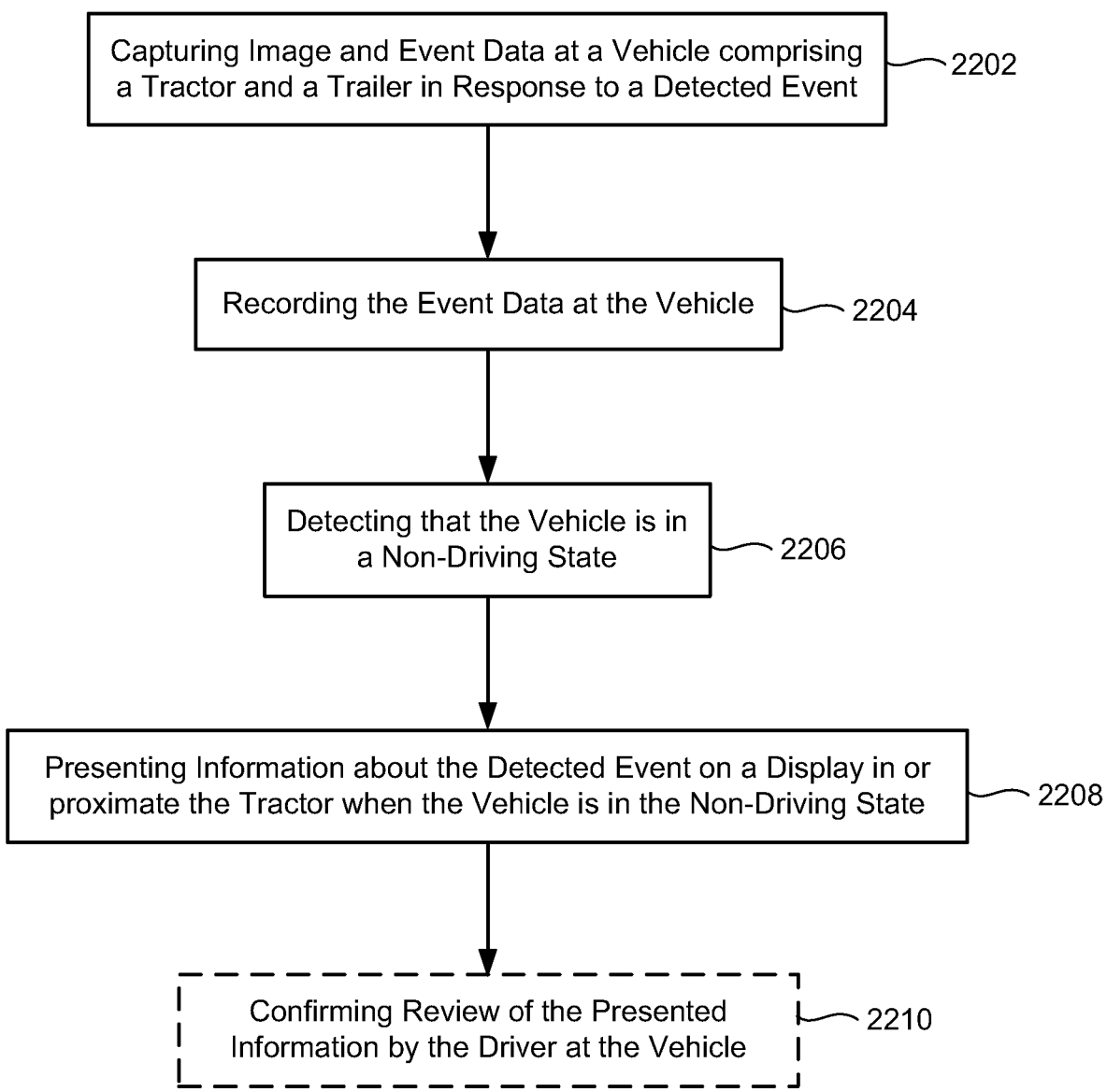
FIG. 22 is a flow chart showing various processes for conducting driver training during a trip implemented at least in part by an onboard computer of a commercial vehicle in accordance with various embodiments.

FIG. 22 illustrates various processes involving training of a driver soon after the detection of an event of interest occurring at the vehicle in accordance with various embodiments. The methodology shown in FIG. 22 involves capturing 2202 image and event data at a vehicle comprising a tractor and a trailer in response to a detected event, and recording 2204 the event data at the vehicle. The methodology also involves detecting 2206 that the vehicle is in a non-driving state, and presenting 2208 information about the detected event on a display in or proximate the tractor when the vehicle is in the non-driving state. The methodology shown in FIG. 22 can optionally involve confirming 2210 review of the presented information by the driver at vehicle. The confirmation process may involve confirming completion of the training session via a user interface at the vehicle and/or transmitting a completion signal to a remote system, such as a TMS.

Figure 23:
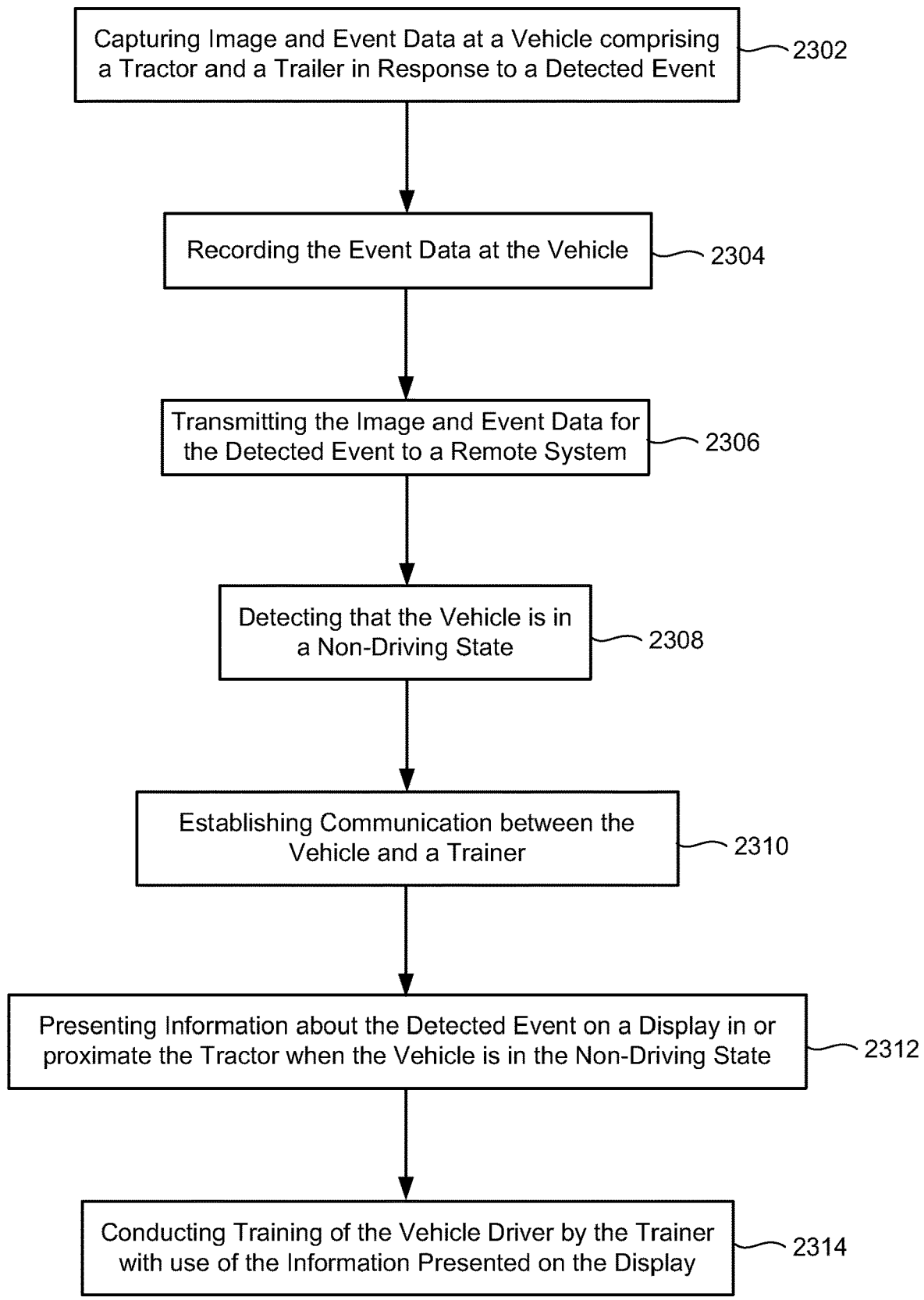
FIG. 23 is a flow chart showing various processes for conducting driver training during a trip implemented at least in part by an onboard computer of a commercial vehicle in accordance with various embodiments.

FIG. 23 illustrates various processes involving training of a driver soon after the detection of an event of interest occurring at the vehicle in accordance with various embodiments. The methodology shown in FIG. 23 involves capturing 2302 image and event data at a vehicle comprising a tractor and a trailer in response to a detected event, and recording 2304 the event data at the vehicle. The methodology also involves transmitting 2306 the image and event data for the detected event to a remote system, and detecting 2308 that the vehicle is in a non-driving state. The methodology further involves establishing 2310 communication between the vehicle and a trainer or coach, which can be made via the remote system (e.g., TMS), a cell phone, a tablet, or a laptop, for example, and presenting 2312 information about the detected event on a display in or proximate the tractor when the vehicle is in the non-driving state. For example, the information may be presented on a display of the onboard system located in the tractor cab or can be transmitted to a portable communication device such as the driver's cell phone, tablet or laptop. The methodology also involves conducting training 2314 of the vehicle's driver by the trainer with use of the information presented on the display. The training methodology illustrated in FIG. 23 advantageously obviates the need to transfer event-related data from the vehicle, to the remote system, and then back to the vehicle, since the event-related data is already available at the vehicle (e.g., stored on the media recorder and/or onboard memory).

Figure 24:
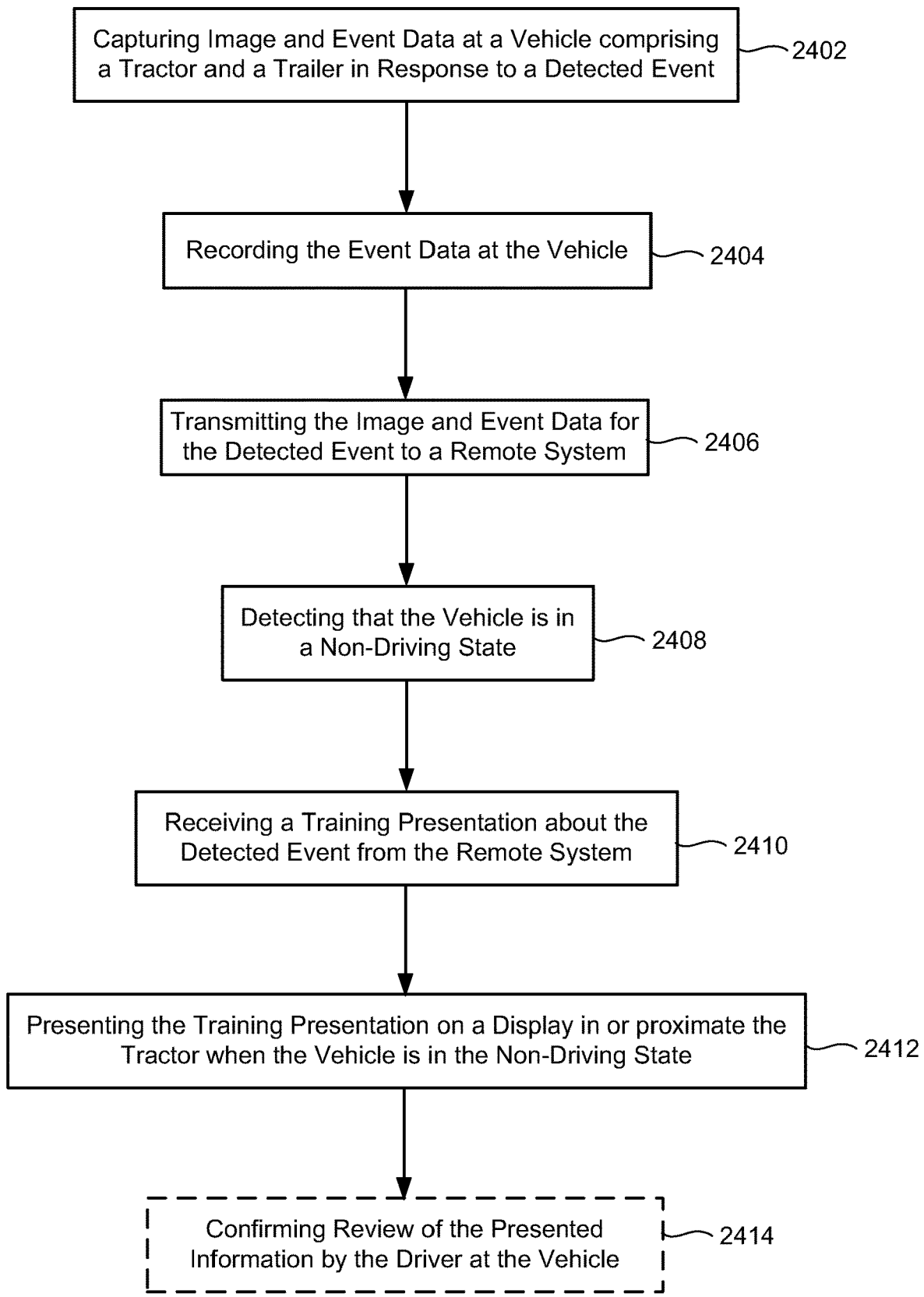
FIG. 24 is a flow chart showing various processes for conducting driver training during a trip implemented at least in part by an onboard computer of a commercial vehicle in accordance with various embodiments.

FIG. 24 illustrates various processes involving training of a driver soon after the detection of an event of interest occurring at the vehicle in accordance with various embodiments. The methodology shown in FIG. 24 involves capturing 2402 image and event data at a vehicle comprising a tractor and a trailer in response to a detected event, recording 2404 the event data at the vehicle, transmitting 2406 the image and event data for the detected event to a remote system, and detecting 2408 that the vehicle is in a non-driving state. The methodology also involves receiving 2410 a training presentation about the detected event from the remote system, and presenting 2412 the training presentation on a display in or proximate the tractor when the vehicle is in the non-driving state. The training presentation can be one of a multiplicity of prepared presentations that can be downloaded from the remote system to the vehicle based on the particular event detected by the onboard system. The prepared presentation can be generic or can integrate event-specific data as part of the presentation. The methodology shown in FIG. 24 can optionally involve confirming 2414 review of the presented information by the driver at vehicle. The confirmation process may involve confirming completion of the training session via a user interface at the vehicle and/or transmitting a completion signal to a remote system, such as a TMS.

Figure 25:
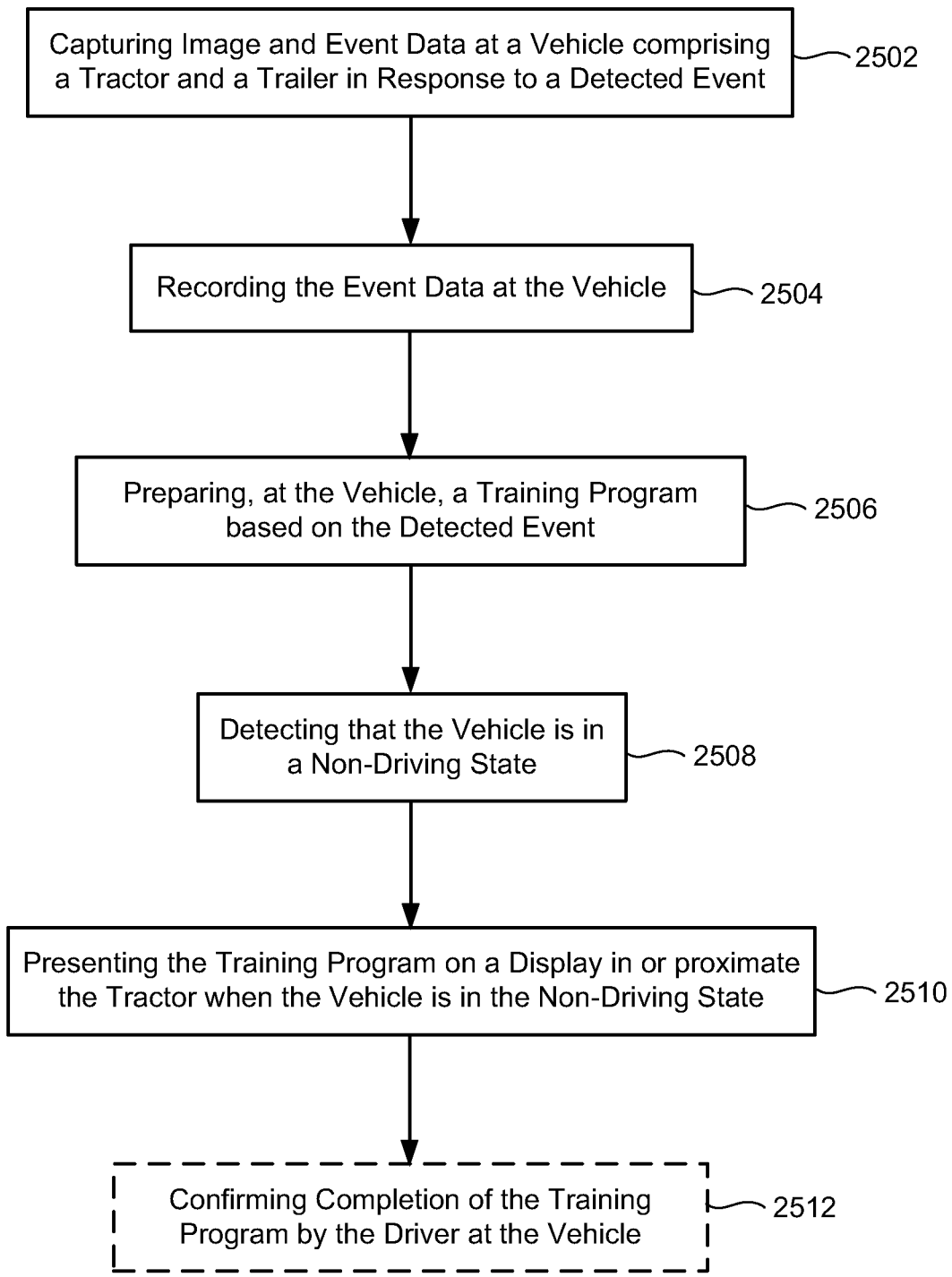
FIG. 25 is a flow chart showing various processes for conducting driver training during a trip implemented at least in part by an onboard computer of a commercial vehicle in accordance with various embodiments.

FIG. 25 illustrates various processes involving training of a driver soon after the detection of an event of interest occurring at the vehicle in accordance with various embodiments. The methodology shown in FIG. 25 involves capturing 2502 image and event data at a vehicle comprising a tractor and a trailer in response to a detected event and recording 2504 the event data at the vehicle. The methodology also involves preparing 2506, at the vehicle, a training program based on the detected event, and detecting 2508 that the vehicle is in a non-driving state. The methodology further involves presenting 2510 the training presentation on a display in or proximate the tractor when the vehicle is in the non-driving state. The training presentation can be one of a multiplicity of prepared presentations that can be stored locally in the onboard system and recalled from memory based on the particular event detected by the onboard system. The prepared presentation can be generic or can integrate event-specific data as part of the presentation. The methodology shown in FIG. 25 can optionally involve confirming 2512 review of the presented information by the driver at vehicle. The confirmation process may involve confirming completion of the training session via a user interface at the vehicle and/or transmitting a completion signal to a remote system, such as a TMS. The training methodology illustrated in FIG. 25 advantageously obviates the need to transfer event-related data from the vehicle, to the remote system, and then back to the vehicle, since the event-related data and the training presentation are already available at the vehicle (e.g., stored on the media recorder and/or onboard memory).

Various embodiments are directed to systems and methods that incorporate various features described hereinabove and in combination with those described in any or a combination of the following commonly owned U.S. Provisional Patent Applications:

U.S. Provisional Patent Application Ser. 62/038,717 filed Aug. 18, 2014;
U.S. Provisional Patent Application Ser. 62/038,720 filed Aug. 18, 2014;
U.S. Provisional Patent Application Ser. 62/038,724 filed Aug. 18, 2014;
U.S. Provisional Patent Application Ser. 62/038,725 filed Aug. 18, 2014;
U.S. Provisional Patent Application Ser. 62/038,706 filed Aug. 18, 2014; and
U.S. Provisional Patent Application Ser. 62/038,710 filed Aug. 18, 2014; each of which is hereby incorporated herein by reference in its respective entirety.

Systems, devices, or methods disclosed herein may include one or more of the features, structures, methods, or combinations thereof described herein. For example, a device or method may be implemented to include one or more of the features and/or processes described herein. It is intended that such device or method need not include all of the features and/or processes described herein, but may be implemented to include selected features and/or processes that provide useful structures and/or functionality. The systems described herein may be implemented in any combination of hardware, software, and firmware. Communication between various components of the systems can be accomplished over wireless or wired communication channels.

Hardware, firmware, software or a combination thereof may be used to perform the functions and operations described herein. Using the foregoing specification, some embodiments of the disclosure may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium," "computer program product," or other analogous language are intended to encompass a computer program existing permanently, temporarily, or transitorily on any computer-usable medium such as on any memory device or in any transmitting device. From the description provided herein, those skilled in the art are readily able to combine software created as described with appropriate general purpose or special purpose computer hardware to create a computing system and/or computing subcomponents embodying various implementations of the disclosure, and to create a computing system(s) and/or computing subcomponents for carrying out the method embodiments of the disclosure.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A system for use on a vehicle comprising a tractor and a trailer, the system comprising:
   an onboard computer configured to communicate with a computer of the vehicle and a central office;
   an event detector coupled to the onboard computer and configured to generate a trigger signal in response to detecting an occurrence of predetermined events impacting performance of the vehicle or of the driver during vehicle operation;
   one or more image capture devices situated at the vehicle and communicatively coupled to the onboard computer; and
   a media recorder coupled to the one or more image capture devices;
   wherein the onboard computer is configured to:
      adjust an image capture strategy affecting the one or more image capture devices based at least in part on data received from the central office;
      dynamically modify a hierarchy of one or more detection threshold parameters of the event detector based at least in part on data received from the central office, wherein the data received from the central office include at least one of current or projected operating conditions of the vehicle, and wherein image data captured by the one or more image capture devices are compared to the one or more detection threshold parameters for detecting an occurrence of predetermined events;

prioritize, based on the dynamically modified hierarchy, at least one detection threshold parameter and corresponding image data captured by at least one image capturing device of the one or more image capture devices;

determine, based on the image data captured by the at least one image capturing device, that the prioritized detection threshold parameter is exceeded;

in response to determining that the prioritized detection threshold parameter is exceeded, generate, via the event detector, the trigger signal; and effect storing of image data on the media recorder received from the at least one image capturing device and storing of event data in a memory in response to the trigger signal.

2. The system of claim 1, wherein the onboard computer is configured to:

modify one or more parameters of the event detector based at least in part on data received from the central office.

3. The system of claim 1, wherein the onboard computer is configured to one or both of:

adjust the image capture strategy affecting the one or more image capture devices based at least in part on data received from a client of the central office; and modify one or more parameters of the event detector based at least in part on data received from the client of the central office.

4. The system of claim 1, wherein the onboard computer is configured to adjust panning or orientation of the one or more image capture devices based at least in part on data received from the central office.

5. The system of claim 1, wherein the onboard computer is configured to adjust one or more of a field of view, zoom, resolution, light mode, and frame rate of the one or more image capture devices based at least in part on data received from the central office.

6. The system of claim 1, wherein the onboard computer is configured to add or subtract image capture devices as data sources based at least in part on data received from the central office.

7. The system of claim 1, wherein the onboard computer is configured to one or both of:

adjust the image capture strategy affecting the one or more image capture devices based at least in part on data received from a user interface at the vehicle; and modify one or more parameters of the event detector based at least in part on data received from the user interface at the vehicle.

8. The system of claim 1, wherein the onboard computer is configured to one or both of:

adjust the image capture strategy based at least in part on data pertaining to one or both of cargo within the trailer and a bill of lading received from the central office; and modify one or more parameters of the event detector based at least in part on data pertaining to one or both of cargo within the trailer and a bill of lading received from the central office.

9. The system of claim 1, wherein the onboard computer is configured to one or both of adjust the image capture strategy and modify one or more parameters of the event detector based at least in part on one or more of a value of cargo, volume of the cargo, weight of the cargo, fragility of the cargo, orientation of the cargo within the trailer, location of cargo items within the trailer, position of cargo items relative to other cargo items within the trailer, hazardous material classification of the cargo, and special handling instructions concerning the cargo.

10. The system of claim 1, wherein the onboard computer is configured to one or both of adjust the image capture strategy and modify one or more parameters of the event detector based at least in part on one or more of driver ID, driver certification data, driver history, driver education, driver specialization, driver hours of service (HOS) status, and Carrier Safety Administration (CSA) scoring data.

11. The system of claim 1, wherein the onboard computer is configured to adjust one or more detection thresholds of the event detector based at least in part on data pertaining to cargo within the trailer.

12. The system of claim 1, wherein the onboard computer is configured to adjust one or more detection thresholds of the event detector based at least in part on one or more of driver data, weather data, sun position data, traffic data, route or mapping data, road conditions data, insurance or risk data, vehicle maintenance data, and fuel or re-fueling data.

13. The system of claim 1, wherein the onboard computer is configured to effect real-time transmission of at least image capture device data to the central office in response to a command received from the central office.

14. A system for use on a vehicle comprising a tractor and a trailer, the system comprising:

a communications device configured to effect communications between the system and a remote system, the communications device configured to receive data from the remote system;

an event detector configured to generate a trigger signal in response to detecting occurrence of predetermined events;

a media recorder;

an onboard computer coupled to the communications device, the event detector, and the media recorder, the onboard computer configured to communicate with a computer of the vehicle; and one or more image capture devices situated at the vehicle and communicatively coupled to one or both of the onboard computer and the media recorder;

wherein the onboard computer is configured to:

adjust one or more parameters of the image capture devices based at least in part on the data received from the remote system;

dynamically modify a hierarchy of one or more detection threshold parameters of the event detector based at least in part on the data received from the remote system, wherein the data received include at least one of current or projected operating conditions of the vehicle;

prioritize, based on the dynamically modified hierarchy, at least one detection threshold parameter and image data captured by at least one image capturing device of the one or more image capture devices;

determine, based on the image data captured by the at least one image capturing device, that the prioritized detection threshold parameter is exceeded;

in response to determining that the prioritized detection threshold parameter is exceeded, generate, via the event detector, the trigger signal; and coordinate recording of the image data on the media recorder and storing of event data in response to the trigger signal.

15. The system of claim 14, wherein the onboard computer is configured to effect real-time transmission of at least the image data to the remote system in response to a command received from the remote system or other remote source.

16. The system of claim 14, wherein the onboard computer is configured to:
adjust one or more parameters of one or more image capture devices based at least in part on data received from a user interface at the vehicle; and
modify one or more parameters of the event detector based at least in part on data received from the user interface at the vehicle.

17. The system of claim 14, wherein the onboard computer is configured to adjust one or more parameters of one or more image capture devices or modify one or more parameters of the event detector based at least in part on one or more of a type of cargo within the trailer, a value of the cargo, volume of the cargo, weight of the cargo, fragility of the cargo, orientation of the cargo within the trailer, location of cargo items within the trailer, position of cargo items relative to other cargo items within the trailer, hazardous material classification of the cargo, and special handling instructions concerning the cargo.

18. The system of claim 14, wherein the onboard computer is configured to adjust one or more parameters of one or more image capture devices or modify one or more parameters of the event detector based at least in part on one or more of driver ID, driver certification data, driver history, driver education, driver specialization, driver hours of service (HOS) status, and Carrier Safety Administration (CSA) scoring data.

19. The system of claim 14, wherein the onboard computer is configured to adjust one or more detection thresholds of the event detector based at least in part on one or more of data pertaining to cargo within the trailer, driver data, weather data, sun position data, traffic data, route or mapping data, road conditions data, insurance or risk data, vehicle maintenance data, and fuel or re-fueling data.

20. A method for use on a vehicle comprising a tractor and a trailer, the method comprising:
detecting, via an event detector at the vehicle, occurrences of predetermined events impacting the vehicle or the driver during vehicle operation;
recording image data acquired by one or more image capture devices at the vehicle in response to detecting a predetermined event by the event detector;
storing vehicle data associated with the detected event; and
adjusting an image capture strategy affecting the one or more image capture devices at least in part in response to data received from a source external to the vehicle;
wherein detecting, via the event detector, occurrences of predetermined events comprising:
dynamically modifying a hierarchy of one or more parameters of the event detector based at least in part on data received from the external source, wherein the data received from the external source include at least one of current or projected operating conditions of the vehicle;
prioritizing, based on the dynamically modified hierarchy, at least one parameter of the event detector and image data captured by at least one image capturing device of the one or more image capture devices;
determining, based on the image data captured by the at least one image capturing device, that the prioritized parameter is exceeded; and
in response to determining that the prioritized parameter is exceeded, generating, via the event detector, a trigger signal.

21. The method of claim 20, further comprising effecting real-time transmission of at least the image data to the external source in response to a command received from the external source.

* * * * *